United States Patent [19]

Ito

[11] Patent Number: 5,095,531
[45] Date of Patent: Mar. 10, 1992

[54] MOBILE COMMUNICATION POSITION REGISTERING METHOD AND SYSTEM THEREFOR

[75] Inventor: Sadao Ito, Yokohama, Japan
[73] Assignee: Iwatsu Electric Co., Ltd., Tokyo, Japan
[21] Appl. No.: 348,662
[22] PCT Filed: Aug. 8, 1988
[86] PCT No.: PCT/JP88/00783
§ 371 Date: Apr. 26, 1989
§ 102(e) Date: Apr. 26, 1989

[30] Foreign Application Priority Data

Aug. 28, 1987 [JP] Japan .................. 62-214525

[51] Int. Cl.⁵ .............................................. H04B 7/00
[52] U.S. Cl. .................................... 455/33; 455/56
[58] Field of Search ............... 455/33, 54, 56, 78, 455/51; 379/59, 60, 63

[56] References Cited

U.S. PATENT DOCUMENTS

| | | | |
|---|---|---|---|
| 4,308,429 | 12/1981 | Kai et al. ............................. | 455/56 |
| 4,670,899 | 6/1987 | Brody et al. ....................... | 379/59 |
| 4,696,052 | 9/1987 | Breeden ............................ | 455/56 |
| 4,882,766 | 11/1989 | Akaiwa ............................. | 455/56 |

FOREIGN PATENT DOCUMENTS 59104840 12/1982 Japan .
6038940 8/1983 Japan .
6172423 9/1984 Japan .
61673329 9/1984 Japan .

*Primary Examiner*—Reinhard J. Eisenzopf
*Assistant Examiner*—Edward Urban
*Attorney, Agent, or Firm*—Oblon, Spivak, McClelland, Maier & Neustadt

[57] ABSTRACT

A mobile communication system including a plurality of radiotelephone base stations respectively covering a plurality of cells to define in combination a service area, a mobile unit capable of communicating with the radiotelephone base stations, and a radiotelephone control unit for connecting together each of the base stations and an ordinary telephone network, setting up and releasing a speech path between the each radiotelephone base station and the mobile unit, and adding a speech path for communication with another radiotelephone base station which is able to communicate with the mobile unit as it moves. The mobile unit is adapted to transmit and receive a plurality of channels at the same time so that it is capable of communicating with a plurality of radiotelephone base stations and registering its position to these base stations. The mobile unit successively registers its position to radiotelephone base stations with which it can communicate as it moves, so that the mobile unit can communicate with a telephone set in the telephone network without instantaneous disconnection via all the base stations where it has registered the position.

19 Claims, 24 Drawing Sheets

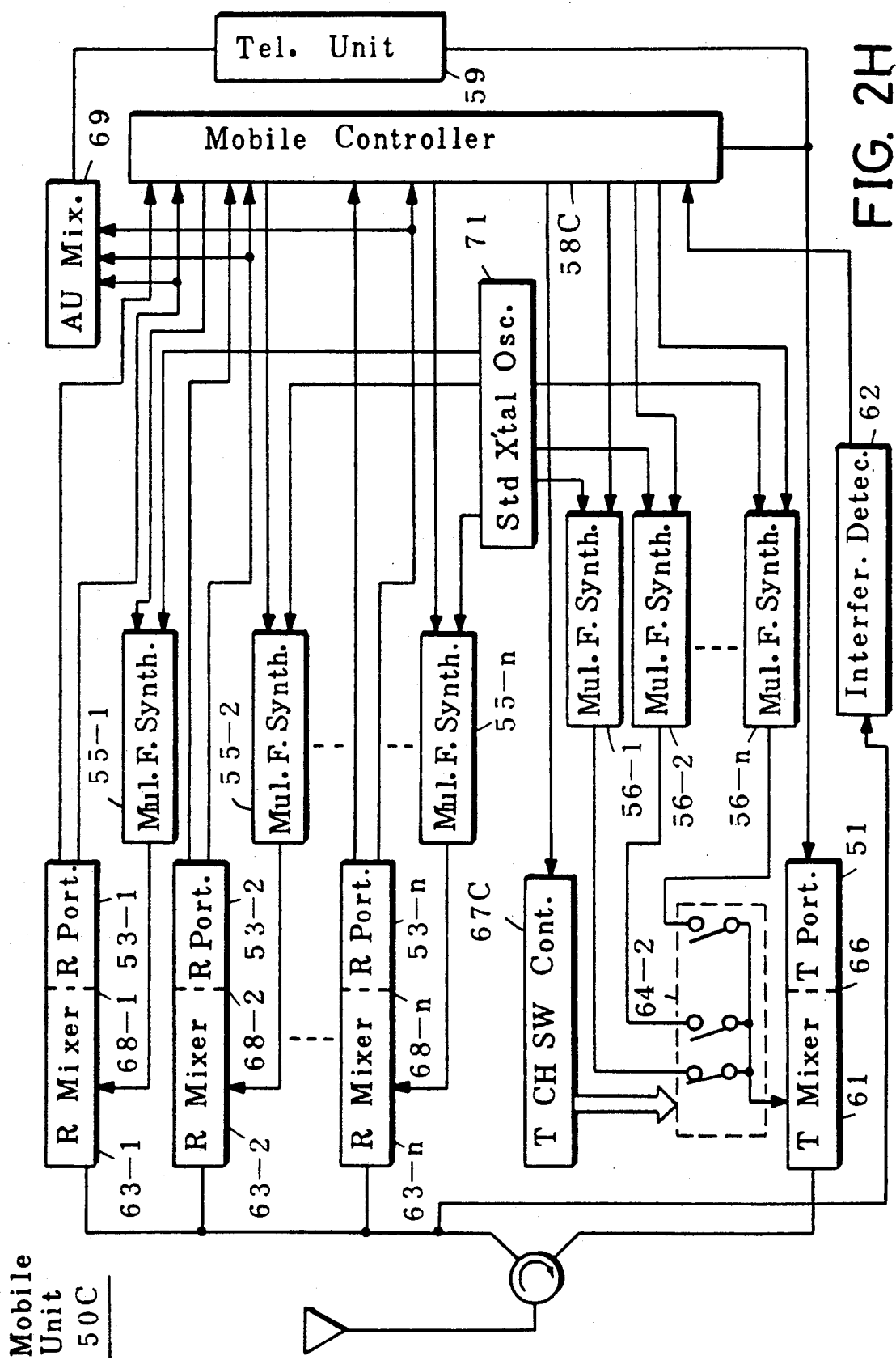

FREQUENCY (KHz)

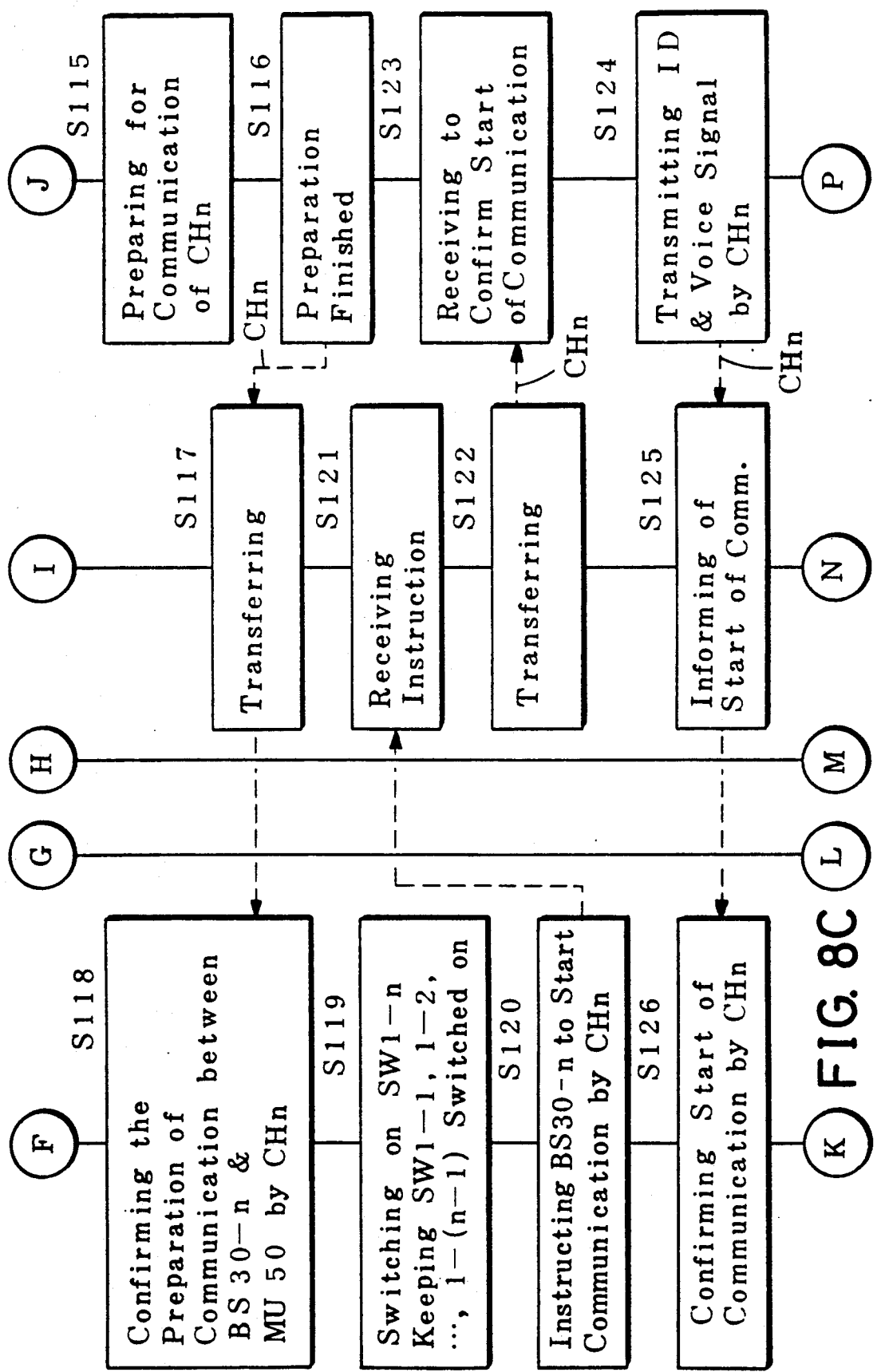

MOBILE COMMUNICATION POSITION REGISTERING METHOD AND SYSTEM THEREFOR

BACKGROUND OF THE INVENTION

1. Field of the Invention

The present invention relates to a communication method and system for mobile communication. The present invention further relates to a communication method for mobile communicatin that employs a cellular system (which means the service area is covered by many circular or hexagonal shape small zones uniformly) which enables recovery of the communication quality when deteriorated as a result of movement of the mobile unit which is engaged in communication, and also to a system for this communication method.

More specifically, the present invention provides a communication method and system which are superior in the frequency effective utilization factor, communication quality, radiotelephone control capacity, etc.

2. Description of the Related Art

In mobile communication effected in a wide service area, a system in which a single radiotelephone base station covers the entire area to communicate with a mobile unit which is within the service area is generally called "large zone system". On the other hand, in "cellular system", the service area is divided into a plurality of small circular or hexagonal shape areas in each of which a single radiotelephone base station is installed, and a mobile unit which is present in each area effects communication with the ratiotelephone base station installed therein.

The conventional cellular system is adopted, for example, in the mobile telephone system of NTT (Nippon Telegraph & Telephone Corp.) which is now in commercial service. In this case, when a mobile unit which is loaded on an automobile moves away from the radiotelephone base station with which it is in communication, for example, when the distance from the radiotelephone base station is greater than a distance of from 5 to 7 km, the electric field intensity of the received radio wave lowers and, therefore, the speech quality deteriorates. For this reason, in the cellular system, radiotelephone base stations are installed in the service area at regular intervals of from 10 to 12 km so that, in the above-described case, another radiotelephone base station is always present near (within from 5 to 6 km) the current position of the automobile, thereby enabling the communication to continue between the new radiotelephone base station and the mobile unit by use of another radio channel.

In the NTT system, a radiotelephone control station for controlling setting and release of the radiotelephone speech channel is installed to control a large number of radiotelephone base stations and mobile units, and the radiotelphone control station is connected to a public telephone network through a gateway exchanger that serves as an interface. When the speech quality has deteriorated, the radiotelephone control station instructs a plurality of radiotelephone base stations around the mobile unit concerned to receive the radio waves transmitted from the mobile unit and, when it is judged that a desired level of speech quality can be maintained if a new radio channel is set up between the mobile unit and a specific one of the instructed radiotelephone base stations, the radiotelephone control station effects control such that a new channel is set up between the mobile unit and the specified radiotelephone base station.

FIG. 1 is a schematic block diagram of a conventional system that performs the above-described operation. The prior art will be explained below with reference to FIG. 1.

Referring to FIG. 1, four circular zones (cells) 14A, 14B, 14C and 14D each having a radius of about 5 to 7 km are defined as service areas of a mobile telephone system. It is assumed that a mobile unit 15 loaded on an automobile is in communication with a radiotelephone base station 13A in the zone (cell) 14A. Since the automobile is traveling within the zone (cell) 14A toward the zone 14C, the relative distance between the radiotelephone base station 13A and the mobile unit 15 is increasing. Assuming that the radio communication is continuing and the automobile has moved into the zone (cell) 14C from the zone (cell) 14A, the distance between the radiotelephone base station 13A and the mobile unit 15 is longer than a distance of 5 to 7 km, so that the electric field intensities of radio waves respectively received by the radiotelephone base station 13A and the mobile unit 15 lower below a predetermined transmission quality level.

The condition of quality deterioration is constantly supervised by a radiotelephone control station 12. When the quality lowers below a predetermined level, the radiotelephone control station 12 requests radiotelephone base stations 13B, 13C and 13D adjacent to the radiotelephone base station 13A to measure the level of quality of the radio channel (assumed to be the channel CH1) which is being used for the communication between the radiotelephone base station 13A and the mobile unit 15. At the request of the radiotelephone control station 12, each of the radiotelephone base stations 13B, 13C and 13D tunes its own radio channel searching receiver (not shown) to the channel CH1 to receive the signal and reports the condition of the received signal to the radiotelephone control station 12.

Receiving the report, the radiotelephone control station 12 makes a comparison between the electric fields $E_B$, $E_C$ and $E_D$ respectively received by the radiotelephone base stations 13B, 13C and 13D. When it is confirmed that $E_C > E_B$, $E_C > E_D$ and $E_C$ satisfies a predetermined level of transmission quality, the radiotelephone control station 12 regards the automobile as having moved into the zone (cell) 14C from the zone (cell) 14A and cuts off the radio channel CH1 used in the zone (cell) 14A and initiates the procedure of allowing use of an unused channel (assumed to be the channel CH10) among radio channels available for the radiotelephone base station 13C in the zone (cell) 14C in place of the channel CH1, that is, the control station 12 beings the operation of channel hand-off (switching) during communication.

The following description will be made with reference to Yoshikawa et al. "Mobile Telephone Control", Telecommunication Research Institute of Nippon Telegraph & Telephone Public Corp., Research and Practical Application Report Vol. 26, No. 7, page 1885, 1977.

1) The channel switching signal is transmitted from the radiotelephone control station 12 to each radiotelephone base station 13 through a control line that is included in each transmission line 16, while a radio speech channel is used to transmit the channel switching signal from each radiotelephone base station 13 to the mobile unit 15.

2) The channel switching signal is sent to the mobile unit 15 from the radiotelephone base station 13 with which the mobile unit 15 has heretofore communicated, for example, the radiotelephone base station 13A, while a radio connection test tone is sent to the mobile unit 15 from a radiotelephone base station 13 to which the radiotelephone base station is to be switched, for example, the radiotelephone base station 13C.

3) If the radio connection test tone cannot be received by the mobile unit 15, the speech channel is switched back to the old speech channel set up between the mobile unit 15 and the radiotelephone base station 13A so as to enable the call to continue.

The speech channel switching that is presently used in NTT is effected in accordance with the above-described procedures 1) to 3). As will be clear from these descriptions, the user of a mobile telephone may experience the following problems:

(a) Since the control signal (a digital signal of 300 bits/sec. in this case) for switching in the procedure 1) appears in the output of the receiver in such a way that it is inserted into the speech channel after the signal from the other party has been cut off, the control signal mixes in the speech channel in the form of an audible sound of about 300 Hz, thus causing speech disconnection during the reception of the control signal.

(b) During the transmission test in 2), no noise mixes in the speech channel but no sound is available, so that the other party's voice is not transmitted to the user of the mobile telephone and the user's voice is not transmitted to the other party, either (speech disconnection).

The duration of speech disconnection due to the above-described reasons a) and b) is said to be from 0.7 to 0.8 seconds. On the other hand, the radiotelephone control station 12 instructs the radiotelephone base station 13C through the transmission line 16C therebetween to initiate communication withthe mobile unit 15 by use, for example, of the channel CH10. Since this instruction is executed at the same time as the above-described connection test, the radiotelephone base station 13A terminates the communication with the mobile unit 15 at this moment and the radiotelephone base station 13C initiates communication with the mobile unit 15 instead. In addition, the radiotelephone control station 12 requests a gateway exchanger 19 that serves as an interface between it and a public telephone network 10 to switch speech path switches SW provided in the gateway exchanger 19 for connecting each radiotelephone base station 13 to the public telephone network 10 so that the radiotelephone base station 13A is switched to the base station 13C. More specifically, in the speech path switch group SW shown in FIG. 1, the switch A-4 is turned off (indicated by the blank triangle), while the switch C-4 is turned on (indicated by the black triangle).

By the above-described operation, the communication between the mobile unit 15 used in the automobile and any telephone set in the public telephone network 10 is continued no matter to which cell among the zones 14A, 14B, 14C and 14D the automobile moves.

Thus, the user (caller) is given the technical guarantee that it is possible to make a telephone call at any time and to any place during traveling of the automobile within the service areas. The actual service makes full use of this technique.

It has become possible for the mobile communication that adopts such a cellular system to exhibit the following advantageous features, which cannot be attained by the large zone system:

(a) It has become possible to effectively utilize frequency by the cellular system wherein radio waves from a single radiotelephone base station are restrictively used within a narrow area and a large number of such radiotelephone base stations are disposed in a service area so as to use the same frequency repeatedly.

(b) The advent of digital synthesizers has enabled a large number (as many as several hundreds) of radio channels to be used for mobile units while being switched over from one to another. Further, since techniques of setting up and controlling radio speech paths between these large number of mobile units and radiotelephone base stations have been established, it becomes possible to make a large contribution to the effective utilization of frequency mentioned in the paragraph (a).

(c) Since radiotelephone control techniques required to efficiently set up and control radio speech paths for a large number of mobile units at the time of originating or receiving calls have been established, it has also become possible to make a large contribution to the effective utilization of frequency mentioned in the paragraph (a). In addition, it has become possible to effect channel hand-off during communication which is needed when a mobile unit which is engaged in communication moves from one cell to another.

However, the conventional system illustrated in FIG. 1 suffers from the problems that the users put up with inconveniences and no satisfactory service can be provided since insufficient or no technical measures have heretofore been taken against the inconveniences. Accordingly, the system has been needed to promote further effective utilization of frequency and serviceability.

These problems will be explained below:

i) It is necessary in order to achieve effective utilization of frequency to reduce the radius of each cell in the cellular system; however, if the cell radius becomes excessively small, the probability that a mobile unit which is engaged in communication will pass one cell to move into another cell increases. In consequence, the necessity for changing radio channels allotted to the respective cells occurs frequently when the mobile unit moves through cells from one to another and, at this time, both a radiotelephone base station concerned and the mobile unit must change the old radio channel for a new radio channel. Hitherto, the change of channels has been effected in the radio radiotelephone control station 12 (see FIG. 1); however, the change of channels causes instantaneous disconnection of communication and thus deteriorates the communication quality.

ii) There has heretofore been a prior art wherein mobile units which have different transmission power levels are introduced into the same system so as to operate as devices in the same one system. In this prior art, for example, mobile units (having a transmission output of 5 W in the case of the NTT mobile telephone system) which are loaded on automobiles and portable telephone sets (having a transmission output of 1 W in the case of NTT) which the users can carry along outdoors to access radiotelephone base stations for the mobile telephone system are used in the same system and this enables construction of an economical system since radio equipment that is accommodated in the radiotelephone base stations can be used in common.

From the viewpoint of effective utilization of frequency, however, since establishment of rules for reusing the same frequency is complicated, the advantage of the effective utilization of frequency is lowered. In addition, since two different levels of transmission power are used, the possibility of occurrence of interferences with other mobile units increases. Prevention of these problems results in an increase in the cost and also causes the effective utilization of frequency to be impaired.

iii) As the size of cells becomes smaller (so-called microcell), one cell which is covered by one radiotelephone base station overlaps more with another cell which is covered by an adjacent radiotelephone base station or another base station which is adjacent thereto. Therefore, when the prior art is employed as a radiotelephone control technique, there is a possibility that it will become impossible to control the system.

More specifically, the radio wave propagation characteristics are greatly affected (i.e., the propagation loss is increased) by topography and buildings within one cell. As the size of cells is further reduced for the purpose of effectively utilizing frequency and the range of each cell decreases (a radius of 1 km or less), the effect of topography and buildings increases in inverse proportion to it. It is also necessary to employ transmitters of relatively high level for radiotelephone base stations and mobile units used in the system in order to ensure satisfactory communication even in a place where the radio wave propagation characteristics are affected by topography and buildings. This means that, in a place where there is no effect of topography and buildings, a remote radiotelephone base station and a mobile unit which is within another cell can communicate with each other.

Accordingly, the primary concept that each cell is administered by a single radiotelephone base station and a wide plane which is defined as a service area is covered with a large number of cells disappears, but a large number of cells overlap each other to form a service area instead.

As a result, to smoothly use a cellular system which is in such conditions, it is necessary with the prior art to frequently effect setting, change and release of radio speech paths, so that the capacity of the radiotelephone control unit is exceeded to a substantial extent. Accordingly, in actual practice it is impossible to ensure speech paths smoothly. Conversely, considerations have been given to how to cope with such situations when systems are constructed.

iv) In mobile communication, the radio wave propagation characteristics are affected by movement of a mobile unit and this causes the communication quality to vary to a substantial extent, so that in a place where the propagation loss of radio waves is high the communication quality may be lowered below the value required for the system. To solve this problem, various measures, for example, diversity technique, have been taken, but all these measures have problems, that is, a rise in the cost of the devices and impairing of the effective utilization of frequency.

Communication disconnection caused by movement from one cell to another during communication is considered to be a problem of a kind of communication quality and it has heretofore been necessary to find a solution in order to ensure the required quality.

v) No measure has been taken against communication traffic variations in the system.

Communication traffic of public land line communication is very small in the middle of the night and at early hours in the morning and high traffic peaks are found around 10 a.m. and at from 2 to 3 p.m. In the case of mobile telephone system, a high traffic peak is found at from 5 to 6 p.m. If a communication system is designed so that it functions satisfactorily at the time of the maximum traffic, devices that constitute the system are unused when the traffic is not congested, which results in an increase in the cost. If a communication system is constructed so that it is conformed with a small-traffic state, the cost is considerably low, but when the traffic reaches a maximum, the system cannot be used satisfactorily, so that serviceability is inevitably lowered.

In addition, the prior art lacks the concept that constituent facilities in the system are effectively utilized in such a way that, when the communication traffic is not congested, unused equipment in the system is effectively utilized to provide high-quality service, whereas, as the traffic increases, the service shifts to the ordinary service. It is considered that one of the reasons for this resides in that the system cost rises rapidly if it is intended to solve this problem by the prior art.

In the case where all transmitter-receivers in a radiotelephone base station are in use, for example, the conventional system is incapable of processing even an extremely short and fixed-form signal such as a position registration signal that is sent from a mobile unit, which constitutes a technical restriction against the progress toward smaller cells.

vi) Position registration of a mobile unit which is going to perform communication has heretofore been executed by registering only data which is received by one radiotelephone base station among data which are received by a plurality of base stations at the same point of time. For this reason, there are cases where it is impossible for the mobile unit to receive an incoming call due to a failure in position registration in systems wherein position registration is successively revised at a considerably high frequency as in the case of mobile communication with a mobile unit moving at high speed or in systems wherein the method of position registration is restricted due to the effective utilization of frequency.

More specifically, in the case where the radiotelephone base station is provided with transmitter-receiver equipment for only one channel, the channel must be used in a time-division manner for both control and speech. In addition, when the transmitter-receiver is in communication with one mobile unit, if there is a request for position registration from another mobile unit which is in the same cell, marked adverse effects are experienced.

vii) The technique for providing mobile communication service that employs wide-band signals has not yet satisfactorily been completed; therefore, the users have heretofore suffered much inconvenience.

Hitherto, many mobile communication services have been used for telephone services, but high-speed data signals or the like which use wide frequency bands have not substantially been used. This is because in mobile communication the radio wave propagation characteristics change greatly as the mobile unit moves and there have been no technique of receiving wide-band signals effectively.

viii) In conventional land mobile communication, estimation of a direction of movement of a mobile unit which is engaged in communication has not been practiced due to technical difficulties except for some special cases. For this reason, it is impossible to obtain effective information such as radio telephone traffic conditions in an area to which the mobile unit is moving. Therefore, there are problems to be solved foe effective utilization of frequency or traffic administration.

ix) Instantaneous transmission disconnection occurs at the time of switching over speech channels from one to another which is needed when the mobile unit moves from one cell to another or when it is moving within one cell. This also constitutes a major obstacle to achievement of an effective cellular system.

The speech channel switching method practiced by NTT, which has been explained with reference to FIG. 1 involves the disadvantages that the speech is momentarily (for from 0.7 to 0.8 seconds) disconnected when radio channels are switched from one to another and further a part of control signal (300 bits/sec.) mixes in the speech signal to generate noise that grates on the user's ear. When the call is made by voice, even if instantaneous speech disconnection or mixing of noise occurs, a missing part of the speech can be recovered by asking the other party to say it again; in such a case, therefore, no serious problem is experienced. However, in the case where a facsimile terminal which is loaded on an automobile is used to send or receive information, if channel hand-off is effected during an operation of the facsimile terminal, there has heretofore been experienced the problem that, in the case, for example, of a 1-minute facsimile system, a black (or white) line appears on that portion of the surface of a sheet of paper which is located at 0.8/60 of the sheet, thus greatly deteriorating the quality of received picture. In the case of data communication, signals that correspond to about 1,000 bits are missed when data signals are transmitted, for example, at 1,200 Bd, and it is therefore necessary to resend the data.

It should be noted that there are some methods of removing grating noise, e.g., one method wherein no sound is generated when channels are switched over from one to another and another method wherein a signal which is out of the band for the speech signal is used as a control signal. These methods enable removal of grating noise but cannot eliminate the transmission disconnection. Therefore, the prior art methods are utterly ineffective to remove adverse effects on facsimile systems and data signals.

SUMMARY OF THE INVENTION

In view of the above-described circumstances, it is an object of the present invention to provide a communication system in which a plurality of radiotelephone base stations and a mobile unit exchange the same communication contents with each other in parallel using a plurality of channels.

It is another object of the present invention to provide a communication system which is designed so that, when the communication quality of a channel (old channel) has lowered below a predetermined level in the middle of exchange of the same communication using a plurality of channels in parallel, the old channel is switched over to another channel (new channel) which satisfies a predetermined level of communication quality under the control of a radiotelephone control unit, thereby enabling the same communication contents to be exchanged without any instantaneous disconnection by use of a plurality of channels including the new channel.

It is still another object of the present invention to enhance the reliability in position registration by registering the position of a mobile unit in ID recognition memories respectively provided in each radiotelephone base station and a radiotelephone control unit in parallel on the basis of data concerning each radiotelephone base station.

It is a further object of the present invention to realize elimination of instantaneous transmission disconnection due to the speech (communication) channel switching operation conducted when the mobile unit moves from one cell to another or when it is moving within one cell by switching a channel whose communication quality has deteriorated to a new channel among a plurality of channels.

It is a still further object of the present invention to provide a communication system which is designed so that it is possible to ensure a high level of communication quality, that is, reduce interferences, and enable a new service that employs wide-band signals, by adopting economical transmission-reception diversity.

It is a still further object of the present invention to provide a communication system which is designed so that it is possible to effectively utilize radio equipment and thereby obtain high communication quality by effecting parallel communication using a large number of channels when the traffic is not congested.

It is a still further object of the present invention to provide a communication system which is designed so that it is possible to process a position registration signal from a mobile unit even when the traffic is most congested by providing each radiotelephone base station with an ID recognition memory and a function by which it is possible to effect simultaneous transmission and reception through a plurality of radio channels by high-speed switching.

It is a still further object of the present invention to improve wide-band signal transmission characteristics and thereby improve the radiotelephone quality by parallel communication using a plurality of channels.

It is a still further object of the present invention to provide a communication system which is designed so that it is possible to ensure communication in a cell into which the mobile unit concerned is expected to move and carry out advance allotment of a channel used in said cell by estimating a direction and speed of movement of the mobile unit.

To these ends, the present invention provides a communication system comprising: a plurality of radiotelephone base stations each having a radio transmitter-receiver and an ID recognition memory; a radiotelephone control unit including a group of switches for connecting together the radiotelephone base stations and a telephone network through a gateway exchanger, a communication controller for controlling the switches, an ID recognition memory and an S/N supervisor for supervising a ratio of a signal received by each radiotelephone base station to noise; and a mobile unit including a receiver arranged to simultaneously receive a plurality of channels and a transmitter arranged to simultaneously transmit a plurality of channels so that the mobile unit simultaneously communicates with a plurality of radiotelephone base stations while moving within a service area covered by the radiotelephone base stations.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements and, of which:

FIGS. 2G, 2H and 2I are circuit block diagrams showing other examples of the mobile unit;

FIGS. 8A, 8B, 8C and 8D are flowcharts showing the flow of a channel switching operation conducted by the system shown in FIGS. 2A to 2C.

DESCRIPTION OF THE PREFERRED EMBODIMENTS

The present invention will be described hereinunder in detail with reference to the accompanying drawings.

Figure 1:
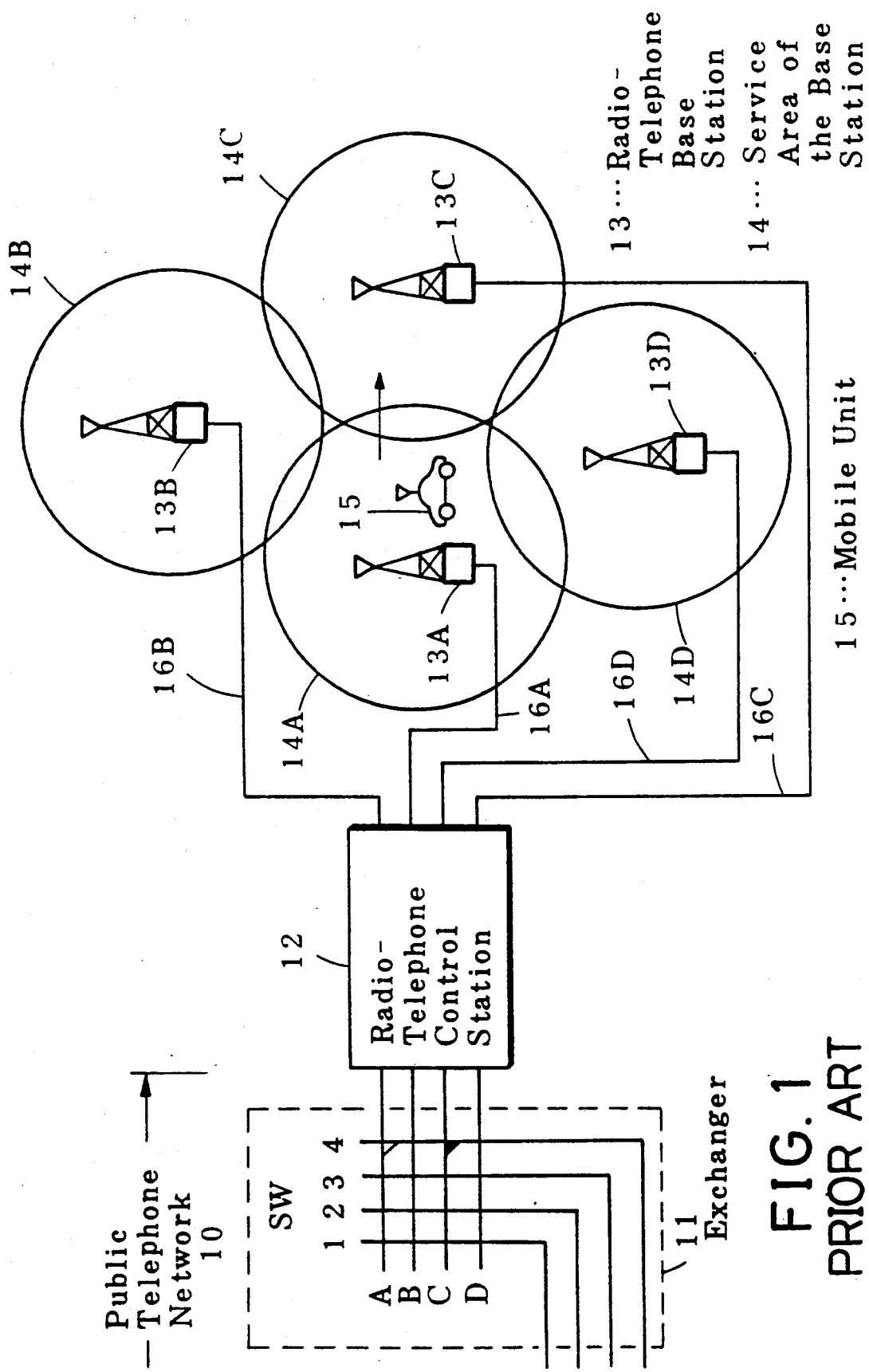
FIG. 1 is a schematic block diagram illustrating a conventional communication system.
Figure 2A:
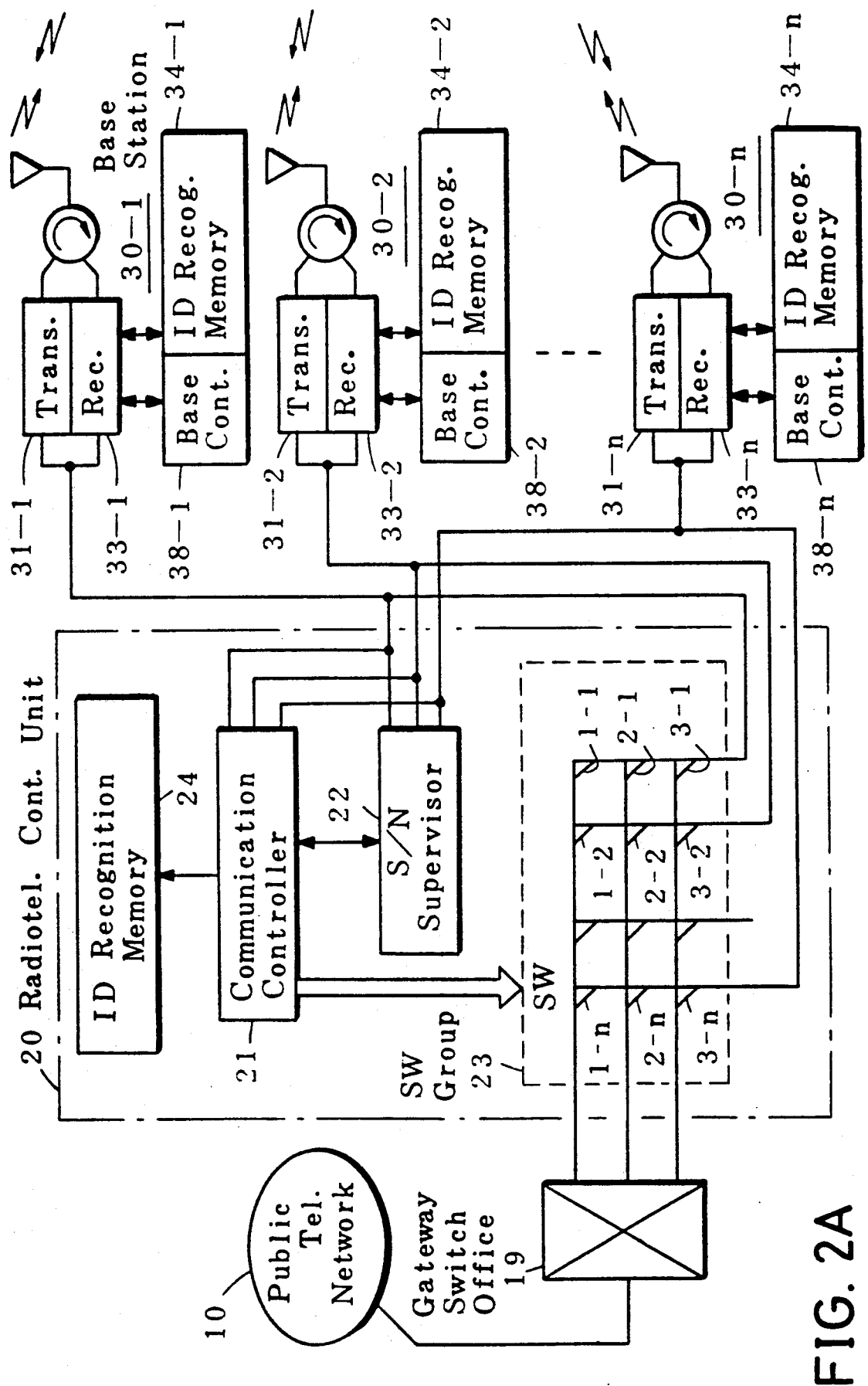
FIGS. 2A, 2B and 2C are block diagrams showing in combination one embodiment of the present invention.
Figure 2B:
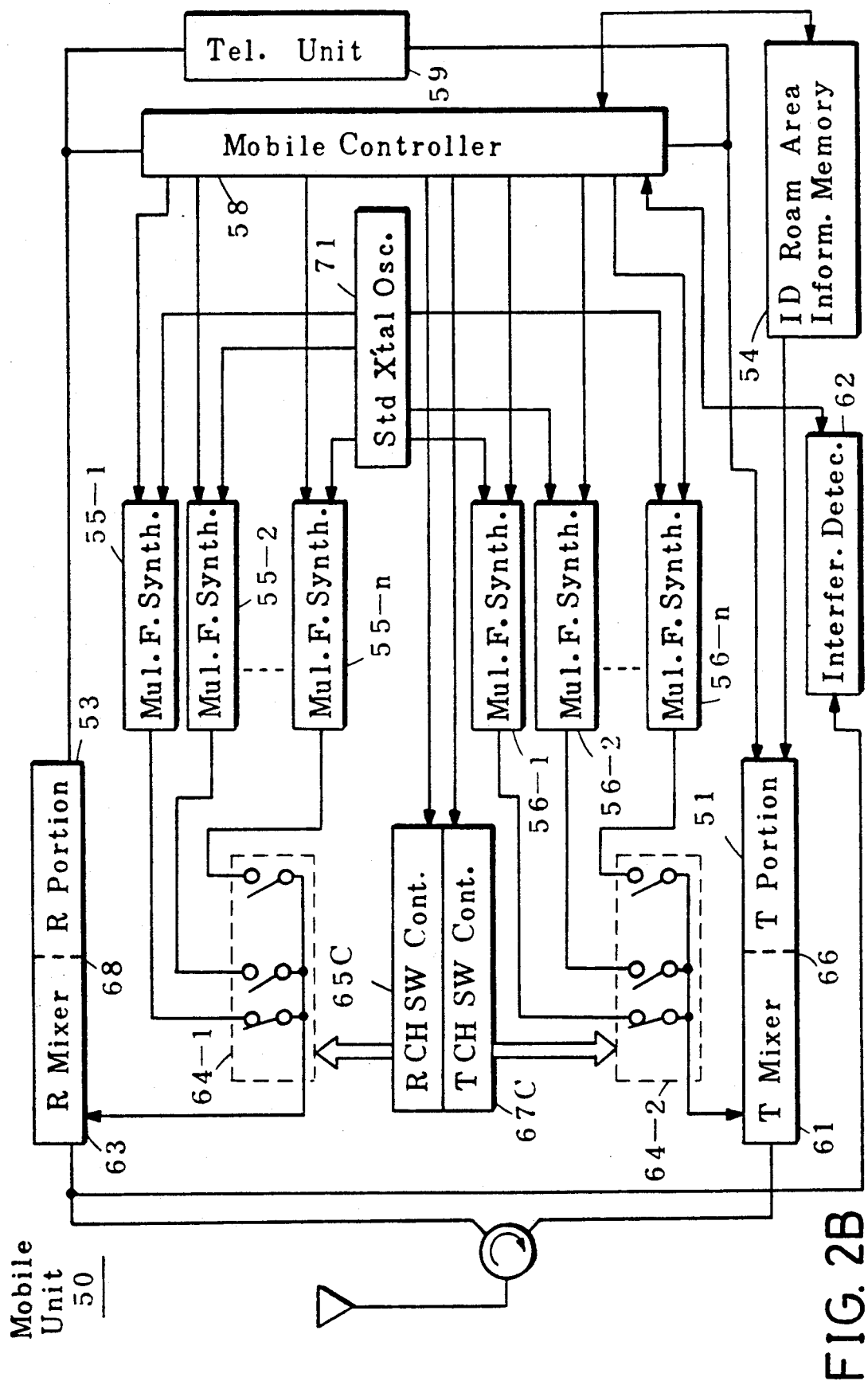
Figure 2C:
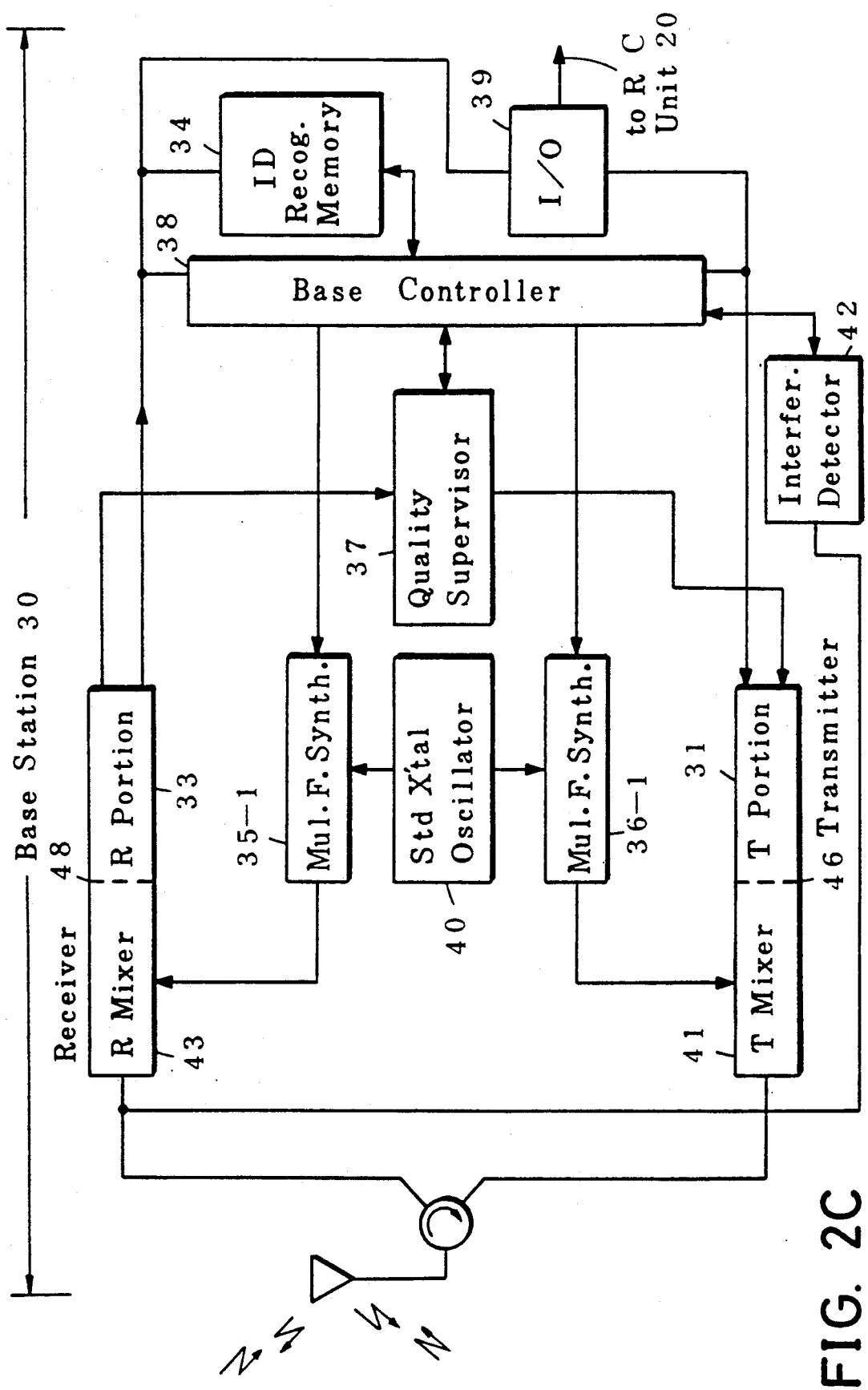

FIGS. 2A, 2B and 2C show in combination one example of the system arrangement to explain one embodiment of the present invention.

Referring to FIG. 2A, the reference numeral 10 denotes a public telephone network which includes a public telephone exchanger. The reference numeral 19 denotes a gateway switch office for switching the connection between the public telephone exchanger included in the telephone network 10 and the radio system.

The reference numeral 20 denotes a radiotelephone control unit for selectively connecting together a plurality of radiotelephone base stations 30-1, 30-2, ... 30-n, a large number of mobile units and telephone sets accommodated in the public telephone network 10. The radiotelephone control unit 20 includes an S/N supervisor 22 which effects exchange of control signals between the base stations 30-1 to 30-n and which also supervises the signal-to-noise ratio in communication between each of the base stations 30-1 to 30-n and a mobile unit, a communication controller 21 for controlling setting, release, etc. of communication channels, and a switch group 23 required to switch over communication channels from one to another for connecting each of the base stations 30-1 to 30-n and the gateway switch office 19 under the control of the communication controller 21. The switch group 23 includes switches SW1-1 to SW1-n, SW2-1 to SW2-n, and SW3-1 to SW3-n.

The base stations 30-1 to 30-n respectively include transmitting portions 31-1 to 31-n, receiving portions 33-1 to 33-n, ID recognition memories 34-1 to 34-n and base controllers 38-1 to 38-n.

FIG. 2B shows a mobile unit 50 which communicates with each of the base stations 30-1 to 30-n. A receiving signal received by an antenna enters a receiver 68 including a receiving mixer 63 and a receiving portion 53. The output of the receiver 68 which is defined as a communication signal is input to both a mobile controller 58 and a telephone unit 59. The communication signal output from the telephone unit 59 is applied to a transmitter 66 including a transmitting mixer 61 and a transmitting portion 51 to send a transmitting signal from the antenna. The transmitting signal is received by base stations 30. The mobile unit 50 further has an interference detector 62 which watches whether or not there are interferences generated during communication and informs the mobile controller 58 of the existence of interferences when detecting interferences the level of which is higher than a predetermined value, and an ID roam area information memory 54 which stores the ID of the mobile unit 50, recognizes a current cell within which the mobile unit 50 is present, and stores the data concerning the current cell, the interference detector 62 and the ID roam area information memory 54 being connected as shown in the figure.

The mobile unit 50 further includes multi-frequency synthesizers 55-1, 55-2, ... 55-n and 56-1, 56-2, ... 56-n, changeover switches 64-1, 64-2, and a pair of receiving and transmitting channel switching controllers 65C and 67C which generate signals for switching control of the changeover switches 64-1 and 64-2, respectively. The multi-frequency synthesizers 55-1 to 55-n and 56-1 to 56-n and the switching controllers 65C and 67C are controlled by the mobile controller 58. Each of the multi-frequency synthesizers 55-1 to 55-n and 56-1 to 56-n is supplied with a standard frequency from a standard crystal oscillator 71.

FIG. 2C shows a base station 30 (e.g., 30-1) which may communicate with the mobile unit 50. The arrangement of the base station 30 is substantially the same as that of the mobile unit 50 shown in FIG. 2B. The base station 30 differs from the mobile unit 50 only in the following points. The base station 30 is not provided with the transmitting and receiving channel switching controllers 65C, 67C, the multi-frequency synthesizers 55-1 to 55-n, 56-1 to 56-n and the changeover switches 64-1, 64-2 for switching the synthesizers. As to synthesizers, the base station 30 is provided only with a multi-frequency synthesizer 35-1 for reception and a multi-frequency synthesizer 36-1 for transmission. The base station 30 has an ID recognition memory 34 for recognizing and storing the ID number of this base station 30 and the other party's ID number and a quality supervisor 37 which constantly supervises the speech quality during communication and informs the base controller 38 of deterioration of the speech quality when detecting it. The base station 30 has no telephone unit 59 (see FIG. 2B) but is provided with an interface 39 to the radiotelephone control unit 20 instead.

Constituent elements shown in FIG. 2C which correspond to those shown in FIG. 2B are listed below, but description of the function of each constituent element is omitted. The numerals in the parentheses are the reference numerals of the corresponding constituent elements shown in FIG. 2B.

Transmitting portion 31 (51)
Receiving portion 33 (53)
Multi-frequency synthesizer 35-1 (55-1 to 55-n)
Multi-frequency synthesizer 36-1 (56-1 to 56-n)
Base controller 38 (58)
Standard crystal oscillator 40 (71)
Transmitting mixer 41 (61)
Interference detector 42 (62)
Receiving mixer 43 (63)
Transmitter 46 (66)
Receiver 48 (68).

Figure 2D:
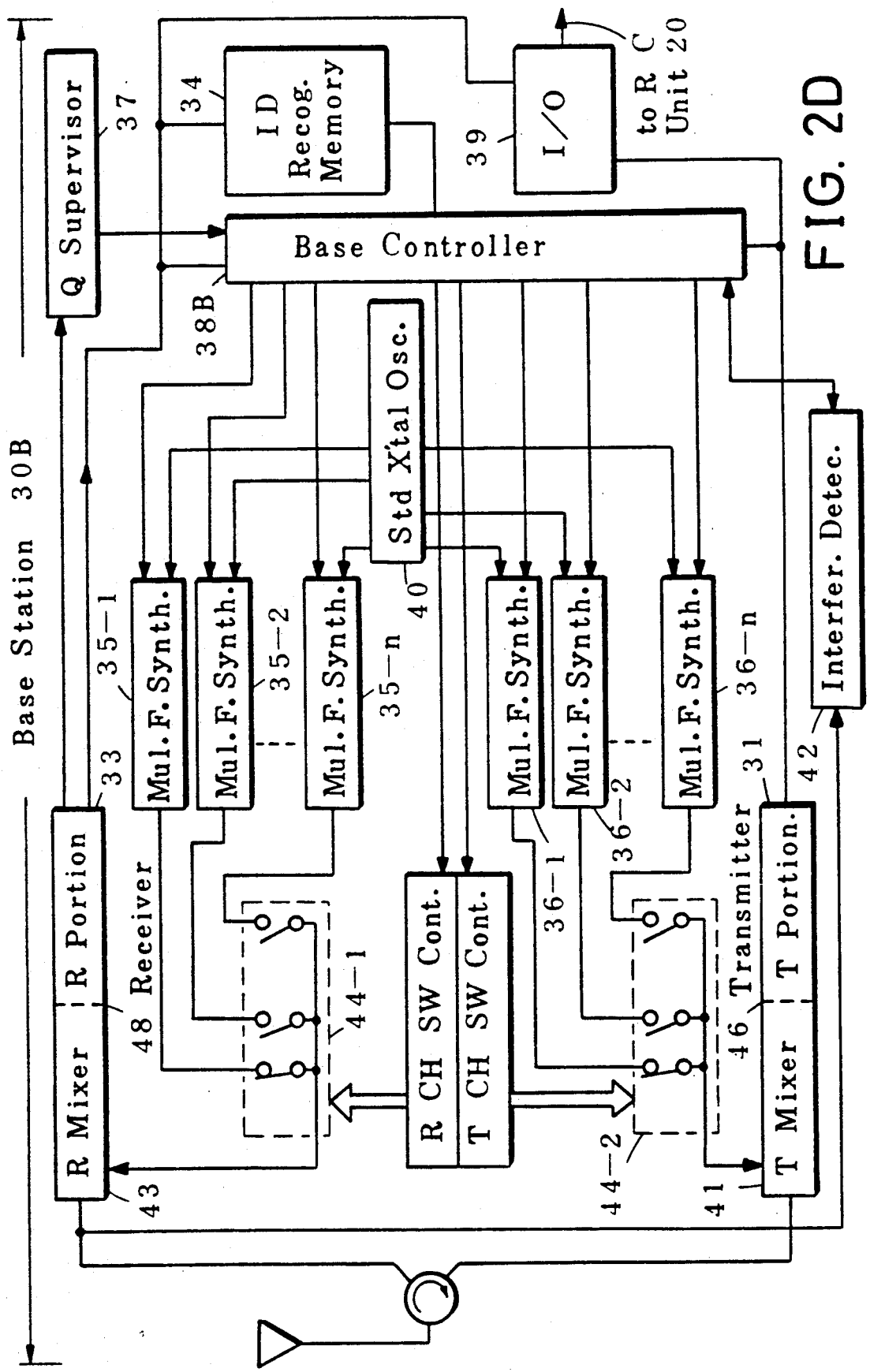
FIGS. 2D and 2E are circuit block diagrams showing other examples of the base stations according to the present invention.

FIG. 2D shows another example 30B of one base station 30 (e.g., 30-1) which may communicate with the mobile unit 50. The arrangement of the base station 30B is substantially the same as that of the mobile unit 50 shown in FIG. 2B. The base station 30B differs from the mobile unit 50 only in the following points. The base station 30B is not provided with the ID roam area information memory 54 (see FIG. 2B) but has an ID recognition memory 34 for recognizing and storing the ID number of this base station 30 and the other party's ID number and a quality supervisor 37 which constantly supervises the speech quality during communication and informs the base controller 38 of deterioration of the speech quality when detecting it. The base station 30 has no telephone unit 59 (see FIG. 2B) but is provided with an interface 39 to the radiotelephone control unit 20 instead.

Constituent elements shown in FIG. 2D which correspond to those shown in FIG. 2B are listed below, but description of the function of each constituent element is omitted. The numerals in the parentheses are the reference numerals of the corresponding constituent elements shown in FIG. 2B.

Transmitting portion 31 (51)
Receiving portion 33 (53)
Multi-frequency synthesizers 35-1 to 35-n (55-1 to 55-n)
Multi-frequency synthesizers 36-1 to 36-n (56-1 to 56-n)
Base controller 38B (58)
Standard crystal oscillator 40 (71)
Transmitting mixer 41 (61)
Interference detector 42 (62)
Receiving mixer 43 (63)
Transmitter 46 (66)
Receiver 48 (68).

Figure 2E:
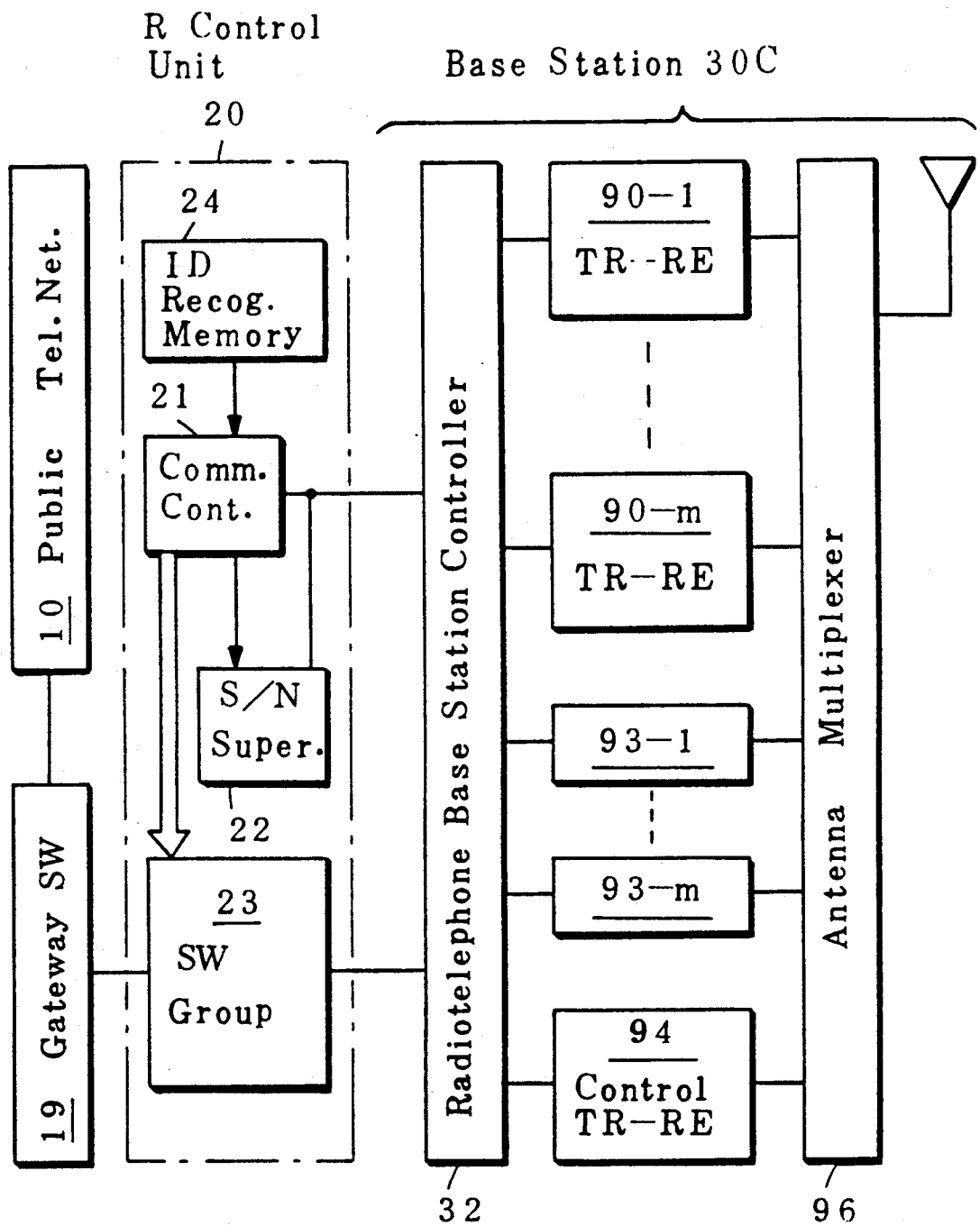

FIG. 2E shows still another example of the base station 30. The base station 30C includes a plurality of transmitter-receivers. More specifically, the base station 30C has a large number of transmitter-receivers 90-1 to 90-m for speech (communication) which share an antenna multiplexer 96 and a radiotelephone base station controller 32 with each other, m quality supervisory receivers 93-1 to 93-m having the functions of both the receiver 48 and the quality supervisor 37, which are shown in FIG. 2D, and a control transmitter-receiver 94 used exclusively for a control channel for control signals. The base station 30C is connected to the public telephone network 10 via the radiotelephone control unit 20 and the gateway switch office 19.

Figure 2F:
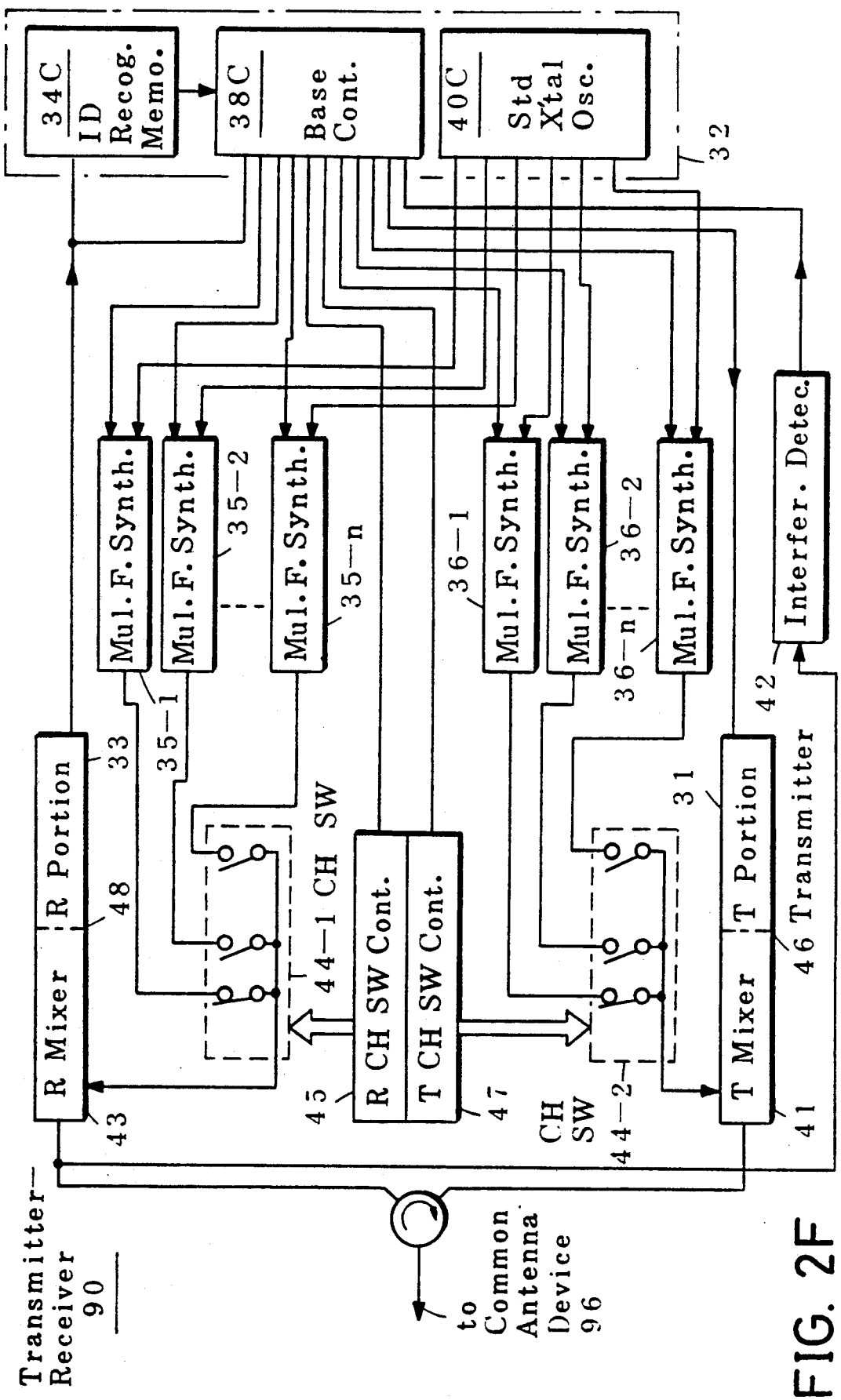
FIG. 2F is a circuit block diagram showing one example of the transmitter-receivers employed in the present invention.

FIG. 2F shows the arrangement of one transmitter-receiver 90 among the transmitter-receivers 90-1 to 90-m employed in the base station 30C shown in FIG. 2E. FIG. 2F also shows the connection between the transmitter-receiver 90 on one hand and, on the other, an ID recognition memory 34C, a base controller 38C and a standard crystal oscillator 40C, which are included in the radiotelephone base station controller 32.

The transmitter-receiver 90 shown in FIG. 2F has substantially the same arrangement as that of the base station 30B shown in FIG. 2D. More specifically, a large number of transmitter-receivers 90 share the ID recognition memory 34C, the base controller 38C and the standard crystal oscillator 40C with each other.

Since the transmitter-receivers 90-1 to 90-m shown in FIG. 2E have the arrangement shown in FIG. 2F, if particular multi-frequency synthesizers are selected respectively from the two groups of multi-frequency synthesizers 35-1 to 35-n and 36-1 to 36-n by the changeover switches 44-1 and 44-2, the base station 30C shown in FIG. 2E can transmit and receive through m channels at the same time.

If the changeover switches 44-1 and 44-2 of the transmitter-receiver 90 are operated so as to chop the multi-frequency synthesizers 35-1 to 35-n and 36-1 to 36-n at high speed and thereby repeatedly switch over them from one to another, it is possible to transmit and receive n channels at the same time with a single transmitter-receiver 90. Accordingly, the base station 30C shown in FIG. 2E can transmit and receive a maximum of m×n channels at the same time.

Figure 2G:
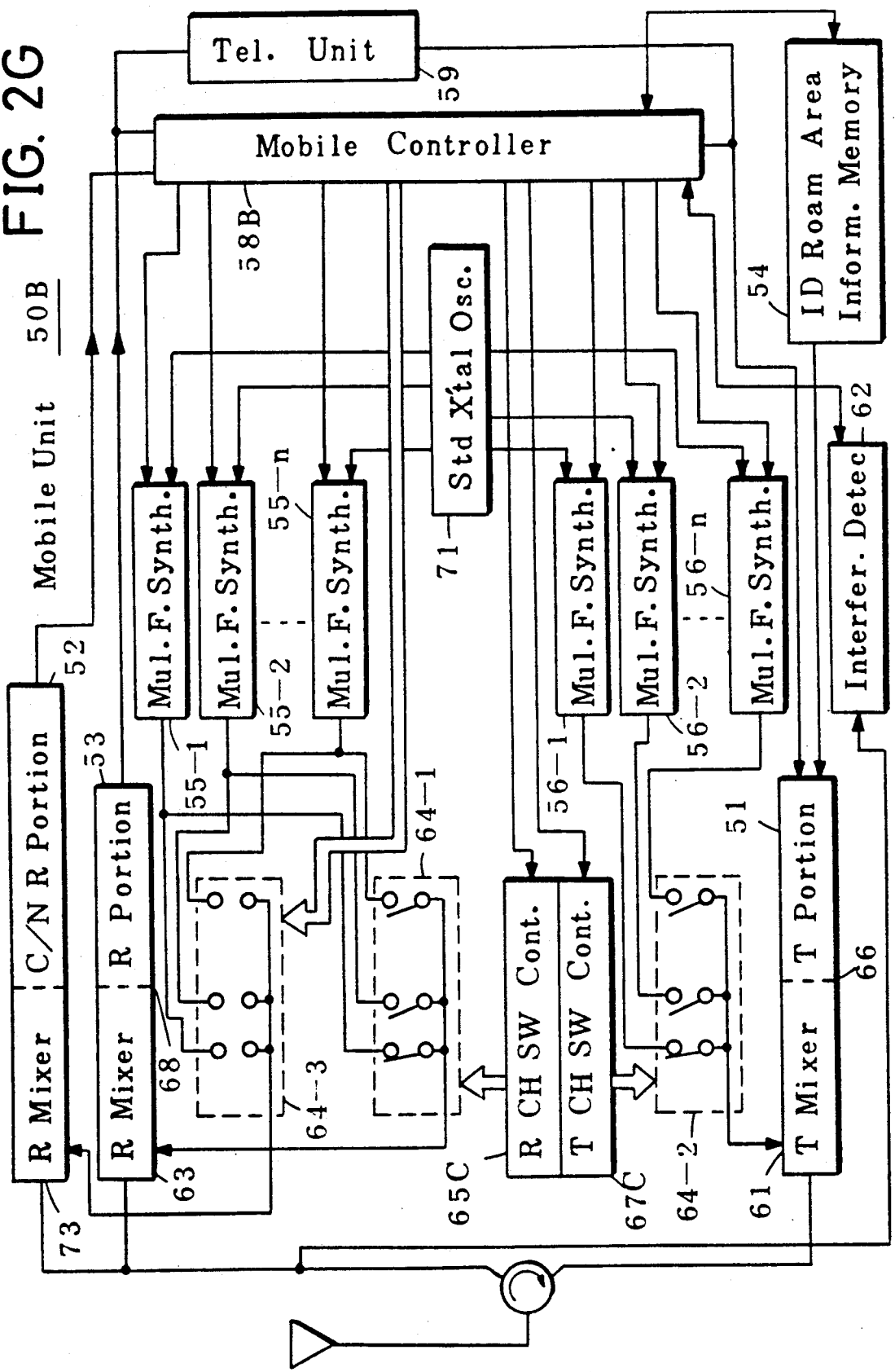
Figure 21:
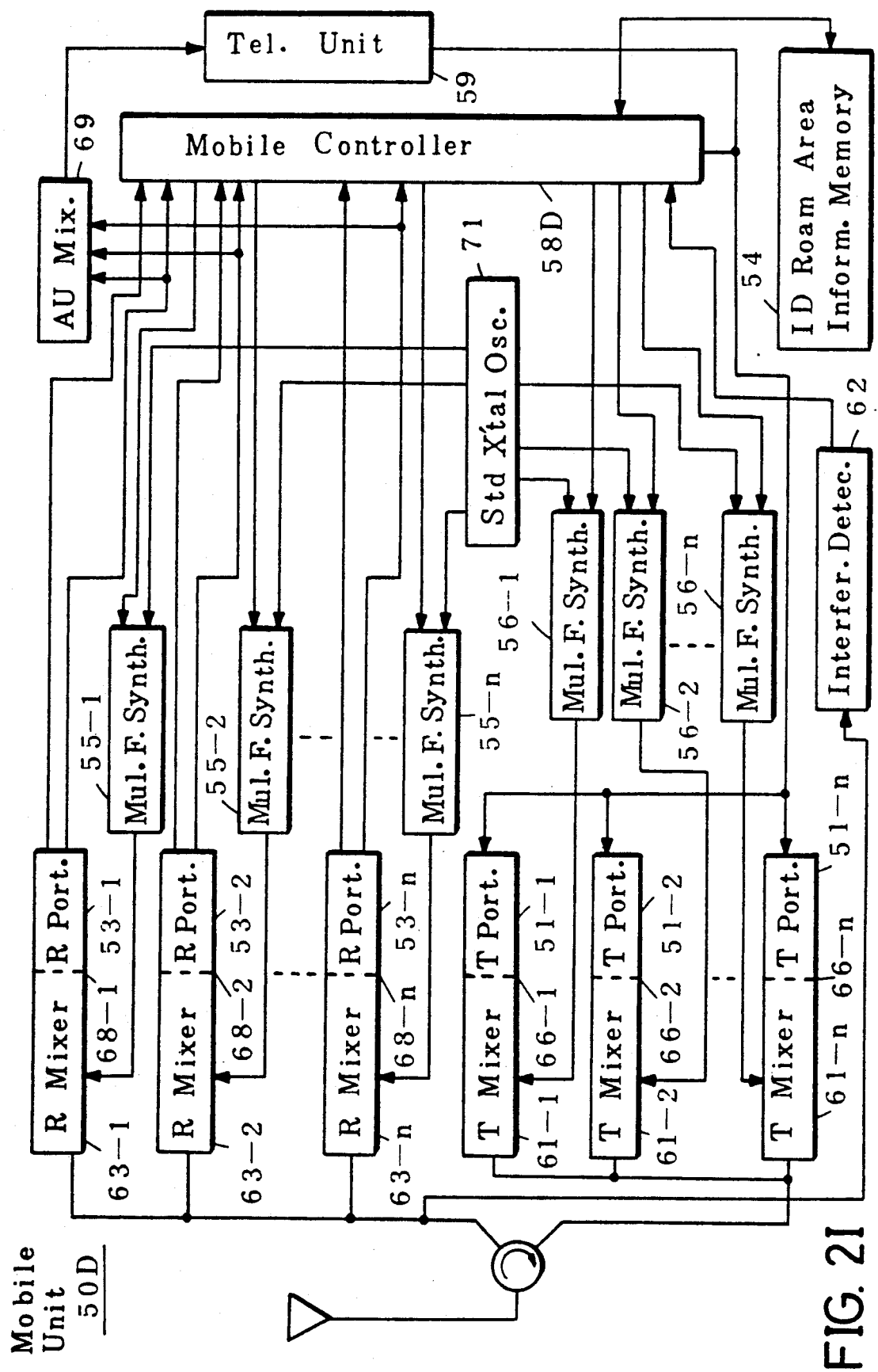

FIG. 2G shows another example of the mobile unit 50.

The mobile unit 50B shown in FIG. 2G differs from the mobile unit 50 shown in FIG. 2B in the following points. The mobile unit 50B is provided with a receiving mixer 73 and a C/N receiving portion 52 in addition to the receiver 68 including the receiving mixer 63 and the receiving portion 53. Both the receiving mixers 63 and 73 are supplied with the outputs of the multi-frequency synthesizers 55-1 to 55-n through changeover switches 64-1 and 64-3 which are controlled by a receiving channel switching controller 65C and a mobile controller 58B, respectively. The transmitting mixer 61 is supplied with the outputs of the multi-frequency synthesizers 56-1 to 56-n through the changeover switch 64-2 controlled by the transmitting channel switching controller 67C.

The mobile unit 50B shown in FIG. 2G has particularly marked receiving diversity effect. The receiving mixer 73 is supplied with a part of the receiving signal received through the antenna of the mobile unit 50B. The output of each of the multi-frequency synthesizers 55-1 to 55-n is applied to the receiving mixer 73 through the changeover switch 64-3 as being a local oscillation frequency. Unlike the other changeover switches 64-1 and 64-2, the changeover switch 64-3 need not be switched at high speed. It suffices to switch it at low switching frequency, for example, about 10 Hz. When the changeover switch 64-3 is at a position where the output of the multi-frequency synthesizer 55-1 is available, the C/N value (the value of carrier-to-noise ratio) for the channel CH1 measured in the C/N receiving portion 52 is transferred to the mobile controller 58B. When the changeover switch 64-3 is at a position where the output of the multi-frequency synthesizer 55-2 is available, the C/N value for the channel CH2 is measured. In this way, a similar operation is conducted successively. More specifically, when the changeover switch 64-3 is at a position where the output of a multi-frequency synthesizer 55-n is available, the C/N value for a channel CHn is measured and transferred to the mobile controller 58B. The mobile controller 58B controls the switching frequency of the receiving channel switching controller 65C and the transmitting channel switching controller 67C using the transferred values so that each of the controllers 65C and 67C operates, for example, at a speed which is inversely proportional to the C/N values.

A system which is arranged so as to enhance the receiving diversity effect will next be explained. FIG. 2H shows the arrangement of a mobile unit 50C with enhanced receiving diversity effect.

Referring to FIG. 2H, an input radio wave (i.e., input signal) to the mobile unit 50C is divided into n equal portions in the antenna input section, and the n divided input signals are received by receivers 68-1, 68-2, . . . 68-n, respectively. The receivers 68-1 to 68-n respectively have receiving mixers 63-1, 63-2, . . . 63-n and receiving portions 53-1, 53-2, . . . 53-n. The receiving mixers 63-1 to 63-n are supplied with local oscillation frequencies from the multi-frequency synthesizers 55-1, 55-2, . . . 55-n, respectively.

Thus, the arrangement shown in FIG. 2H does not include the changeover switch 64-1 shown, for example, in FIG. 2B but enables signals transmitted through the channels CH1, CH2, . . . CHn to be received and demodulated at all times. One part of the output signal from each of the receiving portions 53-1 to 53-n is sent to the mobile controller 58C, while the other part of the output signal is applied to a mixer 69 where it is processed in the same way as in the case of the ordinary diversity receiver (in this case, mixing is effected after detection), and the processed signal is then sent to the telephone unit 59.

FIG. 2I shows a mobile unit 50D which is different from the mobile unit 50C shown in FIG. 2H in the following points. The mobile unit 50D has n transmitters 66-1 to 66-n respectively including transmitting mixers 61-1 to 61-n and transmitting portions 51-1 to 51-n. A signal which is to be transmitted is applied in common to the transmitting portions 51-1 to 51-n. The outputs of the multi-frequency synthesizers 56-1 to 56-n each controlled by a mobile controller 58D so as to generate a designated frequency are applied to the transmitting mixers 61-1 to 61-n, respectively. The mobile unit 50D can continuously transmit a plurality of channels without the need to chop the synthesizers 56-1 to 56-n by means of the changeover switch 64-2 as in the case of the mobile unit 50C (see FIG. 2H).

A circuit configuration such as those shown in FIGS. 2H and 2I enables enhanced diversity effect to be obtained.

The signal for control between the mobile unit 50 (B, C or D), the base station 30 (B or C) and the radiotelephone control unit 20 is transmitted through either a control channel used exclusively for a control signal or a channel which is out of the band for the communication (speech) signal.

Figure 3A:
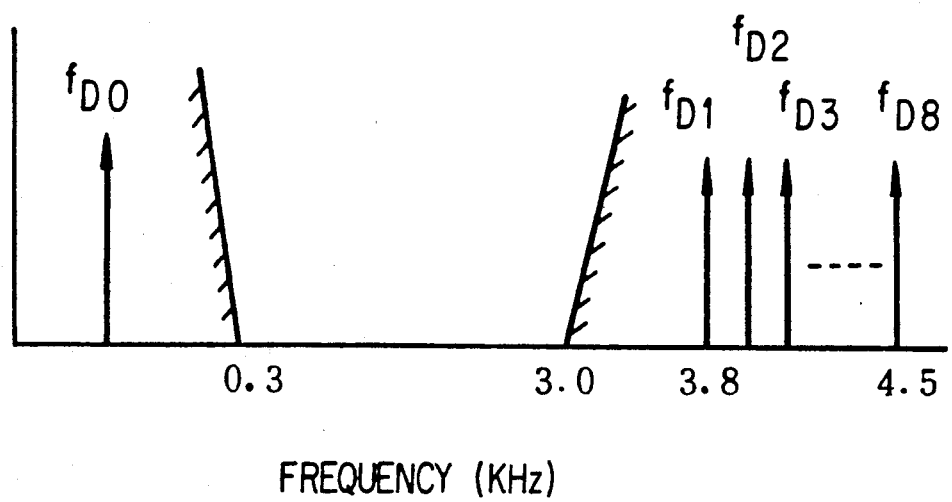
FIGS. 3(a) and 3(b) are a spectrum chart and a circuit block diagram, respectively, employed to describe one example of the arrangement of control signals used in the present invention.

More specifically, to transmit the control signal through a channel which is out of the band for the communication (speech) signal, when an analog signal is employed as a control signal, frequencies which are out of the speech channel band, i.e., from 0.3 to 3.0 kHz, that is, a relatively low frequency $f_{D0}$ (e.g., about 100 Hz) or relatively high frequencies $f_{D1}$, $f_{D2}$, $f_{D3}$ . . . $f_{D8}$ (e.g., 8 waves of from 3.8 kHz to 4.5 kHz at intervals of 0.1 kHz) may be employed as shown in FIG. 3(a).

When the number of items which are to be controlled, that is, control data, is large, the number of waves for control may be increased, or a subcarrier form may also be adopted. It is also possible to transmit a larger number of control data by, for example, frequency-modulating or amplitude-modulating one or more of the waves $f_{D0}$ to $f_{D8}$.

Figure 3B:
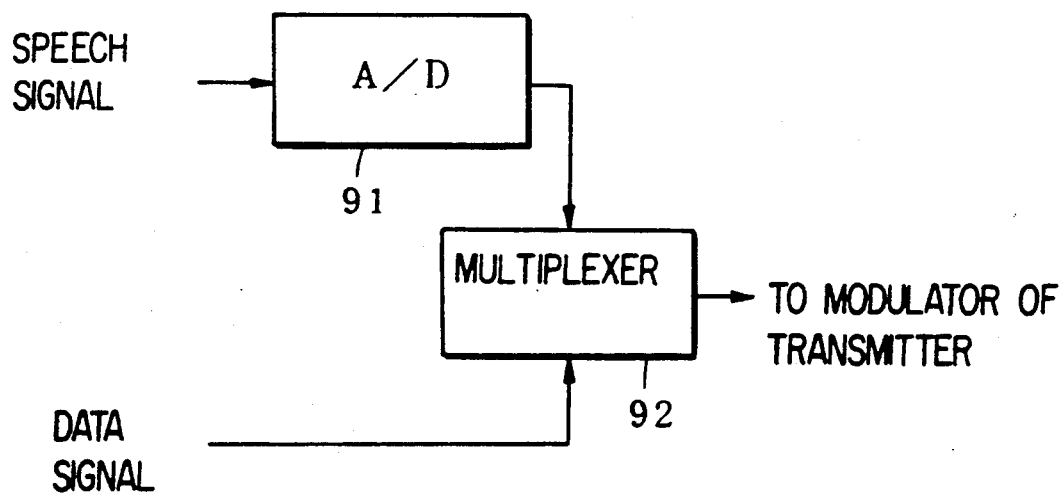

When a digital data signal is employed as a control signal, the speech signal may also be digitized so as to transmit the two digital signals by time-division multiplex, as shown in FIG. 3(b). FIG. 3(b) shows one example of the arrangement wherein a speech signal is digitized through an A/D converter 91 and combined with a data signal in a multiplexer 92 and the output of the multiplexer 92 is applied to a modulator in the transmitter 31.

The respective functions of the mobile unit 50 (B, C or D), the base station 30 (B or C) and the radiotelephone control unit 20 will next be explained successively.

A. Function of the mobile unit 50 (B, C or D)

Among the functions of the mobile unit 50 (B, C or D), the functions of the mobile controller 58 (B, C or D) will first be explained. The mobile controller 58 (B, C or D) has the following basic functions:

i) The mobile controller 58 (B, C or D) instructs the transmitter 66 of the mobile unit 50 (B, C or D) to which it belongs to initiate or suspend transmission of a radio wave and controls the transmitting power level.

ii) The mobile controller 58 (B, C or D) instructs the receiver 68 of the mobile unit 50 (B, C or D) to which it belongs to initiate or suspend reception of radio waves.

iii) It gives the telephone unit 59 a dial signal transmission permitting instruction and speech transmitting and receiving instructions.

iv) It gives an oscillation frequency (channel) instruction, an oscillation start instruction and an oscillation suspend instruction to the multi-frequency synthesizers 55-1 to 55-n and 56-1 to 56-n.

v) It controls the receiving and transmitting channel switching controllers 65C and 67C.

vi) It changes one or more service channels in accordance with an instruction from the radiotelephone control unit 20.

vii) It requests the radiotelephone control unit 20 to change a service channel on the basis of information delivered from the interference detector 62.

viii) It confirms the ID of the other party on the basis of information from the ID roam area information memory 54.

ix) It transfers a speech channel to a higher-rank mobile unit in terms of the kind of service on the basis of an instruction from the radiotelephone control unit 20.

x) It determines on/off duty conditions for the receiving and transmitting channel switching controllers 65C and 67C.

xi) The mobile controller 58 (B, C or D) estimates a direction and speed of movement of the mobile unit 50 (B, C or D) to which it belongs on the basis of a report from the radiotelephone control unit 20.

The mobile controller 58 (B, C or D) can have the following applied functions by using the functions i) to xi) in combination.

1) A radio channel which is being used by another mobile unit which is in operation in the vicinity of the mobile unit 50 (B, C or D) to which the mobile controller 58 (B, C or D) belongs or a radio channel which is being used by another base station is stored in the ID roam area information memory 54 so as to be used when a call is originated or when a communication channel is switched over to another.

2) Using the functions i), vi) and vii), the mobile controller 58 (B, C or D) sets an optimal transmitting level for the mobile unit 50 (B, C or D) to which it belongs.

3) As one application of the function 2), an optimal signal speed is determined for transmission of a digital signal.

4) It is possible to determine an optimal service channel in accordance with the kind of communication (i.e., telephone, FAX, data communication, etc.).

5) The operation of channel hand-off during communication can be effected without instantaneous speech disconnection.

B. Functions of the base station 30 (B or C)

Devices having the following functions are set in each base station 30.

a) In each base station are set a transmitter-receiver used exclusively for transmission and reception through a small number (one in general) of control channels and a number of transmitter-receivers used exclusively for speech channels which corresponds to the number of speech channels allotted to each base station. For example, in the case of the base station 30C shown in FIG. 2E, the number of speech channels allotted thereto is optimized on the basis of the speech traffic of mobile units 50 (B or C) which are present in a small zone which is covered by the base station 30C. When the area of the zone is large and the number of mobile units present in the area is large, the speech traffic increases inevitably; in such a case, at least one control channel and a plurality of speech channels are needed and a plurality of transmitter-receivers 90 (see FIG. 2F) are also needed. In the case of mobile telephone systems of NTT for big cities, there are examples where two control channels and a maximum of about 60 speech channels are allotted to each base station.

However, as each zone decreases in size and eventually becomes an extremely small zone with a radius of about 25 m–100 m as shown in the above-mentioned literature, Ito "Proposal of Portable Telephone System", Material No. CS-86-88 at a meeting for the study of communication system of Japan Society of Communication, November 1986, there are cases where a base station which is in charge of such an area as a service area is allotted one radio channel for each of the control and speech purposes from the viewpoint of the speech traffic, system and cost and is provided with a single transmitter-receiver. More specifically, a single transmitter-receiver is used for both the control and speech purposes (see FIG. 2D). However, in the present invention the transmitter-receiver is not simply used for both the control and speech purposes as in the case of the conventional system wherein, when a call is originated from a mobile unit, the transmitter-receiver first responds to this call through the control channel and, after having designated an idle speech channel, the transmitter-receiver itself also changes the control channel for the speech channel to execute communication with the same mobile unit. As will be described later in detail, the present invention features the function whereby radio frequencies for transmission and reception are repeatedly switched between the speech and control channels at such a switching speed tha the signal is not disturbed even during communication with one mobile unit using the speech channel, thereby enabling acceptance of an outgoing call from or an incoming call to another mobile unit 50 (B, C or D) and permitting it to perform telephone communication.

As has been described above, the base station 30 (B or C) may have various arrangements and the present invention is applicable to all of them.

It should be noted that FIG. 2A shows only a pair of transmitting and receiving portions 31 and 32 of the base station 30 and illustration of the other constituent elements is omitted.

b) It is a matter of course that a transmitter-receiver used exclusively for a speech channel which is installed in each base station 30 (B or C) is capable of receiving one of a plurality of radio channels allotted to the base station. However, in a zone wherein the traffic varies sharply, one transmitter-receiver 90 installed in the base station 30C (see FIG. 2E) is arranged as shown in FIG. 2F. More specifically, the portions that transmit and receive radio signals are arranged in substantially the same way as in the case of the mobile unit 50 shown in FIG. 2B.

In consequence, even in a base station 30C wherein m transmitter-receivers 90 are installed so as to serve for communications usually effected using m channels, when a number of channels which is larger than m are needed as a result of an increase in the speech traffic in this zone, one transmitter-receiver 90 that constitutes the base station 30C is instructed with a control signal delivered from the base controller 38C in the base station 30C to activate the multi-frequency synthesizers 35-2, 35-3, . . . 35-n and 36-2, 36-3, . . . 36-n and the changeover switches 44-1 and 44-2 in addition to the multi-frequency synthesizers 35-1 and 36-1 which are in operation. In this way, a base station which has heretofore been capable of transmitting and receiving using m channels is now enabled to transmit and receive a maximum of m×n channels. Thus, the number of channels usable at the same time is increased considerably.

It is, however, necessary to pay attention to the fact that the transmitting power of each channel decreases in accordance with an increase in the number of channels to be switched unless a power amplifier is connected to the output end of the mixer 61. In addition, the total number of channels given to the system reaches the upper limit. When the use of all the channels gives rise to interferences to channels used in other zones, the number of usable channels is limited to a number below the upper limit. It is also a matter of course that the signal band must be limited so that there is no overlap between communication signals transmitted through different channels in the base band frequency band.

The base station 30B shown in FIG. 2D has only a pair of transmitter and receiver. In a system wherein the pair of transmitter and receiver is used for both control and speech channels, radio frequencies for transmission and reception are repeatedly switched between the speech and control channels at such a switching speed that the signal is not disturbed even during communication with a mobile unit 50 (B, C or D) using the speech channel in the same way as the above, thereby enabling acceptance of an outgoing call from or an incoming call to another mobile unit 50 (B, C or D) and permitting telephone communication of another mobile unit which has priority over the mobile unit which is presently in communication by transferring the channel to the new mobile unit.

The base station 30 will be further explained below with reference to FIG. 2F. It should be noted that the functions of the base stations 30 and 30B respectively shown in FIGS. 2C and 2D are substantially the same as those of the base station 30.

The base controller 38C has the following basic functions:

i) The base controller 38C instructs the transmitting portion 31 included in the base station 30C to which it belongs to initiate or suspend transmission of radio waves and controls the transmitting power level.

ii) The base controller 38C instructs the receiving portion 33 included in the base station 30C to which it belongs to initiate or suspend reception of radio waves.

iii) It gives the radiotelephone control unit 20 a dial signal transmission permitting instruction and speech transmitting and receiving instructions.

iv) It gives an oscillation frequency (channel) instruction, an oscillation start instruction and an oscillation suspend instruction to the multi-frequency synthesizers 35-1 to 35-n and 36-1 to 36-n.

v) It controls the receiving and transmitting channel switching controllers 45 and 47.

vi) It judges whether or not a channel which is being used should be changed for another on the basis of information from the quality supervisory receivers 93-1 to 93-m and also judges whether or not quality information should be transferred to the mobile unit 50 (B, C or D) concerned.

vii) It judges whether or not a channel which is being used should be changed for another on the basis of information from the interference detector 42.

viii) It confirms the ID of the other party on the basis of information from the ID recognition memory 34C and determines a channel which is to be used.

ix) It effects control such that the communication with a mobile unit 50 (B, C or D) which is presently in communication is finished early or immediately on the basis of a request from a higher-rank mobile unit in terms of the kind of service.

x) It determines on/off duty conditions for the receiving and transmitting channel switching controllers 45 and 47.

xi) In regard to decision in control, the base controller 38C ranks above a mobile unit 50 (B, C or D) but below the radiotelephone control unit 20. This means that, in regard to judgement in control, when the judgement made by the base controller 38C is different from that made by the mobile unit 50 (B, C or D), the former has priority over the latter, but the base controller 38C must transfer the initiative to the radiotelephone control unit 20 when these are different from each other in the judgement. However, the function xi) is set due to the convenience of description; in an actual system, the base station 30C or the mobile unit 50 (B, C or D) may take the initiative.

vii) As has already been described in a) and b), a mobile unit wherein a single transmitter-receiver is used for both speech and control purposes has a plurality of multi-frequency synthesizers 35-1 to 35-n and 36-1 to 36-n as shown in FIG. 2D in the same way as in the case of the mobile unit 50 (B, C or D) described in (A) so that radio frequencies for transmission and reception are repeatedly switched between the speech and control channels at such a switching speed that the signal is not disturbed, thereby enabling acceptance of an outgoing call from or an incoming call to another mobile unit 50 (B, C or D) and permitting it to perform telephone communication.

The base controller 38C can have the following applied functions by using the functions i) to xii) in combination.

1) A radio channel which is being used by another base station or another mobile unit which is in operation in the vicinity of the base station 30C to which the base controller 38C belongs is stored in the ID recognition memory 34C so as to be used when a call is originated or when a communication channel is switched over to another.

2) As one application of the functions x) and xi), the base controller 38C suppresses origination of calls, disconnects a channel being used or recommends the telephone communication to be finished early when the traffic is congested.

3) Using the functions i), vi) and vii), the base controller 38C sets an optimal transmitting level for the base station 30C to which it belongs.

4) As one application of the function 3), the base controller 38C determines an optimal signal speed for the transmission of a digital signal.

5) The base controller 38C determines an optimal channel to be used in accordance with the kind of communication (telephone, FAX, data communication, etc.).

The followings are control functions performed when a mobile unit 50 (B, C or D) which is engaged in communication moves into another zone:

6) When the radiotelephone control unit 20 which receives receiving quality data decides the base station 30C to be selected as a new base station 30C on the basis of a signal from a mobile unit 50 (B, C or D) which requests channel hand-off during communication, the base controller 38C initiates communication with the mobile unit 50 (B, C or D).

7) At the request of a mobile unit 50 (B, C or D), the base controller 38C requests the radiotelephone control unit 20 to switch the speech path switch group 23 and allow parallel use of speech paths.

8) The base controller 38C stores the ID and speech channel number of the mobile unit 50 (B, C or D) which has been in communication for a predetermined period of time after the operation of channel hand-off has been carried out.

9) On the basis of information from each base station 30 (B or C) receiving a position registration signal (using a control channel) from a mobile unit 50 (B, C or D), the base controller 38C stores the ID (identification information) of the mobile unit 50 (B, C or D) in the ID recognition memory 24 through the communication controller 21 included in the radiotelephone control unit 20. In this case, since in the present invention position registration requests are made from a plurality of base stations 30 (B or C), the level of quality (decibel value for S/N, C/N or the like) of the signal received by the mobile unit 50 (B, C or D) is stored together with the ID.

10) On the basis of information from each base station 30 (B or C) receiving an originating call signal (using a control channel) from a mobile unit 50 (B, C or D), the base controller 38C detects a base station 30 (B or C) the receiving signal quality of which is the best or the next best or detects a direction and speed of movement of the mobile unit 50 (B, C or D) to select a base station 30 (B or C) in a new zone into which the mobile unit 50 (B, C or D) is expected to move. For this operation, the base controller 38C informs the radiotelephone control unit 20 of the channel number of a speech channel which is to be used for the communication with the mobile unit 50 (B, C or D) and which is not used at that time among the radio channels allotted to the relevant base station 30 (B or C) and the base controller 38C asks the radiotelephone control unit 20 for an instruction. With respect to a base station 30 (B or C) the communication quality of which has deteriorated, the base controller 38C delivers an instruction signal to suspend the communication with a mobile unit 50 (B, C or D) on the basis of an instruction from the radiotelephone control unit 20.

C. Functions of the radiotelephone control unit 20

As shown in FIG. 2A, the radiotelephone control unit 20 has various functions such as setting up and release of a speech (communication) channel between a mobile unit 50 (B, C or D), a base station 30 (B or C), the radiotelephone control unit 20, the gateway switch office 19 and the public telephone network 10 (a telephone subscriber) and revision of the position registration as well as execution of speech (communication) channel hand-off, which are needed when the mobile unit 50 (B, C or D) moves from one zone to another. More specifically, the radiotelephone control unit 20 has various functions such as those shown in FIG. 2A. The functions of the radiotelephone control unit 20 will be explained below.

a) On the basis of information from each base station 30 (B or C) receiving a position registration signal (using a control channel) from a mobile unit 50 (B, C or D), the radiotelephone control unit 20 stores the ID (identification information) of the mobile unit 50 (B, C or D) in the ID recognition memory 24 through the communication controller 21. At this time, in the present invention position registration requests are made from a plurality of base stations 30 (B or C); therefore, the ID's of the base stations 30 (B or C) and the levels of quality (decibel values for S/N, C/N or the like) of signals received by the base stations 30 (B or C) are also stored in addition to the ID of the mobile unit 50.

b) On the basis of information from each base station 30 (B or C) receiving an originating call signal (using a control channel) from a mobile unit 50 (B, C or D), the radiotelephone control unit 20 selects a base station 30 (B or C) the receiving signal quality of which is the best or the next best. For the selected base station 30 (B or C), the radiotelephone control unit 20 designates a speech channel which is to be used for the communication with the mobile unit 50 (B, C or D) and which is not used at that time among the radio channels allotted to the relevant base station 30 (B or C) and delivers an instruction signal to the other base stations 30 (B or C) so as to suspend the communication with the mobile unit 50 (B, C or D).

c) The radiotelephone control unit 20 activates switches in the switch groups 23 which are to be switched in connection with origination of a call from the mobile unit 50 (B, C or D) described in b). When the called subscriber is included in the telephone network 10, the control unit 20 transfers information required to set up a speech path between the mobile unit 50 (B, C or D) and the called subscriber to the gateway switch office 19.

d) When an incoming call signal to a mobile unit 50 (B, C or D) is transmitted to the radiotelephone control unit 20 through the gateway switch office 19 from a calling subscriber included in the telephone network 10, the radiotelephone control unit 20 activates switches in the switch group 23 which are to be switched through the communication controller 21 and also confirms the current position of the called mobile unit 50 (B, C or D) by retrieving the ID recognition memory 24.

e) In connection with an incoming call signal to a mobile unit 50 (B, C or D) described in d), the radiotelephone control unit 20 instructs a call signal to be sent to base stations 30 (B or C) covering a zone where the current position of the called mobile unit 50 (B, C or D) has been registered. The call signal is first sent to all the base stations 30 (B or C) where the current position of the mobile unit 50 (B, C or D) has been registered and then each base station 30 (B or C) receiving the call signal sends an incoming call signal to the mobile unit 50 (B, C or D) at the same time using a down control channel. The incoming call signals are, however, not necessarily sent at the same time, but the base stations 30 (B or C) may send them successively in a time-series manner. In other words, it is only necessary to take a measure to avoid interferences due to the time coincidence between the signals.

f) After the mobile unit 50 (B, C or D) has initiated a radio communication, the radiotelephone control unit 20 approves execution of transmitting and receiving diversity and instructs the mobile unit 50 (B, C or D) to execute it in the case where the communication traffic circumstances in the system allow the execution of the diversity.

g) In connection with the mobile unit 50 (B, C or D) which is executing the transmitting and receiving diversity, if the traffic becomes congested or an important subscriber originates a call or a subscriber desires a wide-band signal service during this time, the radiotelephone control unit 20 decreases the degree of multiplex (i.e., the number of channels used) in the transmitting and receiving diversity or decides the diversity to be suspended and executes the suspension of it.

h) With the contents of the paragraphs a) to e), when the quality of communication between a mobile unit 50 (B, C or D) and a base station 30 (B or C) has deteriorated due to movement of the mobile unit 50 (B, C or D) within the same cell or from one cell to another, the radiotelephone control unit 20 instructs a communication (speech) channel hand-off operation to be executed. It should be noted that it is necessary in order to execute the channel hand-off operation to send a control signal to the relevant base station 30 (B or C) and this instruction (control signal) is sent using a frequency band either above or below the speech signal, as shown in FIG. 3(a).

i) The radiotelephone control unit 20 measures a change in the receiving quality at each of the base stations 30 (B or C) engaged in communication caused by the movement of the mobile unit 50 (B, C or D), thereby estimating a direction and speed of movement of the mobile unit 50 (B, C or D) and synthetically judging traffic conditions (i.e., speech channel using conditions) at base stations 30 (B or C) which are located in the direction of movement of the mobile unit 50 (B, C or D). If necessary, the radiotelephone control unit 20 decreases or increases the degree of multiplex in the transmitting and receiving diversity carried out at the mobile unit 50 (B, C or D) which is in communication with these base stations 30 (B or C).

The operation of the entire system will be explained below item by item:

(1) Position registration
(2) Operation of originating a call
(3) Operation of receiving an incoming call (4) Application of diversity when the traffic is not congested (5) Operation of channel hand-off during communication (6) Estimation of a direction and speed of movement of a mobile unit and allotment of speech channels to cope with traffic congestion (7) Concerning lowering in the switching frequency for repeated switching employed, for example, in the operation of channel hand-off during communication.

(1) Position registration

In a home area where a mobile unit 50 (B, C or D) is generally stationed or in a roam area which is an area within a service area other than the home area, when the power switch of the mobile unit 50 (B, C or D) is turned on to start the operation when the radiotelephone control unit 20 and base stations 30-1 to 30-n in the vicinity of the mobile unit 50 (B, C or D) have already been activated, the position registering operation is first executed. The position registering operation will next be explained with reference to FIGS. 4A and 4B which show the flow of the operation.

Figure 4A:
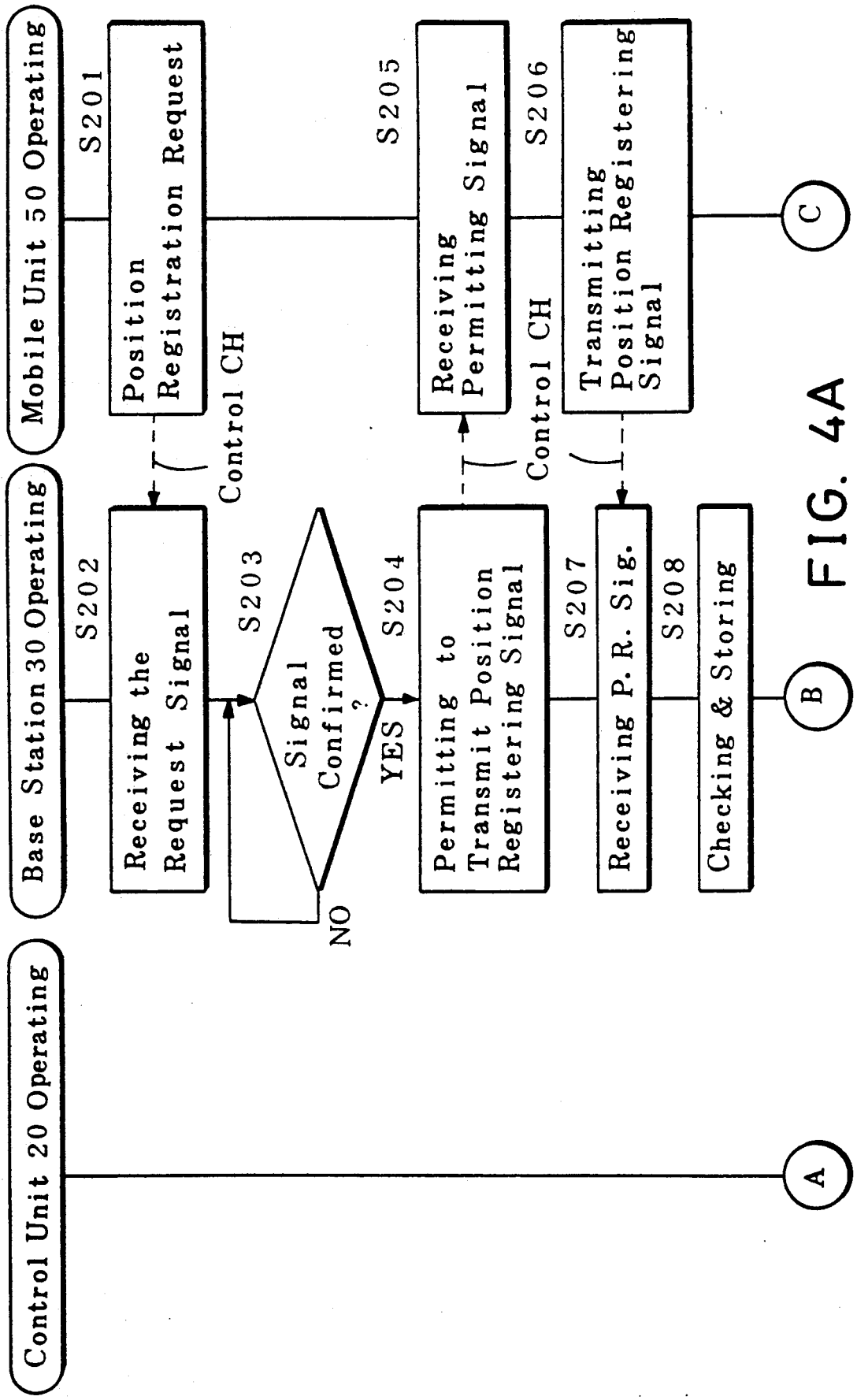
FIGS. 4A and 4B are flowcharts showing the flow of the position registration operation according to the present invention.
Figure 4B:
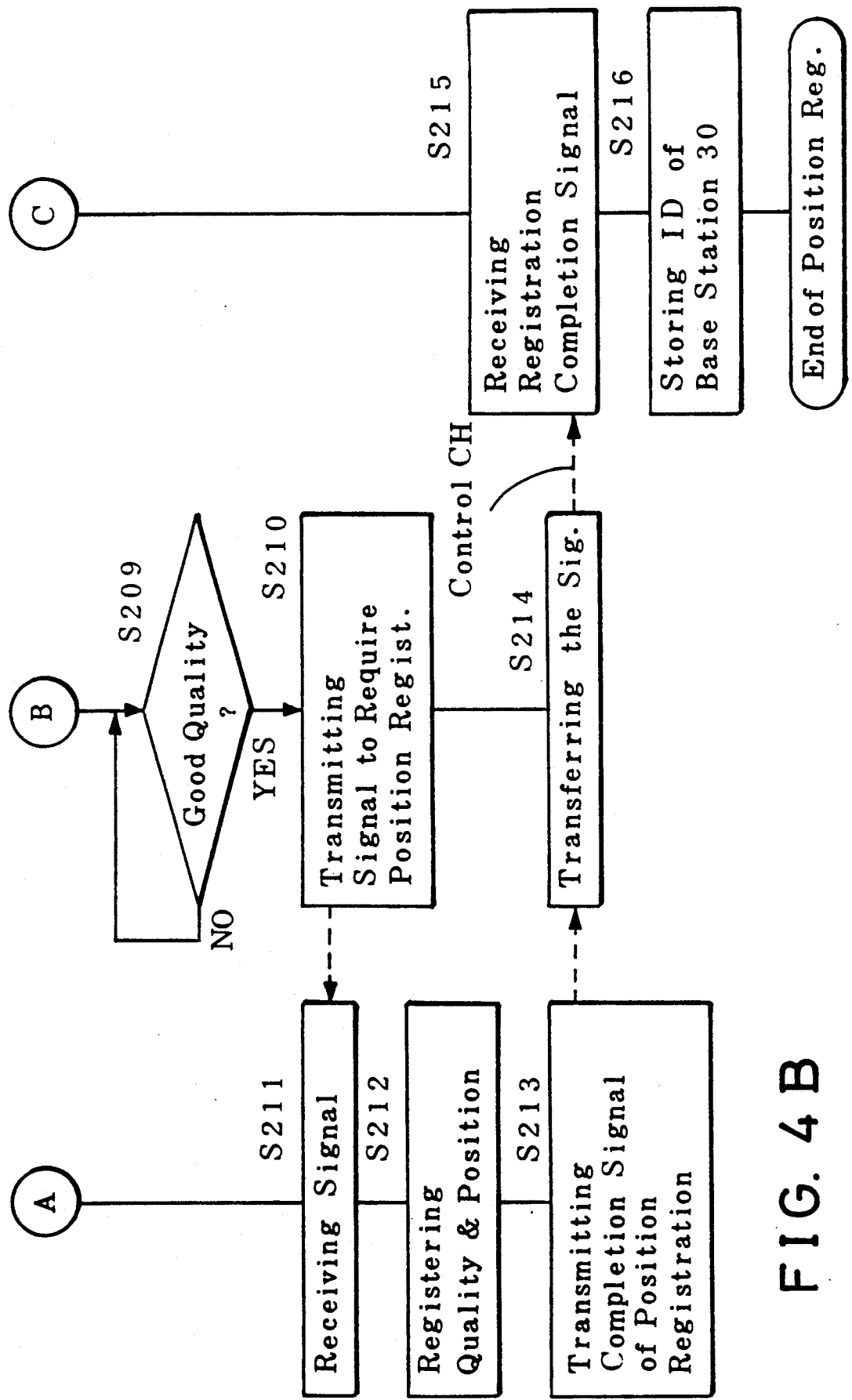

When the power switch of the mobile unit 50 (B, C or D) is turned on, a signal to request registration of the current position is transmitted to surrounding base stations, for example, base stations 30-1 to 30-n, using an up control channel (CH) (S201 shown in FIG. 4A).

Receiving the request signal from the mobile unit 50 (B, C or D) (S202), each base station 30 confirms the request signal from the mobile unit 50 (B, C or D) (S203). If the signal is confirmed (i.e., if YES is the answer in S203), the base station 30 turns on a down control channel when in an off-state and transmits using the down control channel a signal of permission to transmit a position registering signal (S204).

Receiving the permitting signal (S205), the mobile unit 50 (B, C or D) transmits a position registering signal carrying its own ID (identification number) using the up control channel. The communication effected using the control channel is ensured at all times even in a base station having no transmitting and receiving portions used exclusively for the control channel, e.g., the base station 30B shown in FIG. 2D, and even in the case where the transmitter 46 and the receiver 48 have already been used between the base station 30 and another mobile unit, since transmission and reception can be effected simultaneously by chopping a plurality of channels at high speed.

Receiving the position registering signal (S207), the base station 30 (B or C) checks the receiving quality and stores the ID in the ID recognition memory 34 (S208). When the result of the checking of the receiving quality is higher than a predetermined level (i.e., when YES is the answer in S209 shown in FIG. 4B), the base station 30 (B or C) transmits a signal to require position registration to the radiotelephone control unit 20 (S210). Receiving the signal (S211), the radiotelephone control unit 20 registers the fact that the receiving quality and the position have already been stored in a plurality of base stations 30-1 to 30-n (S212). Upon completion of the registering operation, a registration completion signal is transmitted from the radiotelephone control unit 20 (S213). Receiving the registration completion signal, the base station 30 (B or C) transfers it to the mobile unit 50 (B, C or D) using the down control channel.

Receiving the registration completion signal (S215), the mobile unit 50 (B, C or D) checks the contents of the receiving signal and stores in the ID roam area information memory 54 the ID (identification number of each base station 30 (B or C) where the position thereof has been registered (S216).

With the above-described operations, the position registration is ended and the mobile unit 50 (B, C or D) stands by for an incoming call.

As will be clear from the description set forth above, unlike the conventional system, the mobile communication system according to the present invention is arranged to register the position of a mobile unit 50 (B, C or D) to a plurality of places (in units of base stations). This is one of the features of the present invention.

When position registration information is stored in the base stations 30 (B or C) and the radiotelephone control unit 20, the quality of the position registering signal transmitted from the mobile unit 50 (B, C or D) is measured and the measured value is stored together with the position registration information. Therefore, when the position registering signal from the mobile unit 50 (B, C or D) is stored, for example, in the radiotelephone control unit 20, the respective ID's of base stations 30 (B or C) the receiving quality at which is relatively high are stored in the order of receiving quality, for example, as shown below:

TABLE 1

| Base station ID | Mobile unit ID | Receiving quality S/N (C/N) | Time |
| --- | --- | --- | --- |
| 30-1 | 50 | 50 | 1987, 8, 11 13, 24, 56 |
| 30-2 | 50 | 45 | 1987, 8, 11 13, 24, 56 |
| 30-3 | 50 | 35 | 1987, 8, 11 13, 24, 56 |
| 30-4 | 50 | 30 | 1987, 8, 11 13, 24, 56 |
| 30-5 | 50 | 25 | 1987, 8, 11 13, 24, 56 |

Similarly, each base station 30 (B or C) stores not only receiving information but also information concerning reception at the surrounding base stations, such as those shown in Table 1. This is because, when a speech path is set up between the base station 30 (B or C) and a mobile unit 50 (B, C or D), such information is useful to execute speech (communication) channel hand-off which needs to be effected with the movement of the mobile unit 50 (B, C or D) and also the information is needed to estimate a direction and speed of movement of the mobile unit 50 (B, C or D).

For the same reason as the above, information similar to those shown in Table 1 is stored in the ID roam area information memory 54 within the mobile unit 50 (B, C or D).

It is assumed that the mobile unit 50 (B, C or D) which is in a waiting state (i.e., not in communication) has moved out of a cell where the position thereof has been registered and into a cell which is adjacent thereto. In a system wherein the control signal is constantly transmitted from each base station 30 (B or C), the movement of the mobile unit 50 (B, C or D) can be recognized by checking the ID of the base station 30 (B or C) included in the received control signal against the ID information stored in the mobile unit 50 (B, C or D).

In a system wherein a control signal is not constantly transmitted from each base station 30 (B or C), the recognition of the movement of a mobile unit 50 (B, C or D) can be done in such a way that the mobile unit 50 (B, C or D) requests the surrounding base stations 30 (B or C) using the up control channel to transmit a down control signal at a predetermined interval of time and the respective ID's of the base stations 30 (B or C) transmitted therefrom in response to the request are checked with the ID information stored in the mobile unit 50 (B, C or D).

In either of the above systems, when at least one new base station ID information which is different from the base station ID information having been stored in the mobile unit 50 (B, C or D) is found among the ID information of the base stations 30 (B or C) thus obtained, it is judged that the mobile unit 50 (B, C or D) has moved into a new cell and the mobile controller 58 executes renewal of the position registration to the ID roam area information memory 54. More specifically, the mobile controller 58 transmits the ID information of the mobile unit 50 (B, C or D) to the surrounding base stations 30 (B or C) using the up control channel.

A plurality of base stations 30 (B or C) that receive this signal with good quality carry out the same procedures as those described above and thus transmit a signal to require registration of the position of the mobile unit 50 (B, C or D) to the radiotelephone control unit 20. Receiving this signal, the radiotelephone control unit 20 activates the ID recognition memory 24 to rewrite the old position registration information of the mobile unit 50 (B, C or D) to new information. In this way, the position registration of the mobile unit 50 (B, C or D) is renewed.

The above-described renewing operation is necessary since the mobile unit 50 (B, C or D) is in a waiting state. When the mobile unit 50 (B, C or D) which is engaged in communication (speech) has moved into a new cell, no special operation is needed since in such a case the position registration to the radiotelephone control unit 20 is renewed at the same time as a new speech channel is allotted between a new base station 30 (B or C) and the mobile unit 50 (B, C or D).

It should be noted that, if the prior art is employed for a system wherein the number of radio equipments installed in each base station 30 (B or C) is small so that radio equipment for the control channel is used for the speech channel, when a base station 30 (B or C) is in communication with one mobile unit 50 (B, C or D), there is no other radio equipment which is standing by; therefore, any position registration request signal transmitted from another mobile unit results in an ineffective call. However, if each mobile unit is arranged, for example, as shown in FIG. 2B, that is, if it is provided with a plurality of multi-frequency synthesizers 55-1 to 55-n, 56-1 to 56-n and changeover switches 64-1, 64-2 so as to repeatedly switch over transmission and reception channels from one to another by chopping, a base station 30 (B or C) even when in communication with one mobile unit can exchange messages through the control channel with another mobile unit from which a position registration request is newly made and it is therefore possible to accept the position registration request therefrom.

(2) Operation of originating a call

The operation of originating a call from a mobile unit 50 (B, C or D) will next be explained.

It is assumed that the power switch of the mobile unit 50 (B, C or D) has already been turned on and the position registration described in the section (1) has also already been completed. An originating operation which is conducted when a call is made from the mobile unit 50 (B, C or D) to access another mobile unit in the same system or a telephone set accommodated in the telephone network 10 shown in FIG. 2A is effected by dialing in the same way as in the case of originating a call from a mobile telephone presently used.

First, the user hangs off the handset of the telephone unit 59 shown in FIG. 2B. In this state, the mobile controller 58 of the mobile unit 50 known at what timing an originating call signal should be transmitted from the mobile unit 50 to the up control channel [i.e., from the mobile unit 50 to base stations 30 (B or C)]. This is because this mobile unit 50 has already held the down control channel transmitted from a plurality of base stations 30 (B or C) [i.e., from the base stations 30 (B or C) to the mobile unit 50] during the call waiting period before the originating state and therefore recognized the originating enable timing of the control signal included in the down control channel.

However, there is a system wherein no down control signal is constantly transmitted from base stations 30 (B or C). In such a case, an up control signal transmitted from each mobile unit 50 (B, C or D) is received by base stations 30 (B or C) and, in response to it, a plurality of base stations transmit a down control channel including the originating timing for a mobile unit 50 (B, C or D) which desires to originate a call.

In the mobile unit 50, all the functions shown in FIG. 2B are activated. In particular, the multi-frequency synthesizers 55-1, 55-2, . . . 55-n are activated to prepare for oscillation of local oscillation frequencies, while the changeover switch 64-1 is held at a position where the multi-frequency synthesizer 55-1 is selected. In addition, the mobile controller 58 transmits a control signal to the multi-frequency synthesizer 55-1 so as to oscillate a local oscillation frequency for the reception of the down control channel. On the other hand, when only one radio equipment is present in each of the base stations 30-1, 3-2, . . . 30-n in the vicinity of the mobile unit 50 (B, C or D), each of these base stations tries to receive the up control signal from the mobile unit 50 (B, C or D) by conducting either one of the following operations according to whether or not it is in communication with another mobile unit.

In a base stations 30 (B or C) which is in communication with another mobile unit at that time, the receiving channel switching controller 65C, the transmitting channel switching controller 67C and the multi-frequency synthesizers 55-1, 55-2, 56-1 and 56-2 are in operation. Among them, the synthesizers 55-1 and 56-1 output local oscillation frequencies needed for the communication with another mobile unit, while the synthesizers 55-2 and 56-2 output local oscillation frequencies needed for exchange of messages through the control channel. Therefore, the base station 30 (B or C) is kept able to respond immediately to a call originated from a mobile unit 50 which is in the vicinity of it.

In a base station 30 (B or C) which is not in communication with any mobile unit at that time and is therefore standing by in the control channel, the receiving condition of the receiver 68 is fixed so as to be able to receive the control channel. Accordingly, in a system wherein a control signal is constantly or intermittently transmitted, the transmitter 66 is at rest except for the intermittent transmission and only the receiver 68 and the multi-frequency synthesizer 55-1 are in operation.

In the above-described conditions, an originating request signal is transmitted from a mobile unit 50. The originating request signal that includes the ID of the mobile unit 50 is prepared in the mobile controller 58 shown in FIG. 2B and transmitted to the transmitter 66 where it is modulated and amplified to an appropriate level. Thereafter, the signal is applied to the antenna from the transmitting mixer 61 and transmitted to the base station 30-1 and other base stations. In the base station 30-1 and other base stations which have received the signal with good quality, the contents of the receiving signal are checked to confirm that the call is originated from a mobile unit 50 the ID of which has been stored in the ID recognition memory 34 in the base station 30-1, for example, and the position registration of which has been completed. Then, the base station 30-1 transmits an off-hook signal to the radiotelephone control unit 20. If the call is originated from a mobile unit 50 the ID of which is not stored in the memory 34 of the base station 30-1, the ID of the mobile unit 50 is stored at this point of time and a response signal is transmitted to the radiotelephone control unit 20 in the same way as the above.

The radiotelephone control unit 20 sets up a speech path between the mobile unit 50 and a base station 30 at which the quality of reception of the signal from the mobile unit 50 is the best among the base station 30-1 and other stations and then searches the speech channels at the base station (assumed to be 30-1) for one which is not used at that time and which has no fear of causing radio interferences. If there is such a speech channel, the radiotelephone control unit 20 answers to the base station 30-1 requesting allotment of a speech channel. Receiving the answer, the base station 30-1 transmits a signal to the mobile unit 50 using the down control channel.

On the other hand, the mobile unit 50 receives the signal, checks the contents of the signal and confirms that a speech channel is allotted to the mobile unit 50. Then, it changes the transmitting and receiving channel to the designated speech channel. In the radiotelephone control unit 20, a switch SW in the speech path setting switch group 23 is turned on. At this time, a dial tone is audible at the telephone unit 59 of the mobile unit 50, and dial pulses (PS signal) are transmitted through the base station 30, the radiotelephone control unit 20 and the gateway switch office 19 in response to dialing conducted by the user.

Thereafter, a speech (communication) path is set up between the telephone network 10 as being the called party, the gateway switch office 19, the radiotelephone control unit 20, the base station 30-1 and the mobile unit 50.

Figure 5A:
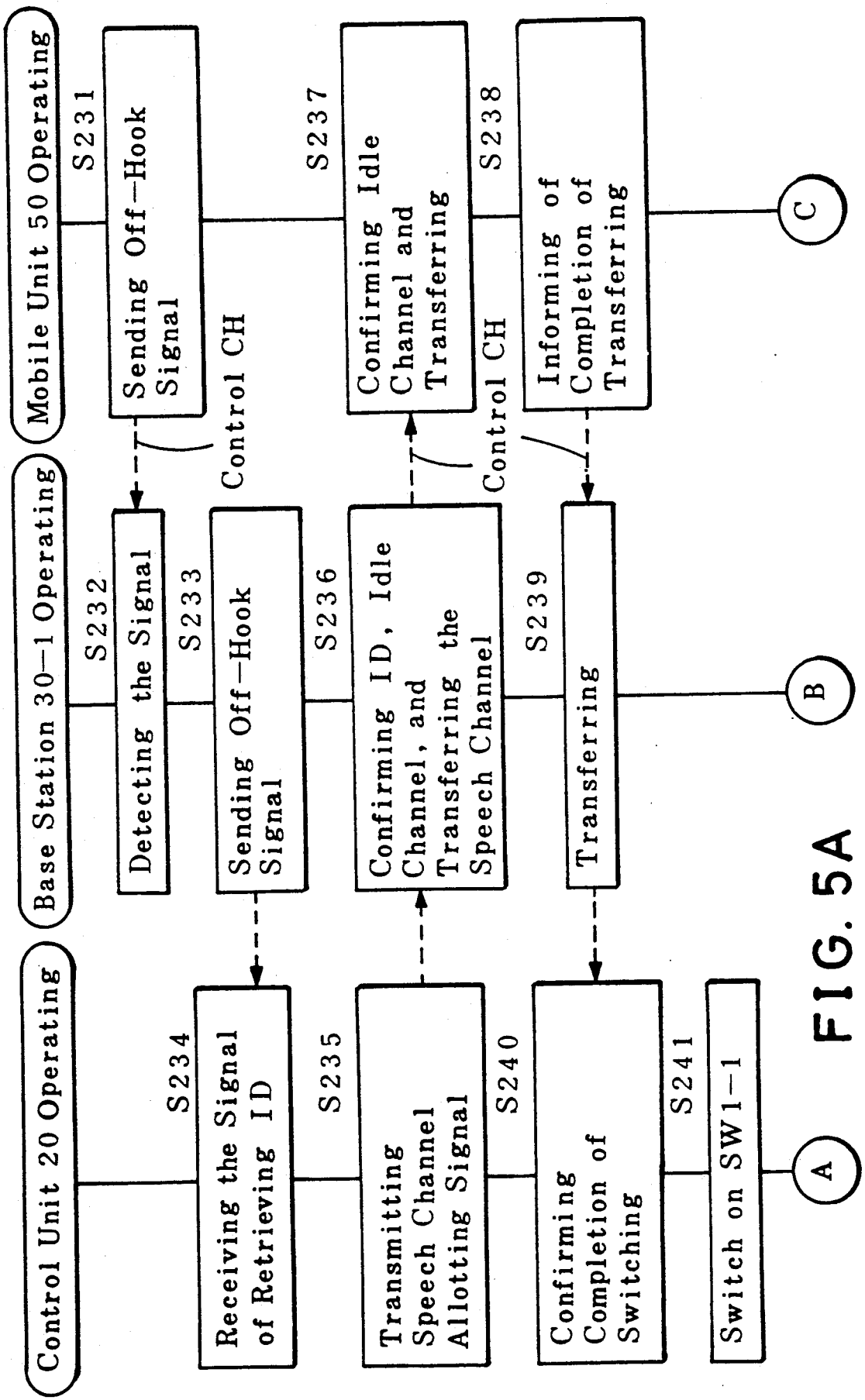
FIGS. 5A and 5B are flowcharts showing the flow of an operation of originating a call from a mobile unit.

The flow of the above-described originating operation will be explained below more specifically with reference to FIGS. 5A and 5B. In these figures, the base station 30-1 alone is shown as one of the base stations 30 which communicate with the mobile unit 50. It is assumed that the radiotelephone control unit 20 and the base station 30-1 have already initiated their operations and the mobile unit 50 has also already been activated to complete the position registering operation described in connection with FIGS. 4A and 4B. When the handset is unhooked (i.e., off-hook), the off-hook signal and the ID (identification number) of the mobile unit 50 are transmitted using the up control channel (CH) (S231 shown in FIG. 5A).

Receiving these signals, the base station 30-1 detects the ID of the mobile unit 50 and confirms that the ID has already been stored in the ID recognition memory 34 (S232). Then, the base station 30-1 sends an off-hook signal using the transmission line, the off-hook signal including the value of receiving quality of the signal from the mobile unit 50 and a presently idle channel number (S233).

Receiving such an off-hook signal from a plurality of base stations 30 (B or C), the radiotelephone control unit 20 confirms the ID (identification signal) from each base station 30, checks the value of receiving quality (S234), selects base stations, e.g., 30-1 to 30-n, which can perform diversity transmission and reception, confirms an idle channel and transmits a speech channel allotting signal (S235). In this case, the channel CH1 is transmitted to the base station 30-1. The base station 30-1 confirms the ID of the base station 30-1 designated by the radiotelephone control unit 20, confirms that the allotted speech channel (CH) is idle, and transfers the channel allotting signal using the down control channel (S236). Receiving the channel allotting signal, the mobile unit 50 confirms that the designated channel is idle, transfers the channel to the allotted channel (S237), and informs the base station 30-1 of the completion of channel transferring by the use of the down control channel (S238). Receiving the transferring completion information, the base station 30-1 also effects channel transferring and informs the radiotelephone control unit 20 of the completion of channel transferring (S239). Receiving the transferring completion information, the radiotelephone control unit 20 confirms the completion of channel transferring, stores the respective ID's of the base station 30-1 and the mobile unit 50 and the communication quality in the ID recognition memory 24 (S240), and turns on a switch, e.g., SW1-1, of the switch group 23 under the control of the communication controller 21, thereby connecting the base station 30-1 to the exchanger 11 of the telephone network 10 (S241).

Figure 5B:
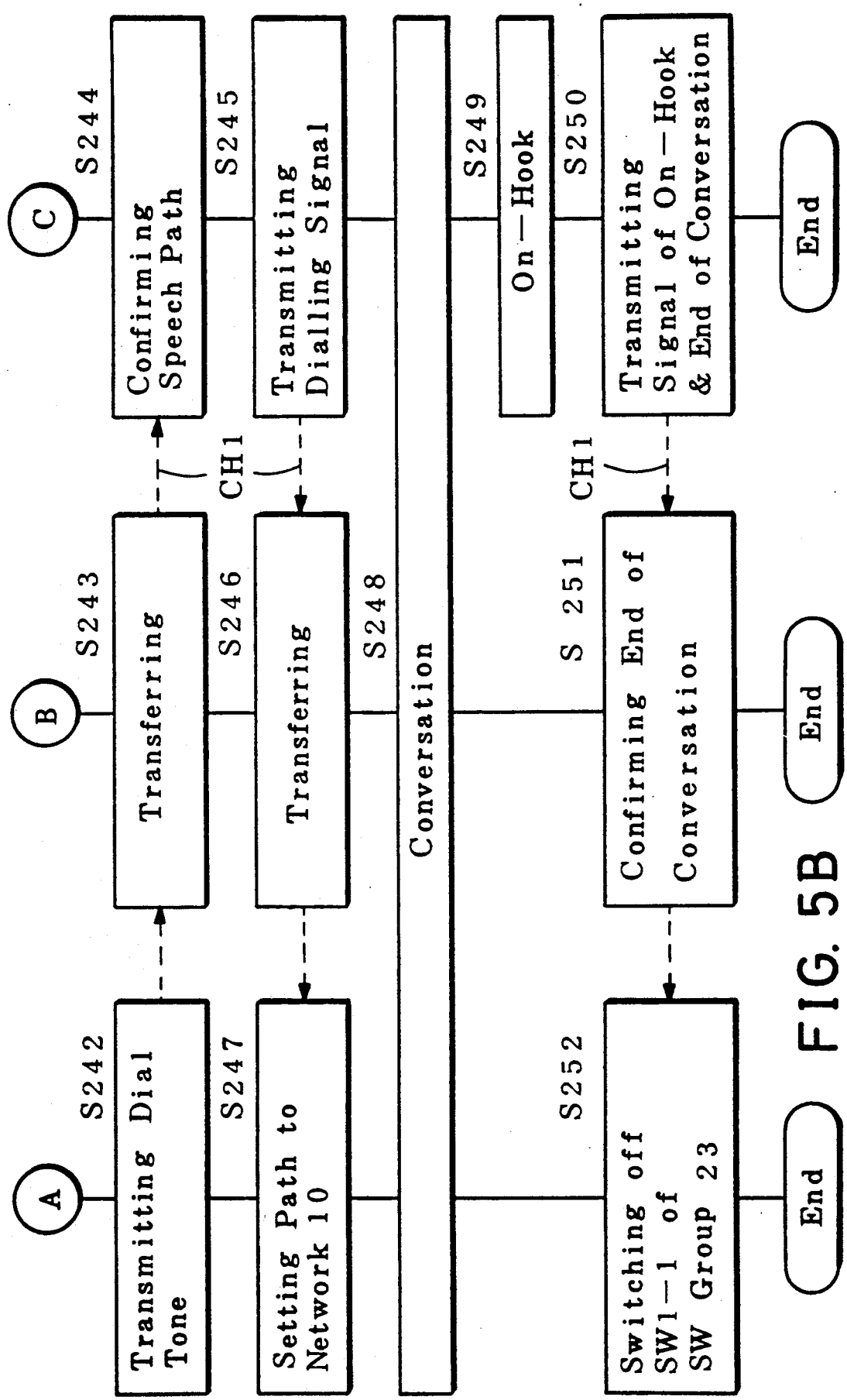

Then, the gateway switch office 19 transmits a dial tone through the switch group 23 in the radiotelephone control unit 20 (S242 shown in FIG. 5B).

The dial tone is transferred from the base station 30-1 through the channel CH1 (down) (S243) and received by the mobile unit 50 where it is confirmed that speech (communication) path has been set up (S244). The mobile unit 50 transmits the dialling signal using the channel CH1 (up) (S245). The signal is transferred through the base station 30-1 (S246) to activate the gateway switch office 19 to set up a speech (communication) path to the destination in the telephone network 10 (S247). Thereafter, conversation is made (S248).

Upon completion of the conversation, the handset is put back on the hook (i.e., on-hook, S249) and a signal of on-hook and end of conversation is transmitted from the mobile unit 50 using the channel CH1 (up) (S250). Receiving the signal, the base station 30-1 confirms the end of conversation (S251) and informs the radiotelephone control unit 20 of the end of conversation. In consequence, the radiotelephone control unit 20 turns off the switch SW1-1 of the switch group 23, thus completing the call (S252).

Although in the above description the radiotelephone control unit 20 restricts base stations 30 communicating with the mobile unit 50 to one station (i.e., 30-1), the present invention is not necessarily limitative thereto. More specifically, it is possible to allow the mobile unit 50 to communicate with a plurality of base stations 30 from the beginning of the call in the same way as in the case when transmitting and receiving diversity (described later) is applied. In such a case, however, it is necessary to take into due consideration the traffic conditions near the base stations 30.

In addition, transmission from a plurality of base stations 30 to the mobile unit 50 can be done at the same time. In such a case, there is no problem in regard to speech signals since they are identical with each other, but the control signals must be transmitted respectively in different occupied frequency bands which are out of the speech signal frequency band [see FIG. 3(a)] so that the mobile unit 50 can identify each base station 30 by the frequency band. Or, if the used control channel differs in each neighboring base stations, there is no problem mentioned above.

(3) Operation of receiving an incoming call

Figure 6A:
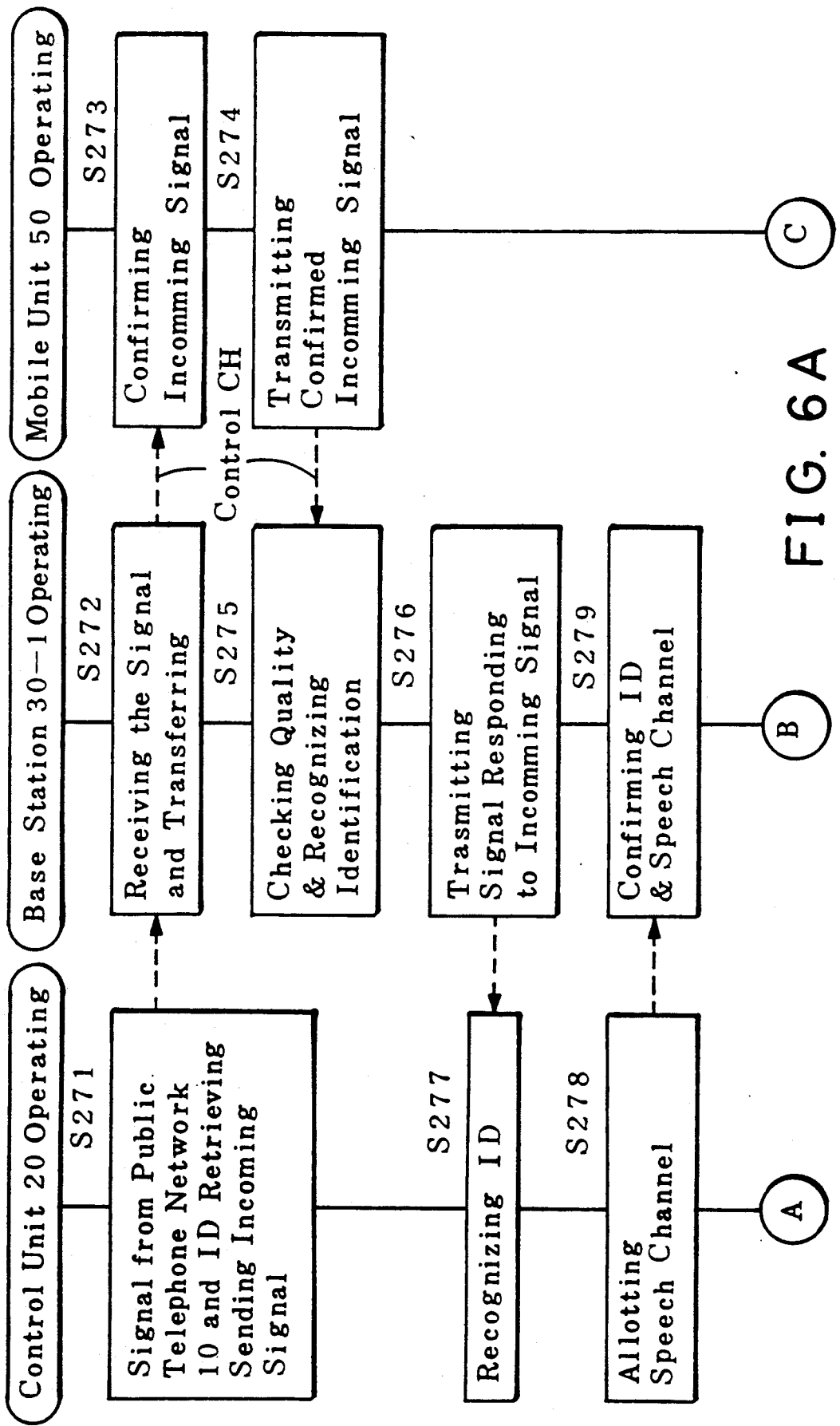
FIGS. 6A, 6B and 6C are flowcharts showing the flow of an operation of receiving an incoming call to a mobile unit.
Figure 6B:
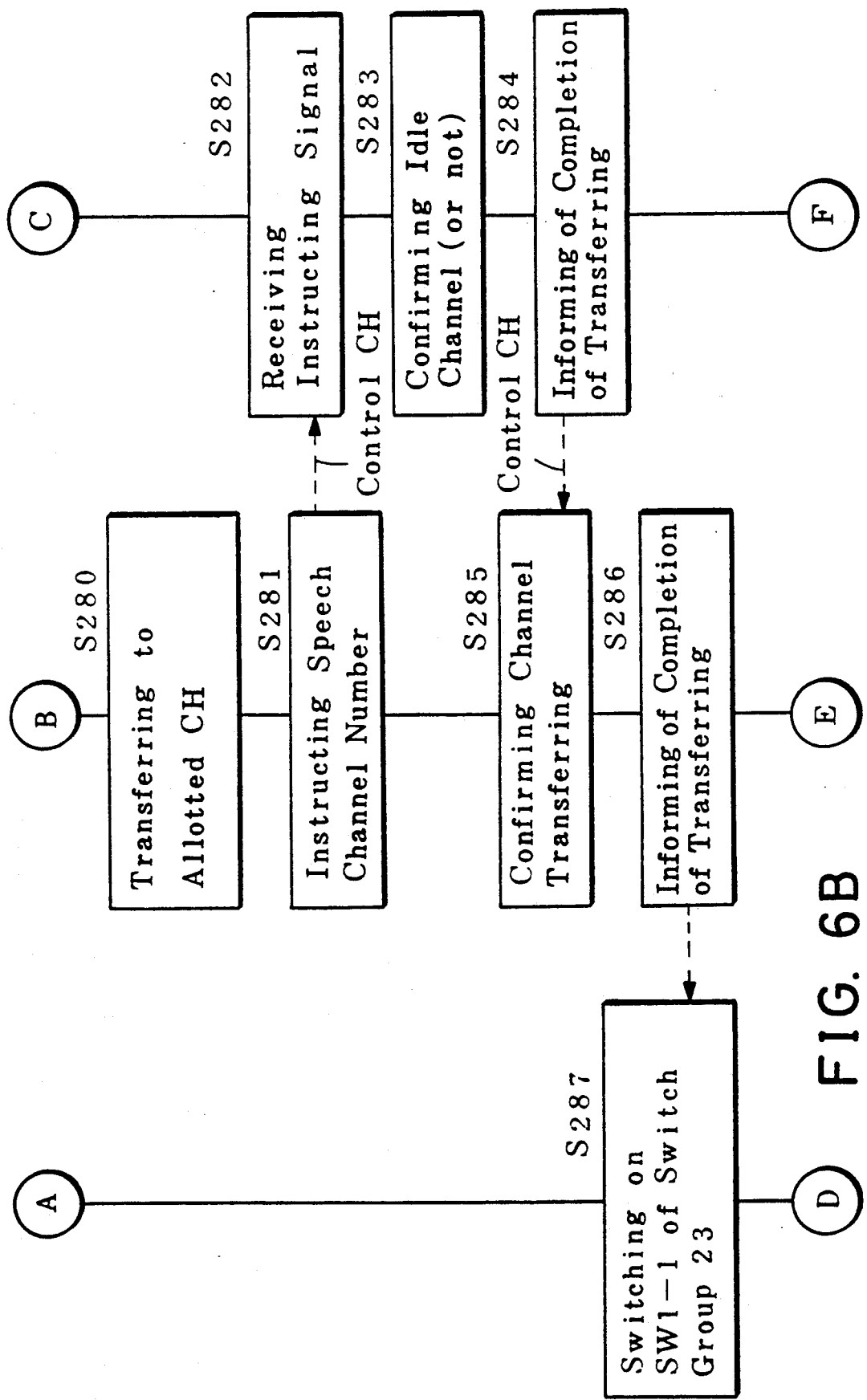
Figure 6C:
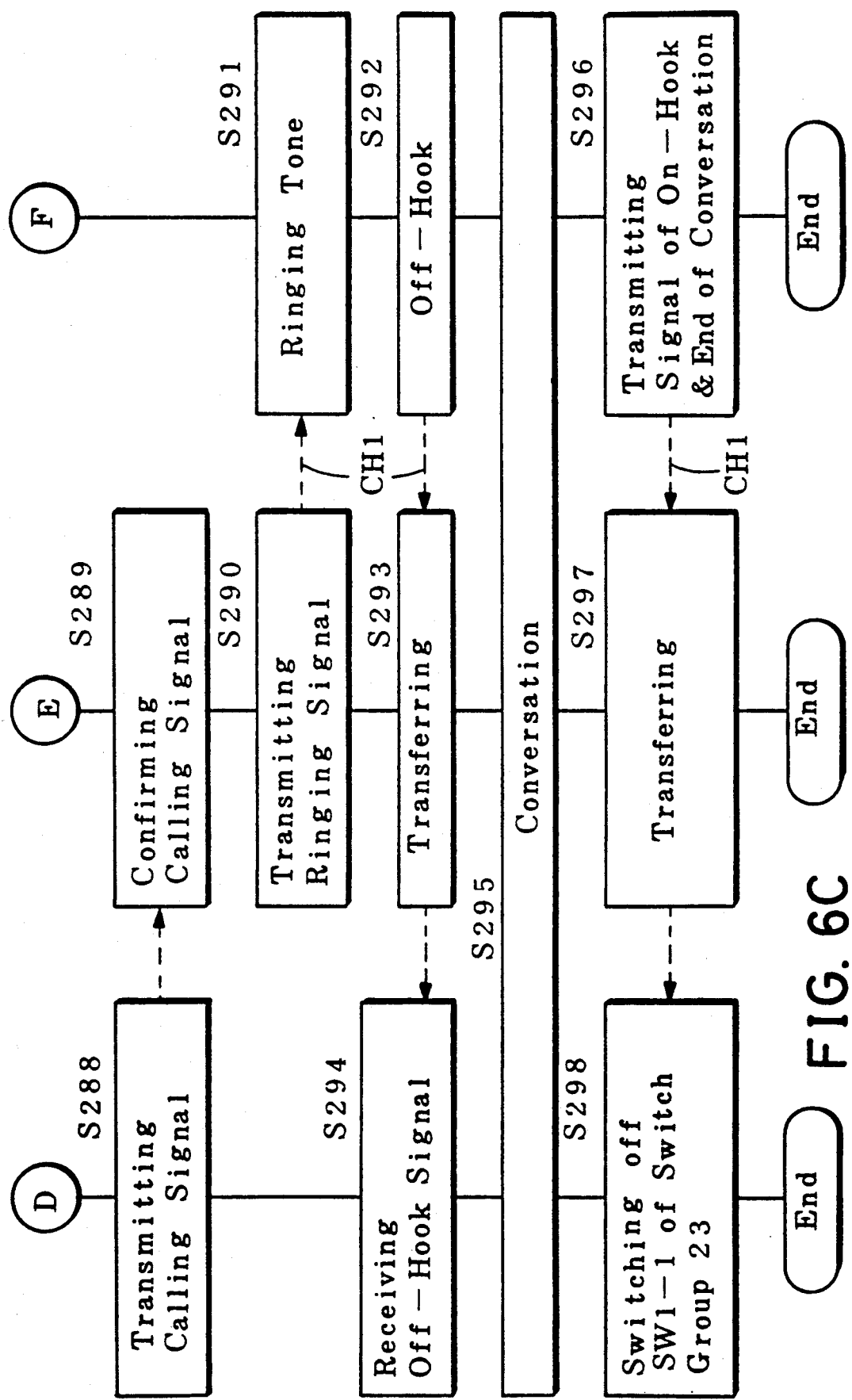

In the above, the present invention has been described in regard to origination of a call from a mobile unit 50 (B, C or D); indication of B, C or D will be omitted hereinafter). The flow of an operation conducted when there is an incoming call to a mobile unit 50 will next be explained with reference to FIGS. 6A to 6C. In these figures, a base station 30-1 represents a large number of base stations 30. Mobile units 50 which are present near base stations 30, for example, the base station 30-1, stand by using a control channel which is mutually used in all the base stations 30.

However, in a system wherein the size of each small zone is relatively large, control channels which are respectively transmitted from the base stations 30 may be different from each other. In such a case, control channels which are respectively received by the base stations 30 are also different from each other. In such a system, each mobile unit 50 stands by for one of the down control channels. Communication with a plurality of base stations 30 is effected according to the procedures in which diversity explained in the section (4) is applied.

It is assumed that an incoming signal to a mobile unit 50 arrives at the radiotelephone control unit 20 through the gateway switch office 19 from the telephone network 10 shown in FIG. 2A. In the ID recognition memory 24 within the radiotelephone control unit 20, the arriving incoming signal is checked and the ID of the called subscriber is retrieved. It is assumed that base stations 30 where the current position of the called mobile unit 50 has been registered are found as a result of the retrieval. Then, the control unit 20 sends an incoming signal to all the base stations 30 where the position of the mobile unit 50 has been registered at the same time through the communication controller 21 (S271) shown in FIG. 6A).

Receiving the signal, each base station, for example, the base station 30-1, retrieves its own ID recognition memory 34(C) and, when confirming that the ID of the mobile unit 50 has been stored therein, it transmits a signal including an incoming signal and a speech channel allotting request signal to the mobile unit 50 using the down control channel, together with the ID of the base station 30-1. Other base stations 30 conduct the same operation to call the mobile unit 50 substantially the same time (S272).

On the other hand, the incoming signal is received by the mobile unit 50 which is standing by in the control channel, and the receiving signal is checked. When confirming that the receiving signal is an incoming signal to the mobile unit 50 (S273), it transmits a confirmed incoming signal to base stations 30-1, 30-2, . . . 30-n using the up control channel (S274). Receiving the signal from the mobile unit 50 through the up control channel, each of the base stations 30-1 to 30-n checks the quality of the receiving signal, recognizes the ID of the transmitting mobile unit 50 (S275), and transmits a signal responding to incoming signal to the radiotelephone control unit 20 (S276).

The signal transmitted to the radiotelephone control unit 20 also includes the ID of the mobile unit 50. Therefore, receiving the signal, the radiotelephone control unit 20 makes a check as to whether or not the ID of the mobile unit 50 has already been stored in the ID recognition memory 24. If it has not yet been stored, the control unit 20 registers the ID of the mobile unit 50 in the ID recognition memory 24, together with data concerning the receiving quality at the base station 30-1 (S277), and then sends a confirmation signal including a speech channel allotting signal, together with the stored ID, to the base station 30-1 and other base stations (S278).

Receiving the confirmation signal, the base station 30-1 confirms that the ID of the mobile unit 50 has been registered correctly (S279), makes a check as to whether or not the channel allotted by the radiotelephone control unit 20 is idle, decides whether or not the speech channel should be transferred to the allotted channel (S280 shown in FIG. 6B), and transmits a channel transferring permitting/inhibiting signal to the mobile unit 50 using the down control channel (S281).

Receiving the instructing signal (S282), the mobile unit 50 transfers the speech channel to the allotted channel after confirming that the allotted channel is idle (S283), and then informs the base station 30-1 of the completion of channel transferring using the up control channel (S284).

Confirming that the speech channel has been transferred to an idle channel (S285), the base station 30-1 also transfers the speech channel to the allotted channel and informs the radiotelephone control unit 20 of the completion of channel transferring (S286).

Receiving the channel transferring completion signal, the radiotelephone control unit 20 activates the communication controller 21 so as to turn on a switch, for example, the switch SW1-1, of the switch group 23, thereby connecting together the base station 30-1 and the telephone network 10 (S287). Then, a calling signal is transmitted from the telephone network 10 through the gateway switch office 19 and the radiotelephone control unit 20 (S288 shown in FIG. 6C) and confirmed in the base station 30-1 (S289). The base station 30-1 then transmits a ringing signal through the set speech channel CH1, and a ringing tone is generated in the mobile unit 50 (S291).

When the handset of the mobile unit 50 is unhooked (off-hook) in response to the ringing tone (S292), an off-hook signal is transmitted using the channel CH1, transferred from the base station 30-1 (S293) and received by the radiotelephone control unit 20. Thus, conversation is initiated between the telephone network 10 and the mobile unit 50 (S295).

Upon completion of the conversation, the handset is put back on the hook and a signal of on-hook and end of conversation is transmitted to the base station 30-1 through the channel CH1 (S296). Confirming that the conversation has been completed, the base station 30-1 transfers the transmitted signal (S297). Receiving the signal of on-hook and end of conversation, the radiotelephone control unit 20 activates the communication controller 21 to turn off the switch SW1-1 of the switch group 23, thus completing the call (S298).

In a system wherein a transmitter-receiver for control which is installed in the base station 30-1 is used for a speech channel also, the base station 30-1 can communicate with a mobile unit to which an incoming call is newly made using the control channel even when it is in communication with a third mobile unit by repeatedly switching the transmitting and receiving channels from one to the other in the way described in connection with the arrangement of mobile units (see FIG. 2D).

In a system exemplarily shown in the description of (2) Operation of originating a call and (3) Operation of receiving an incoming call, radio channels used exclusively for control and those used exclusively for speech are clearly distinguished from each other. In some of actual systems, however, the two different kinds of radio channel are not clearly distinguished from each other. In such systems, a specific speech channel can be used as a control channel so as to perform an operation equivalent to that of a control channel.

(4) Application of diversity when the traffic is not congested

It is assumed that communication has been initiated between an ordinary telephone set in the telephone network 10 and a mobile unit 50 (or between two mobile units in the system) as a result of either a call originating or receiving operation such as those described in the sections (2) and (3). In this case, it is assumed that the mobile unit 50 communicates with one base station 30 and the communication traffic condition in the system, at least the area near the mobile unit 50, is not at a peak (i.e., it is not at busy hours) (it should be noted that diversity is similarly applicable to cases where the number of base stations 30 is 2 or more).

In consequence, the mobile unit 50 initiates preparation for diversity transmission and reception. For this purpose, the mobile controller 58 in the mobile unit 50 shown in FIG. 2B sends an operation start instruction signal to both the transmitting channel switching controller 67C and the receiving channel switching controller 65C and further requests the multi-frequency synthesizers 55-n and 56-n to oscillate frequencies, in addition to the multi-frequency synthesizers 55-1 and 56-1 which are in operation, so that it is possible to transmit and receive the control channel CH50. At the same time, the mobile controller 58 starts transmitting a control signal to the transmitter 66. The control signal includes the ID of the mobile unit 50, the kind of communication (i.e., speech, data, etc.) and the channel number of the channel presently used and requests a base station 30 which is adjacent to the mobile unit 50 and receives the signal and which is not engaged in communication to start an operation for diversity transmission and reception. If the base station 30 is arranged as shown in FIG. 2D or FIGS. 2E and 2F, it is capable of communicating with another mobile unit even when it is in communication with a third mobile unit; therefore, the above-described conditions for the base station 30 can be eased.

With the above-described operation, it is possible to transmit signals from the transmitting mixer 61 of the mobile unit 50 through the control channel CH50 in addition to the channel CH1 presently used for communication, while it is possible to receive signals at the receiving mixer 63 through the control channel CH50 in addition to the speech channel CH1 presently used for conversation. This is explained more specifically in the description of the operation of channel hand-off during communication in the section (5).

The control signal transmitted from the mobile unit 50 is received by a plurality of nearby base stations 30-2, 30-3, . . . 30-n which are not presently engaged in communication. In consequence, one of the base stations, that is, the base station 30-2 checks the quality of the receiving signal and the contents of the signal and upon judging that the quality of the signal received from the mobile unit 50 is above a predetermined level and there is no possibility of the communication quality lowering immediately nor fear of interferences, it transmits to the mobile unit 50 a control signal including the ID of the base station 30-2 and the channel number of a usable radio channel (e.g., CH2), thus informing the mobile unit 50 of permission of diversity transmission and reception.

The signal is received by the receiver 68 of the mobile unit 50 and transferred to the mobile controller 58. The controller 58 examines the signal sent from the base station 30-2 and upon judging that it is appropriate to effect diversity transmission and reception, it requests the multi-frequency synthesizers 55-2 and 56-2 to generate local oscillation frequencies in order to initiate communication between the mobile unit 50 and the base station 30-2 using the channel CH2 (the channel CH1 may be allotted when it is judged that no interference occurs). Further, the mobile controller 58 requests the communication controller 21 in the radiotelephone control unit 20 to activate the switch group 23 so that the speech signal which is presently transmitted is also transmitted to the base station 30-2 in parallel.

At the request of the mobile controller 58, the radiotelephone control unit 20 starts transmission of the speech signal, that is, the speech signal from an ordinary telephone set, not only to the base station 30-1 but also to the base station 30-2 in the same way.

Receiving the speech signal, the base station 30-2 transmits the speech signal, together with the ID thereof, to the mobile unit 50 using the radio channel CH2. Since the mobile unit 50 has been made able to receive the radio channel CH2, it checks the output of the receiver 68 that receives the signal and, if the receiving quality is good, the speech signal is transferred to the telephone unit 59, and the control signal to the mobile controller 58.

By executing the above-described operation, the mobile unit 50 enters into the diversity transmission-reception state between the same and the base stations 30-1 and 30-2. The diversity transmission and reception request signal that is transmitted from the mobile unit 50 toward base stations 30 which are in the vicinity of it must be received by base stations 30-3, 30-4, . . . 30-n other than the base station 30-2 in the same mway and any of these base stations which meets the conditions must transmit an answer signal to the mobile unit 50 in the same way as in the case of the base station 30-1.

Therefore, when it is desired to effect diversity transmission and reception between more base stations, the mobile controller 58 in the mobile unit 50 or the radiotelephone control unit 20 performs the same operations as those conducted when diversity transmission and reception are effected between the mobile unit 50 and the base station 30-2 and, if all the operations are performed normally, diversity transmission and reception are initiated between the mobile unit 50 and, for example, the base station 30-3.

Similarly, diversity transmission and reception are initiated between the mobile unit 50 and base stations 30-3, 30-4, . . . 30-n which are near the mobile unit 50 and not presently engaged in communication and which meet a predetermined communication quality level required for the system by executing operations similar to those described above. The degree of multiplex in diversity depends on the number of communicable base stations 30 or the number of channels provided in the mobile unit 50 through which simultaneous transmission and reception can be effected, that is, the number for n of the multi-frequency synthesizers 55-1 to 55-n or 56-1 to 56-n in the case of the mobile unit 50 shown in FIG. 2B.

In the foregoing description, the speech traffic in the system is assumed to be not congested. The traffic condition is measured in the radiotelephone control unit 20 or each of the base stations 30-1 to 30-n or the mobile unit 50 and, as the traffic gradually becomes congested, the degree of multiplex in diversity is gradually reduced. When the traffic reaches a maximum, the degree of multiplex is 1, that is, diversity reaches zero. According to the present invention, however, the reduction in the degree of multiplex is made to differ depending on the kind of communication (speech, data, facsimile, etc.), thereby enabling systemic processing to be effected such that, for example, a wider band communication is less restricted in terms of the degree of multiplex, and thus allowing excellent communication to be ensured irrespective of the kind of communication.

(5) Operation of channel hand-off during communication

When the communication quality at one of n−1 channels has lowered below a predetermined level in the middle of communication between n−1 base stations 30 and one mobile unit 50 (B, C or D; indication of "B, C or D" will be omitted hereinafter) using n−1 channels, said channel is switched to another channel (new channel) to communicate with another base station 30 which meets a predetermined communication quality level and which is not presently engaged in communication. In advance of the start of communication using the new channel, a switching receiving means and a switching transmitting means are switched at such a speed that the communication signal is not affected, thereby enabling old and new channels other than n−2 channels continuously transmitted and received to be temporarily transmitted and received in parallel in order to check the receiving quality of the new channel. Upon confirming that the quality is higher than a predetermined level, the operation for channel hand-off is finished and communication is effected using n−1 radio channels including the new channel. Accordingly, there is no instantaneous disconnection of communication due to channel hand-off. In addition, it becomes possible to obtain transmitting and receiving diversity effect in the case where channel hand-off is carried out and also in the case where no channel hand-off is effected.

FIGS. 2A to 2I show system arrangements employed to describe one example of the operation of channel hand-off during communication. The operation will be explained below with reference to these figures.

It is assumed that a mobile unit 50 is in communication with base stations 30-1, 30-2, ... 30-(n−1) through speech channels CH1, CH2, ... CH(n−1) by using the multi-frequency synthesizers 55-1, 55-2, ... 55-(n−1), the receiver 68 and the transmitter 66. It is also assumed that the mobile unit 50 moves away from the base station 30-1 and comes closer to the base station 30-n. In consequence, the communication quality starts to deteriorate as the relative distance between the mobile unit 50 and the base station 30-1 increases and, therefore, the lowering in the communication quality is detected by the S/N supervisor 22 in the radiotelephone control unit 20 (i.e., the fact that the communication quality has lowered below the level $L_1$ is detected). It should be noted that the level $L_1$ is set so as to be higher than the level required for the radiotelephone speech path.

The radiotelephone control unit 20 requests all base stations 30 in the vicinity of the mobile unit 50 to measure the quality of the signal transmitted from the mobile unit 50. At the request of the control unit 20, each base station 30 which is not presently engaged in communication with the mobile unit 50 informs the control unit 20 of the measured value.

The S/N supervisor 22 in the radiotelephone control unit 20 makes a comparison between a plurality of information such as C/N values sent from the base station 30-n and other stations. If it is confirmed as a result of the comparison that the result of measurement made at the base station 30-n is the best and equal to or higher than the quality standard level $L_2$ ($L_2 > L_1$), it is judged that the mobile unit 50 has come near the cell (the cell n) of the base station 30-n and it is decided to effect channel hand-off.

As a result of checking idle speech channels in the cell n, the radiotelephone control unit 20 knows that the channel CHn is usable as informed from the base station 30-n. Then, using the speech channel CH1 which is presently used for conversation (or any of the speech and control channels CH2, ... CHn−1 may be used; however, the speech channel used is assumed to be the channel CH1 in the following description), the radiotelephone control unit 20 instructs the mobile unit 50 by means of the control signal to prepare to carry out transmission and reception using the speech channel CHn (the same channel, for example, the channel CH1, may be allotted in the case where it is judged that the use of the radio channel presently used will cause no interference).

At the same time, the radiotelephone control unit 20 instructs the base station 30-n to carry out transmission and reception using the channel CHn. After giving these instructions, the radiotelephone control unit 20 turns on the switch SW1-n of the switch group 23, so that the base station 30-n initiates transmission of a speech signal using the speech channel CHn. In this case, it is a matter of course that the depth of modulation effected by the modulator in the base station 30-n and the phase of the signal transmitted therefrom are made substantially the same as in the case of the other base stations 30-2, 30-3, ... 30-n.

More specifically, to realize the transmission of the control signal, in the case of an analog signal is used as a control signal, a relatively low frequency $f_{D0}$ (e.g., about 100 Hz) which is out of the speech channel band, i.e., from 0.3 to 3.0 kHz, or relatively high frequencies $f_{D1}, f_{D2}, f_{D3} \ldots f_{D8}$ (e.g., eight radio waves of different frequencies from 3.8 kHz to 4.5 kHz at regular intervals of 0.1 kHz in the case where n=8) which aree also out of the speech channel band are employed, as has already been described in connection with FIG. 3(a).

When the number of items which are to be controlled, that is, control data, is large, the number of signals for control may be increased, or a subcarrier form may also be adopted. It is also possible to transmit a larger number of control data by, for example, frequency-modulating or amplitude-modulating one or more of the signals $f_{D0}$ to $f_{D8}$.

In the case where a digital data signal is employed as a control signal, the speech signal may also be digitized and the two digital signals may be transmitted by time-division multiplex, as has already been described in connection with FIG. 3(b).

Figure 7:
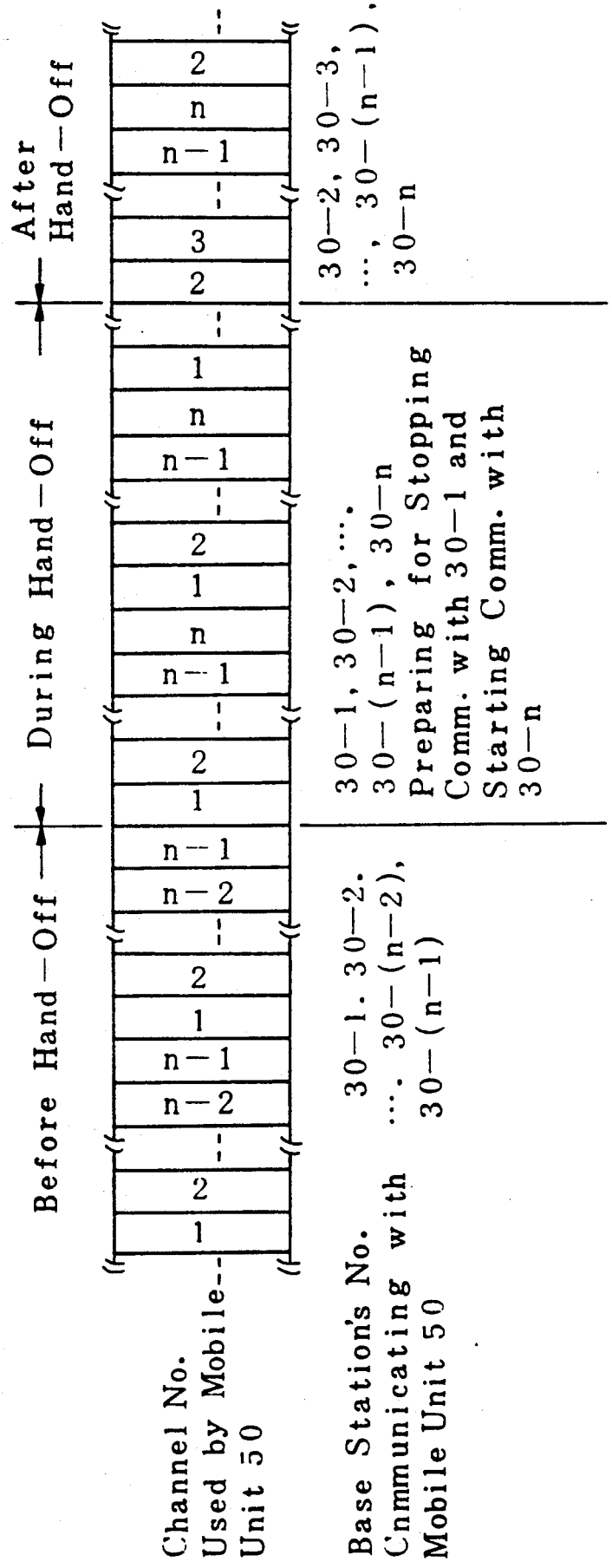
FIG. 7 is a timing chart showing the operation of the system shown in FIGS. 2A to 2C.
Figure 8A:
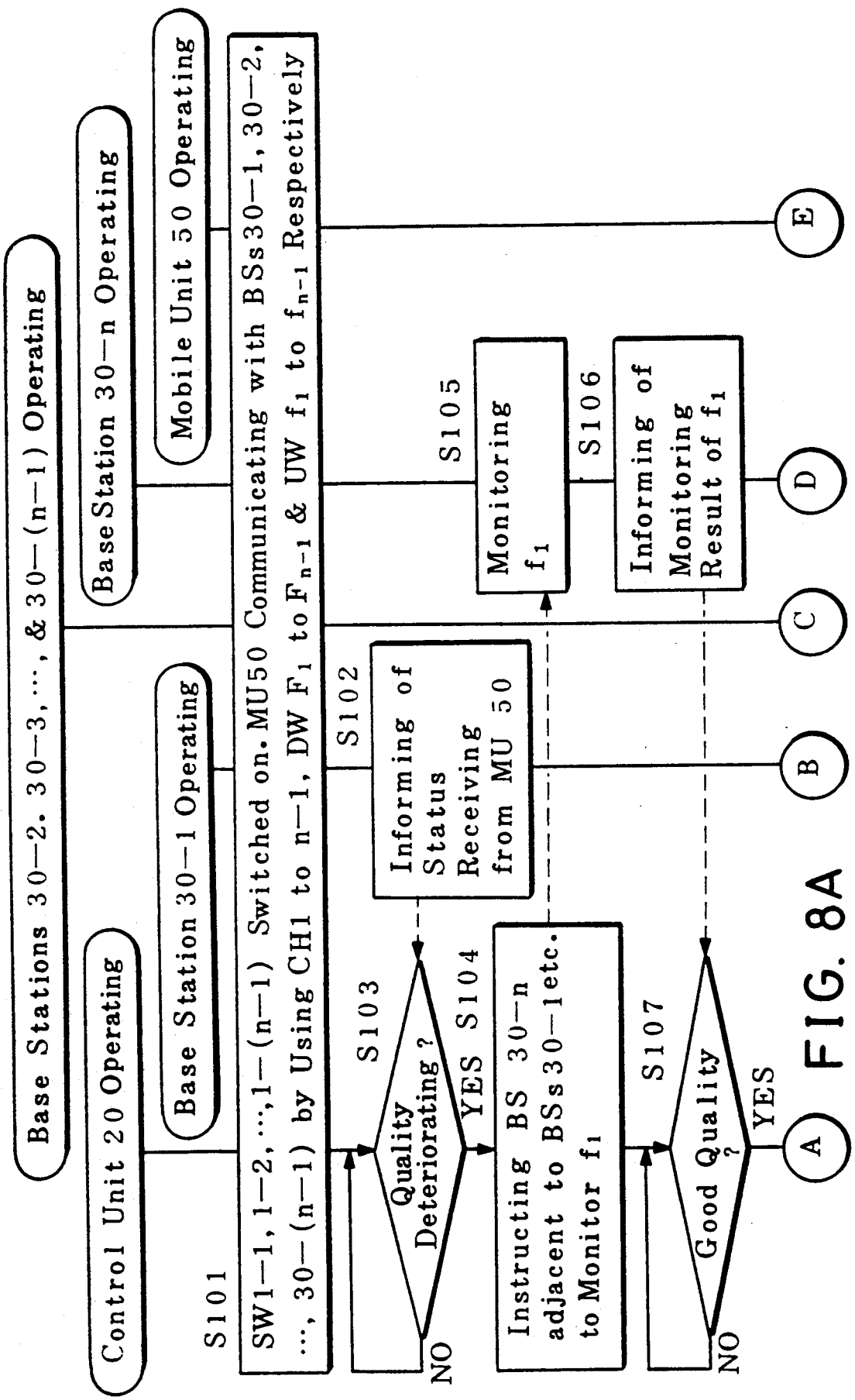
Figure 8B:
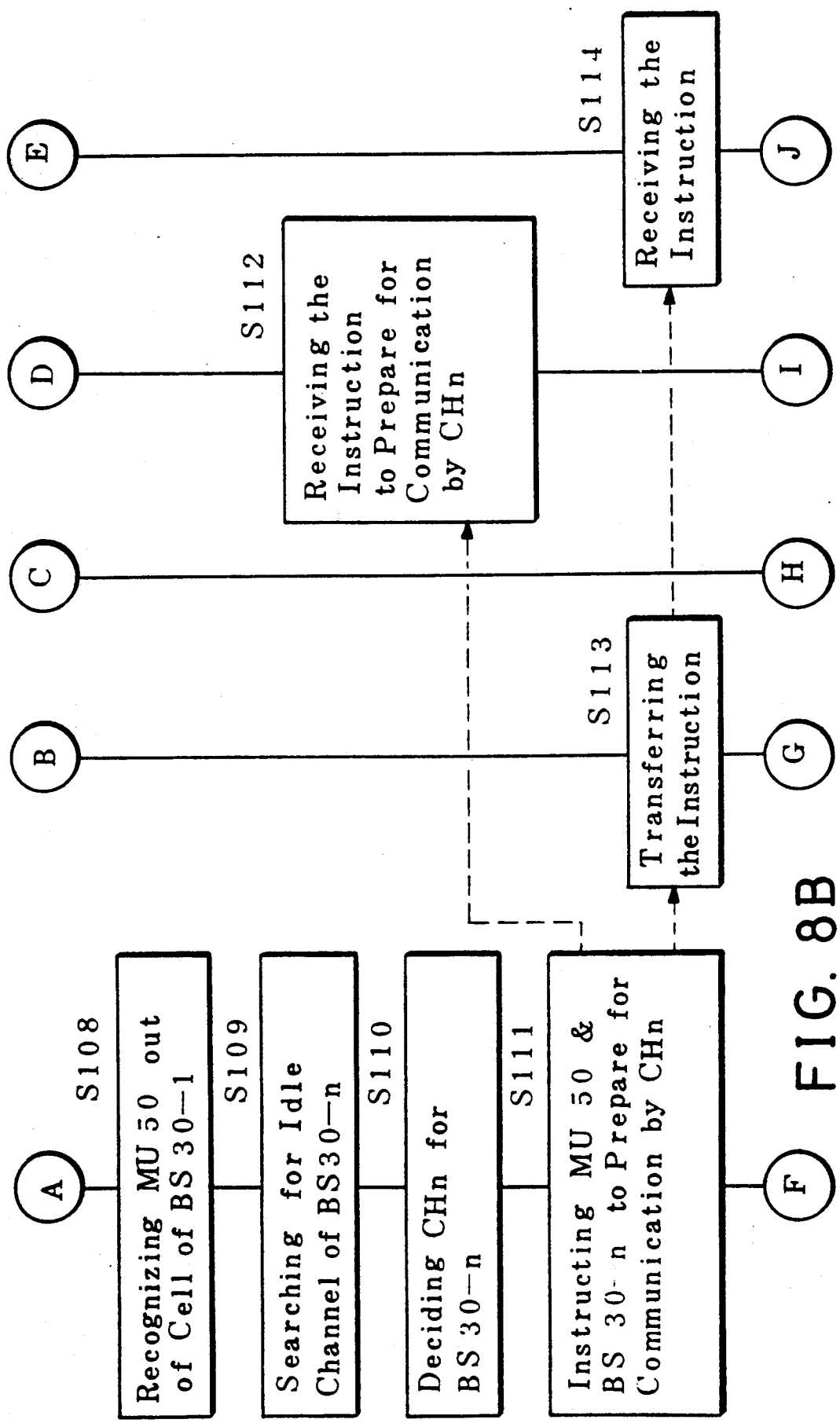
Figure 8D:
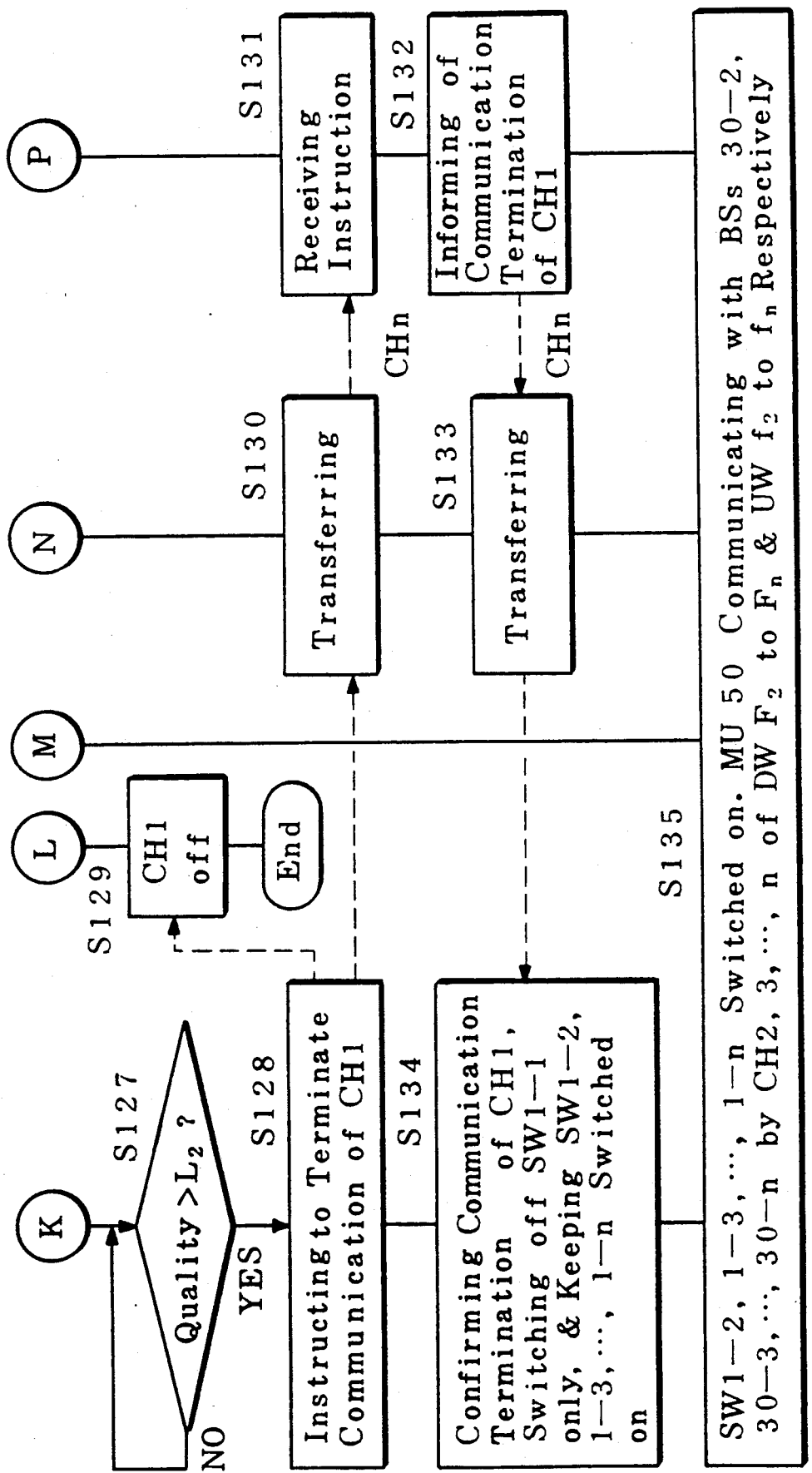

FIG. 7 is a timing chart showing the operations of the system according to the present invention shown in FIGS. 2A, 2B and 2C which are conducted before, during and after channel hand-off.

Referring to FIG. 7 showing the operation of channel hand-off, when the S/N supervisor 22 in the radiotelephone control unit 20 detects that the quality of the channel CH1 used between the base station 30-1 and the mobile unit 50 has lowered below the level $L_1$, the control unit 20 instructs the mobile unit 50 by using the channel CH1 to initiate preparation for enabling parallel reception of the radio wave transmitted from the base station 30-n through the channel CHn.

In response to this, the mobile controller 58 in the mobile unit 50 which is in a state wherein it receives the radio waves transmitted from the base stations 30-1, 30-2, . . . 30-(n−1) through the respective channels CH1, CH2, . . . CHn−1 using the multi-frequency synthesizers 55-1, 55-2, . . . 55-(n−1), respectively, activates the multi-frequency synthesizer 55-n to generate such a frequency that it is possible to receive the radio wave transmitted from the base station 30-n using the channel CHn.

Thus, when the communication with the base station 30-1 is going to be stopped due to lowering in the quality of the channel CH1 through which the radio wave from the base station 30-1 is being transmitted, communication with the base station 30-n using the channel CHn is initiated. More specifically, in the mobile unit 50 the repeated switching of the changeover switch 64-1 supplied with a switching signal from the receiving channel switching controller 65C is continued. At the same time, the mobile unit 50 is shifted from a state wherein radio waves are transmitted to the base stations 30-1 to 30-(n−1) using the channels CH1 to CHn−1 by activating the multi-frequency synthesizers 56-1, 56-2, . . . 56-(n−1) to a state wherein a radio wave can be transmitted to the base station 30-n using the channel CHn by activating the multi-frequency synthesizer 56-n in addition to the above-mentioned synthesizers. The respective outputs of the synthesizers 56-1, 56-2, . . . 56-n used for the transmission are repeatedly switched in response to a switching signal from the transmitting channel switching controller 67C.

The parrallel transmission-reception period during which radio waves are transmitted and received in parallel using the channels CH1, CH, . . . CHn continues until the radiotelephone control unit 20 confirms that the quality of the channel CHn is equal to or higher than a predetermined level $L_2$. Thereafter, the channel CH1 is released and the communication between the mobile unit 50 and the base stations 30-2, 30-3, . . . 30-n is continued without disconnection using the channels CH2, CH3, . . . CHn only.

The switching frequency $f_1$ for the changeover switches 64-1 and 64-2 during the parallel transmission-reception period is set, for example, 2n times or more the maximum frequency included in the signal. The switching frequency will be explained below more specifically. An optimal switching frequency is determined with the following various conditions taken into consideration:

1) Type of modulation of a signal to be transmitted
2) Frequency band of a speech signal to be transmitted
3) Frequency band of a control signal to be transmitted
4) Band characteristics of radio transmitter-receivers, particularly band characteristics of a high-frequency filter installed at the input end of the antenna
5) Waveform characteristics of switching controllers
6) Response characteristics of multi-frequency synthesizers
7) Carrier frequency and the number of channels used in the system
8) Radio wave propagation characteristics of transmission path
9) Transmission delay difference due to the difference between the signal transmission path from the radiotelephone control unit 20 to the mobile unit 50 via the base station 30-1 and the signal transmission path from the control unit 20 to the mobile unit 50 via the base station 30-2

For example, 1) frequency modulation is employed; 2) a frequency band of from 0.3 to 3.0 kHz is employed for the speech signal; and 3) when a band which is out of the speech signal frequency band shown in FIG. 3(a) is employed, the frequency of the control signal is equal to or lower than 0.3 kHz ($f_{D0}$) or in the range of from 3.8 to 4.5 kHz ($f_{D1}$, $f_{D2}$ . . . $f_{D8}$). As to the band characteristics stated in 4), it is preferable to select a pass band width of 16 kHz (or 8 kHz). As to the wave characteristics stated in 5), selection should be made so that the multi-frequency synthesizers have excellent response characteristics and an excellent output waveform is obtained as the condition stated in 6). It is preferable to employ synthesizers which respond as fast as possible to an input transmitted from the corresponding switching controllers stated in 5).

The items 7) to 9) are taken into consideration from the viewpoint of system design. Since the carrier frequency employed in a mobile telephone system described as one embodiment of the present invention is 900 MHz and the number of channels used in the system is 600, the frequency band width used in the system is 15 MHz (or 1200 channels and 15 MHz if interleave is used). The radio wave propagation characteristics of the transmission path are already known from many literatures. The transmission delay difference stated in 9) is about 0.03 msec.

With the above conditions taken into consideration comprehensively the switching frequency employed for the changeover switch 64-2 of the mobile unit 50, for example, in a mobile telephone system is selected at about 20×n MHz.

In the case where the receiving speech and control signals are digitized through a circuit such as that shown in FIG. 3(b), it is appropriate to employ a higher switching frequency, for example, about n×20 MHz to 30 MHz.

The carrier frequencies in the respective channels CH1, 2, 3, . . . , n−1, n which are applied to the input portion of the receiving mixer 63 are mixed with the respective output frequencies of the multi-frequency synthesizers 55-1, 55-2, . . . , 55-(n−1), 55-n in the receiving mixer 63 to obtain n intermediate frequencies at the output end of the intermediate frequency amplifier included in the receiving mixer 63. The n intermediate frequencies are amplified in the receiving portion 53 and then demodulated in the demodulator included in the receiving portion 53. If there is a frequency difference between the n intermediate frequencies, a distortion noise may be generated in the demodulated output signal. More specifically, in frequency modulation or phase modulation, if there is no frequency difference, no distortion noise is generated, whereas, if there is a frequency difference, when the frequency difference (beat frequency) includes the same component as that of the frequency of the speech or control signal, a distortion noise is generated, whereas, when it does not, no distortion noise is generated.

In the case of amplitude modulation, on the other hand, no distortion noise is generated even if there is a frequency difference. However, even in the case of amplitude modulation, if the intermediate frequency amplifier has non-linear characteristics, higher harmonics cause non-linear distortion and it is therefore necessary to employ an amplifier with excellent linearity.

Even if local oscillation frequencies for the channels CH1, CH2, ... CHn−1 and CHn are cyclically applied to the input end of the receiving mixer 63 in the mobile unit 50 as described above, when there is no frequency difference between the n intermediate frequencies and each input wave has the same power, there is no abnormality in communication and the shift from the channel CH1 to the channel CHn can be executed without an instantaneous disconnection nor mixing of noise. In addition, it is possible to obtain receiving diversity effect.

The following is a description of the cause of distortion noise and the removal of it.

The amplitudes $I_{01}, I_{02}, \ldots I_{0n}$ of the input waves in the channels CH1, CH2, ... CHn which are applied to the input end of the receiving mixer 63 are not always the same and, when the duty factor for switching at the changeover switch 64-1 is made uniform (i.e., in the case of a duty 100/n%), $I_{02}, I_{03}, \ldots I_{0n}$ are usually greater than $I_{01}$ since the base station 30-2 is at a shorter distance than the base station 30-1. If $I_{01}, I_{02}, \ldots I_{0n}$ are different from each other in size, there is a possibility that cross modulation will occur. Therefore, the duty of the switching signal delivered from the receiving channel switching controller 65C may be varied as a measure taken to make the amplitudes of these input waves equal to each other.

However, as a more effective measure in practical use, the on-state of the receiving channel switching controller 65C is increased so as to increase the duty for the one (assumed to be $I_{0n}$, for example) which has the largest receiving power among $I_{01}, I_{02}, \ldots I_{0n}$ (e.g., $I_{0n}$) as follows:

$$I_{0n} >> I_{01}, I_{02}, \ldots I_{0n-1}.$$

It is possible with this method to reduce cross modulation to such an extent that it can be ignored and also possible to obtain diversity effect. In an actual circuit, this method may be realized as follows.

If the receiving mixer 63 is connected to a radio channel in which a receiving input with a high S/N ratio is obtained for a relatively long period of time, it is possible to increase the efficiency of removing cross modulation and enhance the diversity effect. For this purpose, a signal-to-noise ratio at each time is detected synchronously with the changeover switch 64-1 and the detected S/N ratio is transmitted to the mobile controller 58 to vary the frequency of the output of the receiving channel switching controller 65C on the basis of the S/N ratio, thereby attaining the above-described objects. This can be done with the arrangement shown in FIG. 2B. In order to facilitate the technical description, however, the following explanation is made with reference to the arrangement shown in FIG. 2G.

The arrangement shown in FIG. 2G differs from that shown in FIG. 2B in that a receiving portion 52 for measuring C/N ratio, receiving mixer 73 and changeover switch 64-3 are installed in addition to the receiver 68 and the changeover switch 64-3 is controlled by the mobile controller 58B. The operation of the arrangement shown in FIG. 2G will be described below.

Referring to FIG. 2G, in order to activate the receiving portion 52 for measuring C/N ratio, the receiving mixer 73 is installed at the input side of the receiving portion 52. The receiving mixer 73 is supplied with a part of the receiving signal received by the mobile unit 50B. The output from the changeover switch 64-3 is applied to the receiving mixer 73 as a local oscillation frequency. However, unlike the other changeover switches 64-1 and 64-2, the changeover switch 64-3 is not necessary to switch at high speed but may be switched at a low speed, for example, about 10 Hz. When the changeover switch 64-3 is at a position where the output of the synthesizer 55-1 is available, the C/N value for the channel CH1 measured in the C/N measuring receiving portion 52 is transferred to the mobile controller 58B. Then, when the changeover switch 64-3 is at a position where the output of the synthesizer 55-2 is available, the C/N value for the channel CH2 is measured. Thereafter, similar operations are conducted successively. More specifically, when the changeover switch 64-3 is at a position where the output of a channel CHn is available, the C/N value for a channel CHn is measured and then transferred to the mobile controller 58B. With these values, the mobile controller 58B controls the switching frequency for each of the receiving and transmitting channel switching controllers 65C and 67C so that each controller operates at a speed which is inversely proportional to the C/N value.

In order to enable the above-described operation, it is necessary to make some alterations to the aforementioned method of transmitting the signal from each base station 30. The following is a description thereof.

The control signal that is transmitted from each base station 30 to the mobile unit 50 includes the ID of the base station 30 and this ID is needed to vary the duty for the changeover switch. The control signals that are transmitted from the base stations 30 can be taken out by passing the control signals given different signal frequencies through a filter.

Accordingly, the C/N ratio for each radio channel is measured and the ID of the base station 30 that transmits the signal concerned is added to the control signal when sent to the mobile controller 58B, thus enabling the mobile controller 58B to determine a duty factor for reception (or transmission) in relation to the C/N value for each radio channel, that is, for each base station 30.

To attain the above-described advantageous effect with the arrangement shown in FIG. 2B, it suffices to provide the receiving portion 53 with band filters for individually receiving the control signals respectively transmitted from the base stations 30-1, 30-2, ... 30-n and provide each band filter with a communication quality supervising means, for example, a means for measuring the signal-to-noise ratio, the measured value being reported to the mobile controller 58 to activate the changeover switch 64-1 at a switching duty corresponding to the signal-to-noise ratio.

Then, the transmitting and receiving diversity effect can be enhanced by activating the receiving portion 53 of the mobile unit 50 as detailed above.

In regard to cross modulation that occurs when a large number of carriers are mixed, distortion noise can be removed by the following method.

Namely, there is a method whereby the switching speed (period) of the changeover switch 64-1 is increased so that the switching frequency is out of the band-pass characteristics of the intermediate frequency amplifier. However, in the case where the switching frequency is determined to be 2n or more the maximum frequency of the signal, as has been described above, it is not necessary to raise it higher than that level.

The following is a description of a practical measure which may be taken to substantially equalize the n intermediate frequencies output from the intermediate frequency amplifier included in the receiving mixer 63.

The equalization of the n intermediate frequencies can be attained by enhancing the frequencity stability of the standard crystal oscillators that determine the stability of the carrier frequencies of the transmitting portions 31-1, 31-2, ... 31-n in the base stations 30-1, 30-2, ... 30-n. For example, the stability of a standard crystal oscillator installed in each base station in a typical existing mobile telephone system is on the order of from 0.5 to 1 ppm (0.5 to $1 \times 10^{-6}$) and therefore the carrier frequency fluctuation is $1 \times 10^{-6} \times 900$ MHz = 900 Hz. Consequently, noise mixes in the speech signal band.

However, if the stability is enhanced to a level of 0.01 ppm by progress in technology, the carrier frequency fluctuation is $1 \times 10^{-8} \times 900$ MHz = 9 Hz, so that, even if there is a higher harmonic that causes noise, there is a weak possibility of the large energy thereof mixing in the signal band. In a radio system that uses a carrier frequency of 9 MHz, a carrier frequency fluctuation of 1 ppm causes no noise to mix in the signal band even on the present level of technology.

A method of further enhancing the receiving diversity effect will next be explained. FIG. 2H shows one example of the arrangement of the mobile unit 50 which may be effectively employed in this method.

Referring to FIG. 2H, an input radio wave (i.e., input signal) to the mobile unit 50C is divided into n+1 equal portions in the antenna input portion, and the n+1 divided input signals arrive at receivers 68-1, 68-2, ... 68-n and an interference detector 62, respectively. The receivers 68-1 to 68-n respectively have receiving mixers 63-1, 63-2, ... 63-n and receiving portions 53-1, 53-2, ... 53-n. The receiving mixers 63-1 to 63-n are supplied with local oscillation frequencies from the multi-frequency synthesizers 55-1, 55-2, ... 55-n, respectively. Thus, the arrangement shown in FIG. 2H does not include the changeover switch 64-1 but enables signals transmitted through the channels CH1, CH2, ... CHn to be received and demodulated at all times.

One part of the output signal from each of the receiving portions 53-1 to 53-n is sent to the mobile controller 58C, while the other part of the output signal is applied to a mixer 69 where it is processed in the same way as in the case of the ordinary diversity receiver (in this case, mixing is effected after detection), and the processed signal is then sent to the telephone unit 59.

A circuit configuration such as that of the mobile unit 50C shown in FIG. 2H enables the diversity effect to be enhanced.

It should be noted that the circuit configuration shown in FIG. 2H or 2I has the advantage that it is possible to prevent occurrence of cross modulation which would otherwise be caused by a size difference between the input power amplitudes $I_{01}, I_{02}, \ldots I_{0n}$ and a frequency difference between the intermediate frequencies (i.e., the circuit configuration has no cause of such cross modulation).

In the last section, the operation that is conducted when the mobile unit 50 receives radio waves has been explained. The following is a description of an operation conducted when the mobile unit 50 transmits radio waves.

Referring to FIG. 2B, radio signals which are transmitted through, for example, the radio channels CH1, CH2, ... CHn are successively switched by the changeover switch 64-2. On the receiving side, the transmitted radio signals are received by the respective base stations 30-1 (CH1), 30-2 (CH2), ... 30-n (CHn); therefore there is no problem of cross modulation which may occur when radio signals are received by the mobile unit 50. However, there are angular frequency components as side band components and it is therefore necessary to provide a band-pass filter in the output portion of the transmitting mixer 61 and filter them out so that such angular frequency modulated components will not interfere with communication in other channels or in other systems.

To meet the requirements, the switching frequency for the changeover switch 64-2 must be set so that side band components are diffused out of the frequency band for all the channels in which the mobile unit 50 transmits radio waves. In the mobile telephone system shown in FIGS. 2A and 2B, it suffices to set the switching frequency so as to be equal to or higher than $15 \times n$ MHz.

With such a switching frequency, up signals which are transmitted through the channels CH1, CH-2, ... CHn are received by the base stations 30-1, 30-2, ... 30-n, respectively. These receiving signals are demodulated and then transmitted to the radiotelephone control unit 20. In the case where the base station 30-1 has the arrangement shown in FIGS. 2E and 2F, up signals which are transmitted through the channels CH1, CH2, ... CHi are received by the transmitter-receivers 90-1, 90-2, ... 90-i in the base station 30-1, respectively. After being demodulated, these signals are mixed and transmitted to the radiotelephone contorl unit 20 and other necessary units.

As will be clear from the foregoing description, employment of the multiplex transmission method and system according to the present invention enables signal diversity effect to be obtained at the receiving side.

Among the n signals transmitted from the base stations 30-1, 30-2, ... 30-n, the speech signals from these base stations are mixed together in the radiotelephone control unit 20. In this mixing process, the signals from the base stations 30-2, 30-3, ... 30-n are better in the transmission quality than the signal from the base station 30-1 and therefore may be mixed as they are or may be mixed after being varied in the output level in proportion to the S/N ratio. Thus, receiving diversity effect is obtained.

As will be clear from the foregoing description, the feature of the present invention resides in that the frequencies of radio signals transmitted from a mobile unit 50 are measured at base stations 30 to thereby predict a frequency deviation resulting after the old speech channel has been switched over to a new speech channel and a transmitting channel for a base station 30 with which the mobile unit 50 communicates after the channel hand-off is set up so that there will be no problem due to the frequency deviation, thus eliminating communication disconnection which has heretofore been caused by channel hand-off and removing noise generated by cross modulation which would otherwise occur at the time of channel hand-off.

The following is a description of the method of using the control signal that plays an important role in the channel hand-off during communication according to the present invention. The following description is made in regard to the mobile unit 50 shown in FIG. 2B.

The method of using the control signal will be explained in regard to the case where radio signals are transmitted to the mobile unit 50 from the base stations 30-1, 30-2, . . . 30-n using the channels CH1, CH2, . . . CHn, respectively.

Upon completion of the above-described channel hand-off preparation, speech signals are transmitted to the receiver 68 of the mobile unit 50 from the base stations 30-1, 30-2, . . . 30-n using the channels CH1, CH2, . . . CHn, respectively, and successively switched over from one to another by the changeover switch 64-1 in the mobile unit 50. Thus, speech signals are received in parallel by the mobile unit 50. Since the changeover switch 64-2 also starts its operation, parallel transmission of radio waves from the mobile unit 50 is also initiated.

Since the delay difference due to the difference (within 10 km) between the transmission paths that extend from the radiotelephone control unit 20 to the mobile unit 50 via the base stations 30-1 to 30-n is 0.03 msec or less at the most, it causes no hindrance to the operation and, therefore, the delay difference can be ignored. Although the down signals that are transmitted from the base stations 30-2, 30-3, . . . 30-(n−1) comprise speech signals only, the down signals from the base stations 30-1 and 30-n comprise speech signals and control signals (i.e., identification signals for discrimination between the base stations 30-1 and 30-n and switching command signals) which are inserted in the form of out-band signals such as those shown in FIG. 3(a); therefore, the receiver 68 of the mobile unit 50 receives and transfers the control signals to the mobile controller 58.

The mobile controller 58 discriminates the signals. According to instructions issued from the radiotelephone control unit 20, the channel hand-off instruction is first transmitted from the base station 30-1 and then the speech signal in the channel CHn and the ID signal are transmitted from the base station 30-n. Confirming that the quality of these signals is good, the mobile controller 58 of the mobile unit 50 activates the transmitter 68 to inform the control unit 20 of the confirmed matter via the base station 30-n by using the speech channel CHn and employing a frequency which is out of the frequency band for the up speech signals.

Receiving the information that the down communication between the base station 30-n and the mobile unit 50 is working well, the control unit 20 instructs the communication controller 21 to turn off only the switch SW1-1 among the switches SW1-1, 1-2, . . . 1-n in the switch group 23. On the other hand, the mobile unit 50 stops the transmission of the radio signal to the base station 30-1 by suspending the operation of the multi-frequency synthesizer 55-1 and instructs the changeover switch 64-1 (see FIG. 2B) to switch the multi-frequency synthesizers 55-2, 55-3, . . . 55-n from one to another cyclically. These operations are shown in FIG. 7.

The following is a description of an operation conducted when radio signals are transmitted from the mobile unit 50 to the base stations 30-1, 30-2, . . . 30-n using the channels CH1, CH2, . . . CHn, respectively.

In the mobile unit 50, the receiving channel switching controller 65C and the transmitting channel switching controller 67C are activated according to instructions from the radiotelephone control unit 20, so that the changeover switches 64-1 and 64-2 are successively switching the outputs of the multi-frequency synthesizers 55-1, 55-2, . . . 55-n and 56-1, 56-2, . . . 56-n, which are in an operative state, to effect parallel transmission and reception of radio signals through the channels CH1, CH2, . . . CHn. Signals which are transmitted through the speech channels during the above-described operation include speech signals, out-band control signals [see FIG. 3(a)], a signal representing the condition of channels used in the mobile unit 50 (i.e., the fact that the channels used are being shifted from the channels CH1, CH2, . . . CHn to the channels CH2, CH3, . . . CHn), the ID of the mobile unit 50, etc. [e.g., tone signals such as $f_{D1}$, $f_{D2}$ and $f_{D3}$ shown in FIG. 3(a) or a combination thereof].

The up signal transmitted through a channel CHi which is received by a base station CHi is demodulated in the receiving portion 53 in the base station 30-i and, after it has been confirmed that the demodulated speech and out-band signals have no abnormality, these signals are transferred to the radiotelephone control unit 20. In the control unit 20, among the n signals from the base stations 30-1, 30-2, . . . 30-n, the speech signals from the base stations 30-1, 30-2, . . . 30-n are mixed together. The control unit 20 confirms that the signals have been transmitted from the base stations 30-1, 30-2, . . . 30-n through the channels CH1, CH2, . . . CHn, respectively, on the basis of those identification signals in the n signals from the base stations 30-1, 30-2, . . . 30-n which have been added thereto in the respective base stations 30-1, 30-2, . . . 30-n and transmitted in a frequency band out of the speech signal frequency band.

Upon confirming that the operation of channel hand-off during communication is smoothly progressing, the radiotelephone control unit 20 sends a control signal to instruct the mobile controller 38 in the mobile unit 50 via the base station 30-n and through the channel CHn to stop the communication with the base station 30-1 through the channel CH1 and to devote the mobile unit 50 to the communication with the base stations 30-2, 30-3, . . . 30-n.

Receiving the control signal, the mobile controller 58 in the mobile unit 50 suspends the operation of the multi-frequency synthesizers 55-1 and 56-1, sets the position of the receiving channel selecting changeover switch 64-1 so that the multi-frequency synthesizers 55-2, 55-3, . . 55-n are cyclically switched over from one to another, and instructs the transmitting channel selecting changeover switch 64-2 to continue the operation of cyclically switching the multi-frequency synthesizers 56-2, 56-3, . . . 56-n.

As a result, the mobile unit 50 finishes the communication with the base station 30-1 by the channel CH1 and enters into communication with the base stations 30-2, 30-3, . . . 30-n using the channels CH2, CH3, . . . CHn, respectively. Thus, the channel hand-off operation is completed and a state of communication using a new radio channel group is realized. The above-described hand-off operations for up channels and down channels are executed in parallel and completed at substantially the same time.

As will be clear from the foregoing description, during the operation of channel hand-off, no communication disconnection occurs and the noise level can be held at such a low level that there is no problem in practical use.

It should be noted that, if an operation failure or mal-operation occurs during any of the above-described operations, the operation process is executed over again from the step immediately preceding the step in which the trouble occurred. When the trouble is serious, a control process is executed such that the new speech channel is switched back to the speech channel used before the hand-off operation which has been stored in the memory incorporated in the mobile controller 58.

FIGS. 8A to 8D are flowcharts showing in combination the flow of the operation of the system shown in FIGS. 2A, 2B and 2C.

It is assumed that the radiotelephone control unit 20, the base stations 30-1, 30-2, ... 30-n, the mobile unit 50 are activated and the switches SW1-1, 1-2, ... 1-(n−1) of the switch group 23 included in the control unit 20 are on and the base stations 30-1, 30-2, ... 30-(n−1) and the mobile unit 50 are in communication with each other. In this communication are used the channels CH1, CH2, ... CH-(n−1) of down frequencies $F_1$, $F_2$, ... $F_{n-1}$ and up frequencies $f_1$, $f_2$, ... $f_{n-1}$ allotted by the communication controller 21 included in the control unit 20 (S101 shown in FIG. 8A).

The base stations 30-1, 30-2, ... 30-n which are engaged in communication constantly inform the control unit 20 of the status of receiving the radio signals from the mobile unit 50 (S102). Receiving the information, the S/N supervisor 22 in the control unit 20 watches whether or not the signal quality has deteriorated below the level $L_1$ (S103). If the signal quality has deteriorated below the level $L_1$ (i.e., if YES is the answer in S103), the communication controller 21 instructs base stations 30 adjacent to the base stations 30-1, 30-2, ... 30-(n−1) to monitor the signals of the up frequencies $f_1$, $f_2$, ... $f_{n-1}$ used in the communication between the mobile unit 50 and the base stations 30-1, 30-2, ... 30-(n−1) (S104).

Each of the adjacent base stations 30 (e.g., the base station 30-n) receiving the monitoring instruction monitors the signal of frequency $f_1$ (S105) and informs the S/N supervisor 22 in the control unit 20 of the result of the monitoring (S106). Receiving the information, the control unit 20 makes a comparison between the levels of receiving quality monitored by and transmitted from the base stations 30. If it is detected that the communication quality of a base station 30, for example, the base station 30-n, is higher than a predetermined level $L_2$ and the best (i.e., if YES is the answer in S107), the control unit 21 recognizes that the mobile unit 50 has moved out of the zone covered by the base station 30-1 and into the zone covered by the base station 30-n (S108 shown in FIG. 8B), and searches for an idle channel which can be used by the base station 30-n in order to switch the communication with the base station 30-1 to communication with the base station 30-n (S109). As a result, the control unit 20 decides to use the channel CHn for the base station 30-n (S110). The communication controller 21 instructs the transmitting portion 51-2 and the receiving portion 53-2 of the mobile unit 50 to prepare for communication by the channel CHn (S111).

Receiving the instruction to prepare for communication by the channel CHn, the base station 30-n prepares for communication by the channel CHn (S112). At the same time, the instruction is transmitted from the base station 30-1 by the channel CH1 (S113). Receiving the instruction (S114), the mobile unit 50 makes preparations for enabling communication by the channel CHn, that is, instructs the mobile controller 58 to control the multi-frequency synthesizers 55-n and 56-n such that it is possible to carry out reception at the frequency $F_n$ and transmission at the frequency $f_n$ and also instructs the switching controllers 65 and 67 to start switching operations (S115 shown in FIG. 8C).

When preparations for communication using the channel CHn have been made, the mobile unit 50 informs the base station 30-n of the completion of preparations by using the channel (S116). Receiving the information, the base station 30-n confirms that preparations for communication by the channel CHn have been completed in the step S112 and then informs the control unit 20 of the completion of preparations (S117).

Confirming the completion of preparations for communication between the base station 30-n and the mobile unit 50 by the channel CHn (S118), the control unit 20 keeps the switches SW1-1, 1-2, ... 1-(n−1) of the switch group 23 on and further turns on the switch SW1-n (S119).

Then, the communication controller 21 included in the control unit 20 instructs the base station 30-n to start communication with the mobile unit 50 by the channel CHn (S120).

Receiving the communication start instruction (S121), the base station 30-n transfers the communication start instruction by the channel CHn (S122). The mobile unit 50 confirms the start of communication using the channel CHn by the ID signal used to identify the base station 30-n (S123) and then transmits a communication signal including the ID of the mobile unit 50 by the use of the channel CHn (S124). Receiving the signal, the base station 30-n informs the control unit 20 of the start of communication by the channel CHn (S125).

Confirming the start of communication by the channel CHn (S126), the S/N supervisor 22 in the control unit 20 measures the quality level of communication between the mobile unit 50 and the base station 30-n. If it is detected that the quality level is equal to or higher than a predetermined level $L_2$ (i.e., if YES is the answer in S127 shown in FIG. 8D), the control unit 20 instructs the base stations 30-1 and 30-n to terminate the communication between the base station 30-1 and the mobile unit 50 by the channel CH1 (S128).

Receiving the instruction, the base station 30-1 terminates the communication by the channel CH1 (S129). On the other hand, the base station 30-n transfers the communication termination instruction to the mobile unit 50 (S130). Receiving the instruction to terminate the communication by the channel CH1 (S131), the mobile unit 50 suspends the operations of the multi-frequency synthesizers 55-1 and 56-1 and instructs the changeover switch 64-1 to suspend switching to the output terminal of the multi-frequency synthesizer 55-1 and also the changeover switch 64-2 to suspend switching to the output terminal of the multi-frequency synthesizer 56-1 (although this operation is not necessarily needed) so that the mobile unit 50 operates by the channels CH2, 3, ... n, and then the mobile unit 50 informs the base station 30-n using the channel CHn of the termination of communication by the channel CH1 (S132). The base station 30-n transfers the communication termination information to the control unit 20 (S133).

Confirming the termination of communication by the channel CH1, the communication controller 21 in the control unit 20 keeps the switches SW1-2, 1-3, ... 1-n of the switch group 23 on and turns off the switch SW1-1 (S134).

Thus, the channel hand-off operation period terminates, and with the switches SW1-2, 1-3, ... 1-n kept on the mobile unit 50 can continue communication of high quality with the base stations 30-2, 30-3, ... 30-n by the channels CH2, CH3, ... CHn of down frequencies $F_2$, $F_3$, ... $F_n$ and up frequencies $f_2$, $f_3$, ... $f_n$ without instantaneous disconnection nor mixing of noise but with the transmitting and receiving diversity effect (S135).

(6) Estimation of a direction and speed of movement of a mobile unit and allotment of speech channels to cope with traffic congestion It is possible to detect a direction and speed of movement of a mobile unit 50 by measuring changes in the level of electric field received by a plurality of base stations 30 which are in communication with the mobile unit 50 or changes in the communication quality detected at these base stations 30 and making a comparion between the detected changes. Detection of a direction and speed of movement of a mobile unit 50 will be explained below with reference to FIG. 9.

Figure 9:
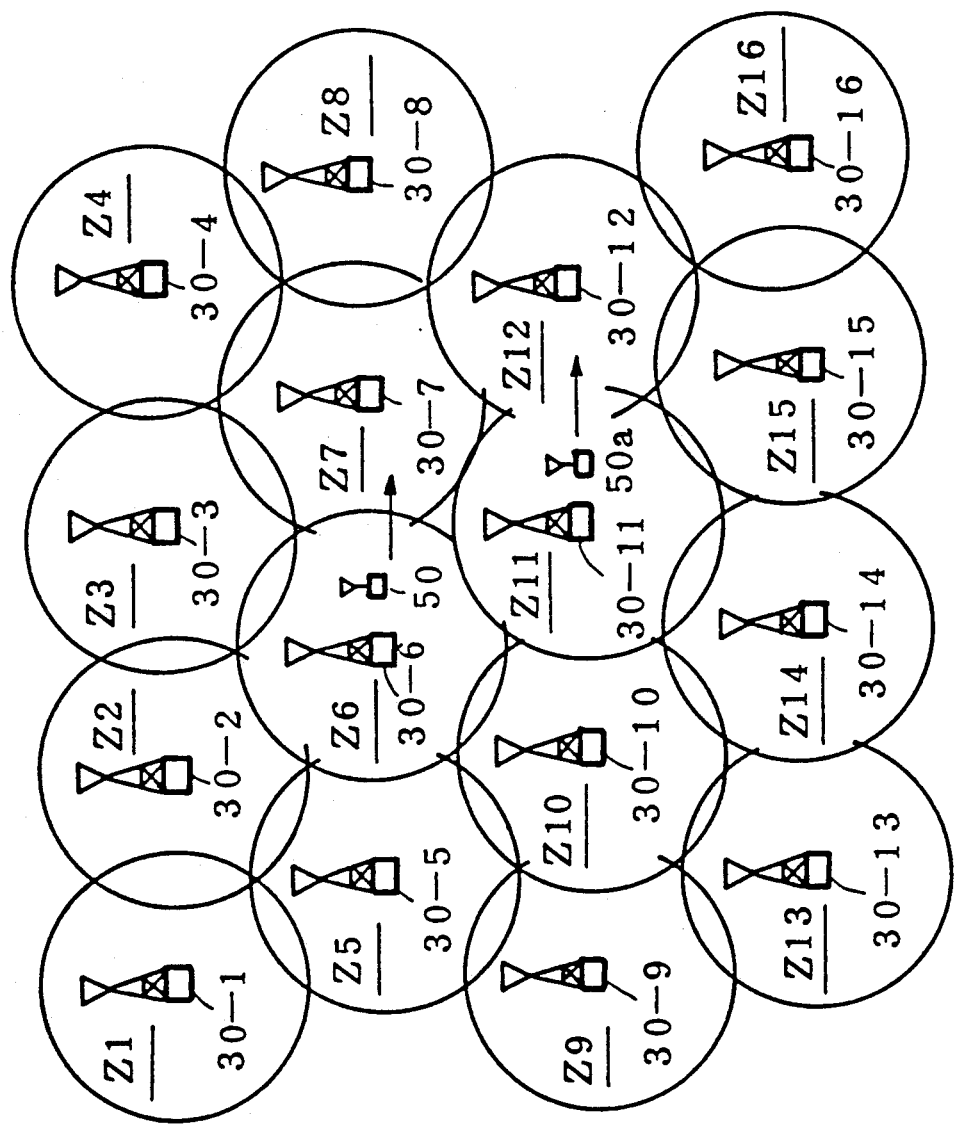
FIG. 9 is a schematic view showing the operation of detecting a direction and speed of movement of a mobile unit.

Sixteen circles shown in FIG. 9 denote small cells Z1 to Z16 in a service area. More specifically, the circles show areas within which communication is available from base stations 30-1, 30-2, ... 30-16 which are installed at or near the respective centers of the circles. It is assumed that a presently communicating mobile unit 50 is within the cell Z6 and the mobile unit 50 is in diversity communication with seven base stations 30-2, 30-3, 30-5, 30-6, 30-7, 30-10 and 30-11. The mobile unit 50 is assumed to be moving in the direction of the arrow shown in FIG. 9. The seven base stations that are receiving the signal transmitted from the mobile unit 50 are respectively measuring the levels of electric field of the signal received thereby or the levels of receiving quality. The measured values are collected to the control unit 20. Comparing these measured results, the control unit 20 estimates a direction and speed of movement of the mobile unit 50 by the following methods.

As to the direction of movement of the mobile unit 50, it is possible to estimate the mobile unit 50 to be moving toward a base station (30-7 in the case of FIG. 9) the observed receiving electric field level of which changes in the increasing direction at the highest rate. In order to obtain results of high reliability, it is important to select an appropriate period of time for measurement. However, the measuring time strongly depends on the speed of the mobile unit 50. More specifically, the radio wave propagation characteristics change every moment and it is therefore possible to eliminate variations of measured values by carrying out measurement during each period which is long to a certain extent (i.e., 1 to 5 seconds in the case of an automobile).

In the case of FIG. 9, the results of measurement thus obtained may be shown, for example, in order from the base station 30 having the largest increase in the input electric field intensity as follows:

30-7 > 30-11 > 30-3.

If the results of measurement are shown in order from the base station 30 having the largest decrease in the input electric field intensity, the order may be as follows:

30-6 > 30-10 > 30-2 > 36-5.

The speed of movement of the mobile unit 50 can be estimated by comparing the results of measurement with a radio wave propagation curve previously obtained from radio wave propagation characteristics.

With the above-described results of measurement, the destination of the mobile unit 50 is presumed and, when it is found that the communication traffic at the base station 30 in a zone into which the mobile unit 50 is presumed to be moving is congested, the number of base stations 30 communicating with other mobile units 50 at said base station 30 can be reduced according to the kind of communication being held by said mobile units 50. In the case where the traffic congestion extends over not only one cell but a plurality of cells, it is necessary to take a measure to cope with the traffic congestion over a wide area. This is experienced with a mobile telephone system or the like in the center of a big city. Application of the present invention to such a phenomenon will next be explained in detail on the assumption that the base stations 30-6, 30-7 and 30-11 in FIG. 9 are congested with communication traffic.

It is assumed that a mobile unit 50a which is moving in the direction of the arrow within the zone Z11 transmits an outgoing call signal. The call signal is received by the radiotelephone control unit 20 to determine a speech channel to be allotted. When the traffic is not congested, speech channels which are used at the base stations 30-6, 30-7, 30-10, 30-11, 30-12, 30-14, 30-15, etc. are allotted (i.e., diversity transmission and reception are conducted). However, when the above-described three cells (Z6, 7 and 11) are congested with communication traffic, the channels that are used at the base stations 30-6, 30-7 and 30-11 are not allotted. At this time, a base station 30 the communication quality of which is the best is, as a matter of course, the base station 30-11; however, no channel is allotted thereto for the reason described above. If the degree of multiplex in diversity, that is, quadruple (i.e., four base stations 30-10, 30-12, 30-14 and 30-15) will not suffice, the radiotelephone control unit 20, which is capable of estimating a direction and speed of movement of the mobile unit 50a, allots channels that are used at the base stations 30-8 and 30-16 which are located in the area toward which the mobile unit 50a is moving. Accordingly, the mobile unit 50a starts communication with the base stations 30-8 and 30-16 which are relatively remote therefrom, although it is within the zone Z11.

The quality of communication between a mobile unit 50 and a base station 30 is supervised by the quality supervisor 37 (see FIGS. 2C and 2D) or the quality supervisory receiver 93 (see FIG. 2E) in the base station 30. However, such a quality supervisor may be provided in the mobile unit 50 (see FIGS. 2B and 2H) to measure the level of communication quality and inform the base station 30 of the result of measurement via the transmitter 66.

Application of the foregoing channel allotting method makes it possible to cope with traffic congestion in a high traffic density area which has not heretofore been solved by the conventional system technology.

(7) Concerning lowering in switching frequency for repeated switching employed, for example, in the operation of channel hand-off during communication In the foregoing sections, that is, from (1) Position registration and (2) Call originating operation to (5) Operation of channel hand-off during communication, the switching frequency that is output from the transmitting or receiving channel switching controller 47 or 45 included in the base station 30B or 30C (see FIGS. 2D and 2F) or from the transmitting or receiving channel switching controller 67C or 65C included in the mobile unit 50, 50B or 50C (see FIGS. 2B and 2H) has been described on the premise that the switching frequency is set at a relatively high level to obtain favorable results. In this section, however, a description will be made in regard to the operation and resulting advantages in the case where the switching frequency is set at a relatively low level. The term "low frequencies" is herein employed to means frequencies which are lower than audible frequencies, that is, 10 Hz or lower.

Lowering in the switching frequency of the transmitting channel switching controller 67C will first be explained.

The signal that is transmitted from a mobile unit 50 includes a large number of carriers at each of the upper and lower sides of the central carrier at spacings corresponding to the switching frequency. Since the frequency difference between the carriers is 10 Hz or less, it is impossible to filter the carriers with a band filter provided in the output portion of the transmitting mixer 61. Accordingly, the large number of carriers are present in the same channel and sent from the antenna in the form of a transmitting output.

The following is a description of the effects of those large number of carriers on other systems or other channels in the same system which are output from the antenna while being present at each of the upper and lower sides of the central carrier at an extremely high density, that is, at spacings corresponding to the switching frequency.

In conclusion, it is possible to declare that there is no adverse effect in the case described above. More specifically, in the above-described case the carriers can be considered to be the same carrier wave as viewed from other channels or other systems. Considering the ratio of desired signal D to undesired signal U (interference noise in this case) that is expressed as disturbance to other systems, both D and U mean levels of electric power which fall in the same channel. Thus, since these two signal components are present in the same channel, even if the noise component has a large number of different frequency components, these components are considered to be the same noise power.

Considering the frequency distribution of interferences with signals having a frequency band width, it is expected that interference radio power having a plurality of frequency components can be reduced more than in the case of a single frequency component. This is because a noise component of a specific frequency is relatively small in a noise component having a large number of different frequency components.

The following is a description of the case where a signal that includes a noise component having a large number of frequency components as in the above is transmitted and demodulated in the receiver 68. In this case, the filter (not shown) that is provided in the output portion of the receiving mixer 63 does not function as a filter as in the case of the transmitting mixer 61; therefore, the received signal that includes a group of carriers is amplified in the intermediate frequency amplifier and then input to the demodulator. The signal is then demodulated in the frequency discriminator to generate noise components having spacings corresponding to the switching frequency.

Since the switching frequency is a low frequency, a large number of higher harmonics are generated in the low frequency region. In this case, therefore, it is not advisable from the viewpoint of interference to set control signals in a frequency band lower than the speech frequency band such as that shown in FIG. 3(a) and a higher frequency band should be used for control signals. In addition, it is necessary in order to avoid an adverse effect on the speech signal to set the switching frequency at a low level, e.g., 10 Hz or lower.

The following is a description of the case where the switching frequency for the receiving channel switching controller 65C is set at a relatively low level. The signal that is output from the band filter provided in the output stage of the receiving mixer 63 includes a large number of frequency components which are output at spacings corresponding to the switching frequency. In consequence, a noise component having a large number of frequency components at spacings corresponding to the switching frequency is generated from the output end of the frequency discriminator.

Accordingly, in this case also, a large number of higher harmonics are generated in the low frequency region to become noise components unfavorable to the desired signal. Therefore, in this case also it is not advisable to set control signals in a frequency band lower than the speech frequency band such as that shown in FIG. 3(a) and control signals should be set in a frequency band higher than the speech frequency band.

As will be clear from the foregoing description, it is preferable to raise the switching frequency for repeated switching used, for example, in the operation of channel hand-off during communication since a sufficiently high switching frequency has no adverse effect on control signals that use a frequency band lower than the speech signal frequency band and is therefore convenient. However, if it is approved that the switching frequency has some minute effects on control signals, the low-frequency switching operation has the following merits:

(i) All the modulated signal components can be transmitted to the antenna as effective components without being filtered even partially.

(ii) Interferences within the same channel or between a pair of adjacent channels are small.

(iii) It is possible to lower the cost of the receiving or transmitting channel switching controller 65C, 67C or the changeover switches 64-1, 64-2.

As will be clear from the foregoing description, application of the present invention to a mobile communication system that employs a cellular system eliminates the problems experienced in the conventional systems, such as instantaneous disconnection caused when a mobile unit which is engaged in conversation (communication) moves from one zone to another, deterioration in the picture quality experienced with the facsimile or data signal and occurrence of burst signal errors. More specifically, there is on fear of these problems even when the frequency of channel hand-off during communication increases. Further, adoption of economical transmitting and receiving diversity improves the communication quality, and reduction of interferences leads to an increase in the effective frequency utilization factor. As a result, a novel service that employs wide-band signals is technically made available.

In addition, it is possible to improve the communication quality by effectively using radio equipment when the communication traffic is not congested. When the traffic increases rapidly in a certain cell, the number of usable channels can be substantially increased. Further, even when the traffic is at a peak, it is possible to process the position registration signal transmitted from a mobile unit. Furthermore, effective speech channel allotment is enabled by detecting a direction and speed of movement of a mobile unit. Thus, it is possible to construct a mobile communication system which is economical and has high frequency utilization efficiency.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A communication method for a mobile communication network including a plurality of radiotelephone base station means respectively covering a plurality of cells to define in combination a service area, mobile unit means present in said service area, and radiotelephone control means for connecting together each of said base station means and an ordinary telephone network, said method comprising:

detecting a direction and speed of movement of said mobile unit means on the basis of changes in receiving quality including electric field received by said plurality of radiotelephone base station means, presuming the destination of said mobile unit means, checking the communication traffic condition at the radiotelephone base station means located at the destination of said mobile unit means, and reducing, when the communication traffic is congested, the number of radiotelephone base station means engaged in communication with other mobile unit means which are in communication with said radiotelephone base station means located at the destination of said mobile unit means according to the kind of communication held by said other mobile unit means, in said radiotelephone control means while said mobile unit means is in communication with a plurality of radiotelephone base station means which are in the vicinity of it, thereby;

setting up and releasing speech paths between at least two of said radiotelephone base station means and said mobile unit means and also renewing the radiotelephone base station means engaged in communication so that it is possible to change speech paths from one to another, and enabling communication between said mobile unit means and said at least two radiotelephone base station means.

2. A communication method for a mobile communication network including a plurality of radiotelephone base station means respectively covering a plurality of cells to define in combination a service area, mobile unit means present in said service area, and radiotelephone control means for connecting together each of said base station means and an ordinary telephone network, said method comprising:

detecting a direction and speed of movement of said mobile unit means on the basis of changes in receiving quality including electric field received by said plurality of radiotelephone base station means and allotting preferentially a radio channel which enables a predetermined level of speech quality to be ensured among radio channels belonging to radiotelephone base station means located in the detected direction of movement of said mobile unit means when an operation of channel hand-off during communication is executed, in said radiotelephone control means while said mobile unit means is in communication with a plurality of radiotelephone base station means which are in the vicinity of it, thereby;

setting up and releasing speech paths between at least two of said radiotelephone base station means and said mobile unit means and also renewing the radiotelephone base station means engaged in communication so that it is possible to change speech paths from one to another, and enabling communication between said mobile unit means and said at least two radiotelephone base station means.

3. A communication method for a mobile communication network including a plurality of radiotelephone base station means respectively covering a plurality of cells to define in combination a service area, mobile unit means present in said service area, and radiotelephone control means for connecting together each of said base station means and an ordinary telephone network, said method comprising:

detecting a direction and speed of movement of said mobile unit means as well as the position thereof on the basis of changes in communication quality including electric field received by a plurality of radiotelephone base station means which are in communication with said mobile unit means, in said radiotelephone control means, thereby;

setting up and releasing speech paths between at least two of said radiotelephone base station means and said mobile unit means and also renewing the radiotelephone base station means engaged in communication so that it is possible to change speech paths from one to another, and enabling communication between said mobile unit means and said at least two radiotelephone base station means.

4. A mobile communication system comprising:

a plurality of radiotelephone base station means, each of which includes:

radio receiver means including a receiving mixer for receiving an allotted radio channel;

receiving synthesizer means for applying to said receiving mixer a frequency required to receive said allotted radio channel;

radio transmitter means including a transmitting mixer for transmitting an allotted radio channel;

transmitting synthesizer means for applying to said transmitting mixer a frequency required to transmit said allotted radio channel;

standard frequency oscillator means for supplying a standard frequency to both said receiving and transmitting synthesizer means;

quality supervisory means for supervising the communication quality of a signal which is being received by said receiver means and outputting communication quality information;

ID recognition memory means for storing said identification information registered at said radiotelephone control means; and control means for allotting a radio channel to be received to said receiving synthesizer means and a radio channel to be transmitted to said transmitting synthesizer means on the basis of said identification information stored in said ID recognition memory means, and for determining whether or not said radiotelephone base station means should participate in said communication by taking into consideration the order of priority given to predetermined kinds of communication, when the communication traffic varies in the area covered by said radiotelephone base station means engaged in communication with said mobile unit means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

5. A mobile communication system comprising:

a plurality of radiotelephone base station means, each of which includes:

receiving synthesizer means for generating frequencies required to receive i up radio channels among n up radio channels, i being equal to or greater than 2 and equal to or smaller than n, i.e., $2 \leq i \leq n$;

receiving channel switching means for successively switching the outputs of said receiving synthesizer means so that it is possible to receive said i up radio channels in parallel;

transmitting synthesizer means for generating frequencies required to transmit i down radio channels among n down radio channels, i being equal to or greater than 2 and equal to or smaller than n, i.e., $2 \leq i \leq n$;

transmitting channel switching means for successively switching the outputs of said transmitting synthesizer means so that it is possible to transmit said i down radio channels in parallel;

standard frequency oscillator means for supplying a standard frequency to both said receiving and transmitting synthesizer means; and control means for allotting frequencies to be generated to said receiving and transmitting synthesizer means and also giving switching instructions to said receiving and transmitting channel switching means, and for determining whether or not said radiotelephone base station means should participate in said communication by taking into consideration the order of priority given to predetermined kinds of communication, when the communication traffic varies in the area covered by said radiotelephone base station means engaged in communication with said mobile unit means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

6. A mobile communication system comprising:

a plurality of radiotelephone base station means, each of which includes:

common antenna means;

a plurality of transmitter-receiver means each including a pair of transmitter and receiver means connected to said common antenna means;

a plurality of quality supervisory means for supervising the communication quality at said transmitter-receiver means;

at least one control transmitter-receiver means for transmitting and receiving control signals; and control means for allotting radio channels to be transmitted and received to said plurality of transmitter-receiver means and to said at least one control transmitter-receiver means and also allotting radio channels to be supervised to said plurality of quality supervisory means, and for determining whether or not said radiotelephone base station means should participate in said communication by taking into consideration the order of priority given to predetermined kinds of communication, when the communication traffic varies in the area covered by said radiotelephone base station means engaged in communication with said mobile unit means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

7. A mobile communication system comprising:

a plurality of radiotelephone base station means, each of which includes:

common antenna means;

a plurality of transmitter-receiver means each including a pair of transmitter and receiver means connected to said common antenna means, receiving synthesizer means for generating frequencies required to receive i up radio channels among n up radio channels, i being equal to or greater than 2 and equal to or smaller than n, i.e., $2 \leq i \leq n$, receiving channel switching means for successively switching the outputs of said receiving synthesizer means so that it is possible to receive said i up radio channels in parallel, transmitting synthesizer means for generating frequencies required to transmit i up radio channels among n down radio channels, i being equal to or greater than 2 and equal to or smaller than n, i.e., $2 \leq i \leq n$, and transmitting channel switching means for successively switching the outputs of said transmitting synthesizer means so that it is possible to transmit said i down radio channels in parallel;

a plurality of quality supervisory means for supervising the communication quality at said transmitter-receiver means;

at least one control transmitter-receiver means for transmitting and receiving control signals; and control means for allotting radio channels to be transmitted and received to said plurality of transmitter-receiver means and to said at least one control transmitter-receiver means and also allotting radio channels to be supervised to said plurality of quality supervisory means, and for determining whether or not said radiotelephone base station means should participate in said communication by taking into consideration the order of priority given to predetermined kinds of communication, when the communication traffic varies in the area covered by said radiotelephone base station means engaged in communication with said mobile unit means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

8. A mobile communication system comprising:

a plurality of radiotelephone base station means, each of which includes:

radio receiver means including a receiving mixer for receiving an allotted radio channel;

receiving synthesizer means for applying to said receiving mixer a frequency required to receive said allotted radio channel;

radio transmitter means including a transmitting mixer for transmitting an allotted radio channel;

transmitting synthesizer means for applying to said transmitting mixer a frequency required to transmit said allotted radio channel;

standard frequency oscillator means for supplying a standard frequency to both said receiving and transmitting synthesizer means;

quality supervisory means for supervising the communication quality of a signal which is being received by said receiver means and outputting communication quality information;

ID recognition memory means for storing said identification information registered at said radiotelephone control means; and control means for allotting a radio channel to be received to said receiving synthesizer means and a radio channel to be transmitted to said transmitting synthesizer means on the basis of said identification information stored in said ID recognition memory means, for detecting a direction and speed of movement of said mobile unit means on the basis of changes in receiving quality including electric field received by said plurality of radiotelephone base station means, presuming the destination of said mobile unit means, checking the communication traffic condition at the radiotelephone base station means located at the destination of said mobile unit means, and for effecting control, when the communication traffic is congested, such that the communication between other mobile unit means which are in communication with said radiotelephone base station means at the destination of said mobile unit means and other radiotelephone base station means is stopped according to the kind of communication held by said other mobile unit means, while said mobile unit means is in communication with a plurality of radiotelephone base station means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

9. A mobile communication system comprising:

a plurality of radiotelephone base station means, each of which includes:

receiving synthesizer means for generating frequencies required to receive i up radio channels among n up radio channels, i being equal to or greater than 2 and equal to or smaller than n, i.e., $2 \leq i \leq n$;

receiving channel switching means for successively switching the outputs of said receiving synthesizer means so that it is possible to receive said i up radio channels in parallel;

transmitting synthesizer means for generating frequencies required to transmit i down radio channels among n down radio channels, i being equal to or greater than 2 and equal to or smaller than n, i.e., $2 \leq i \leq n$;

transmitting channel switching means for successively switching the outputs of said transmitting synthesizer means so that it is possible to transmit said i down radio channels in parallel;

standard frequency oscillator means for supplying a standard frequency to both said receiving and transmitting synthesizer means; and control means for allotting frequencies to be generated to said receiving and transmitting synthesizer means and also giving switching instructions to said receiving and transmitting channel switching means, for detecting a direction and speed of movement of said mobile unit means on the basis of changes in receiving quality including electric field received by said plurality of radiotelephone base station means, presuming the destination of said mobile unit means, checking the communication traffic condition at the radiotelephone base station means located at the destination of said mobile unit means, and for effecting control, when the communication trraffic is congested, such that the communication between other mobile unit means which are in communication with said radiotelephone base station means at the destionation of said mobile unit means and other radiotelephone base station means is stopped according to the kind of communication held by said other mobile unit means, while said mobile unit means is in communication with a plurality of radiotelephone base station means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

10. A mobile communication system comprising:
a plurality of radiotelephone base station means, each of which includes:
common antenna means;
a plurality of transmitter-receiver means each including a pair of transmitter and receiver means connected to said common antenna means;
a plurality of quality supervisory means for supervising the communication quality at said transmitter-receiver means;
at least one control transmitter-receiver means for transmitting and receiving control signals; and
control means for allotting radio channels to be transmitted and received to said plurality of transmitter-receiver means and to said at least one control transmitter-receiver means and also allotting radio channels to be supervised to said plurality of quality supervisory means, for detecting a direction and speed of movement of said mobile unit means on the basis of changes in receiving quality including electric field received by said plurality of radiotelephone base station means, presuming the destination of said mobile unit means, checking the communication traffic condition at the radiotelephone base station means located at the destination of said mobile unit means, and for effecting control, when the communication traffic is congested, such that the communication between other mobile unit means which are in communication with said radiotelephone base station means at the destination of said mobile unit means and other radiotelephone base station means is stopped according to the kind of communication held by said other mobile unit means, while said mobile unit means is in communication with a plurality of radiotelephone base station means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

11. A mobile communication system comprising:
a plurality of radiotelephone base station means, each of which includes:
common antenna means;
a plurality of transmitter-receiver means each including a pair of transmitter and receiver means connected to said common antenna means, receiving synthesizer means for generating frequencies required to receive i up radio channels among n up radio channels, i being equal to or greater than 2 and equal to or smaller than n, i.e., $2 \leq i \leq n$, receiving channel switching means for successively switching the outputs of said receiving synthesizer means so that it is possible to receive said i up radio channels in parallel, transmitting synthesizer means for generating frequencies required to transmit i up radio channels among n down radio channels, i being equal to or greater than 2 and equal to or smaller than n, i.e., $2 \leq i \leq n$, and transmitting channel switching means for successively switching the outputs of said transmitting synthesizer means so that it is possible to transmit said i down radio channels in parallel;
a plurality of quality supervisory means for supervising the communication quality at said transmitter-receiver means;
at least one control transmitter-receiver means for transmitting and receiving control signals; and
control means for allotting radio channels to be transmitted and received to said plurality of transmitter-receiver means and to said at least one control transmitter-receiver means and also allotting radio channels to be supervised to said plurality of quality supervisory means, for detecting a direction and speed of movement of said mobile unit means on the basis of changes in receiving quality including electric field received by said plurality of radiotelephone base station means, presuming the destination of said mobile unit means, checking the communication traffic condition at the radiotelephone base station means located at the destination of said mobile unit means, and for effecting control, when the communication traffic is congested, such that the communication between other mobile unit means which are in communication with said radiotelephone base station means at the destination of said mobile unit means and other radiotelephone base station means is topped according to the kind of communication held by said other mobile unit means, while said mobile unit means is in communication with a plurality of radiotelephone base station means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

12. A mobile communication system comprising:

a plurality of radiotelephone base station means, each of which includes:

radio receiver means including a receiving mixer for receiving an allotted radio channel;

receiving synthesizer means for applying to said receiving mixer a frequency required to receive said allotted radio channel;

radio transmitter means including a transmitting mixer for transmitting an allotted radio channel;

transmitting synthesizer means for applying to said transmitting mixer a frequency required to trransmit said allotted radio channel;

standard frequency oscillator means for supplying a standard frequency to both said receiving and transmitting synthesizer means;

quality supervisory means for supervising the communication quality of a signal which is being received by said receiver means and outputting communication quality information;

ID recognition memory means for storing said identification information registered at said radiotelephone control means; and control means for allotting a radio channel to be received to said receiving synthesizer means and a radio channel to be transmitted to said transmitting synthesizer means on the basis of said identification information stored in said ID recognition memory means, for detecting a direction and speed of movement of said mobile unit means on the basis of changes in receiving quality including electric field received by said plurality of radiotelephone base station means and for instructing another radiotelephone base station means located in the detected direction of movement of said mobile unit means to allot preferentially a radio channel which enables a predetermined level of speech quality to be ensured among radio channels belonging to said another radiotelephone base station means when an operation of channel hand-off during communication is executed, while said mobile unit means is in communication with a plurality of radiotelephone base station means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

13. A mobile communication system comprising:

a plurality of radiotelephone base station means, each of which includes:

receiving synthesizer means for generating frequencies required to receive i up radio channels among n up radio channels, i being equal to or greater than 2 and equal to or smaller than n, i.e., $2 \leq i \leq n$;

receiving channel switching means for successively switching the outputs of said receiving synthesizer means so that it is possible to receive said i up radio channels in parallel;

transmitting synthesizer means for generating frequencies required to transmit i down radio channels among n down radio channels, i being equal to or greater than 2 and equal to or smaller than n, i.e., $2 \leq i \leq n$;

transmitting channel switching means for successively switching the outputs of said transmitting synthesizer means so that it is possible to transmit said i down radio channels in parallel;

standard frequency oscillator means for supplying a standard frequency to both said receiving and transmitting synthesizer means; and control means for allotting frequencies to be generated to said receiving and transmitting synthesizer means and also giving switching instructions to said receiving and transmitting channel switching means, for detecting a direction and speed of movement of said mobile unit means on the basis of changes in receiving quality including electric field received by said plurality of radiotelephone base station means and for instructing another radiotelephone base station means located in the detected direction of movement of said mobile unit means to allot preferentially a radio channel which enables a predetermined level of speech quality to be ensured among radio channels belonging to said another radiotelephone base station means when an operation of channel hand-off during communication is executed, while said mobile unit means is in communication with a plurality of radiotelephone base station means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

14. A mobile communication system comprising:

a plurality of radiotelephone base station means, each of which includes:

common antenna means;

a plurality of transmitter-receiver means each including a pair of transmitter and receiver means connected to said common antenna means;

a plurality of quality supervisory means for supervising the communication quality at said transmitter-receiver means;

at least one control transmitter-receiver means for transmitting and receiving control signals; and control means for allotting radio channels to be transmitted and received to said plurality of transmitter-receiver means and to said at least one control transmitter-receiver means and also allotting radio channels to be supervised to said plurality of quality supervisory means, for detecting a direction and speed of movement of said mobile unit means on the basis of changes in receiving quality including electric field received by said plurality of radiotelephone base station means and for instructing another radiotelephone base station means located in the detected direction of movement of said mobile unit means to allot preferentially a radio channel which enables a predetermined level of speech quality to be ensured among radio channels belonging to said another radiotelephone base station means when an operation of channel hand-off during communication is executed, while said mobile unit means is in communication with a plurality of radiotelephone base station means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

15. A mobile communication system comprising:

a plurality of radiotelephone base station means, each of which includes:

common antenna means;

a plurality of transmitter-receiver means each including a pair of transmitter and receiver means connected to said common antenna means, receiving synthesizer means for generating frequencies required to receive i up radio channels among n up radio channels, i being equal to or greater than 2 and equal to or smaller than n, i.e., $2 \leq i \leq n$, receiving channel switching means for successively switching the outputs of said receiving synthesizer means so that it is possible to receive said i up radio channels in parallel, transmitting synthesizer means for generating frequencies required to transmit i up radio channels among n down radio channels, i being equal to or greater than 2 and equal to or smaller than n, i.e., $2 \leq i \leq n$, and transmitting channel switching means for successively switching the outputs of said transmitting synthesizer means so that it is possible to transmit said i down radio channels in parallel;

a plurality of quality supervisory means for supervising the communication quality at said transmitter-receiver means;

at least one control transmitter-receiver means for transmitting and receiving control signals; and control means for allotting radio channels to be transmitted and received to said plurality of transmitter-receiver means and to said at least one control transmitter-receiver means and also allotting radio channels to be supervised to said plurality of quality supervisory means, for detecting a direction and speed of movement of said mobile unit means on the basis of changes in receiving quality including electric field received by said plurality of radiotelephone base station means and for instructing another radiotelephone base station means located in the detected direction of movement of said mobile unit means to allot preferentially a radio channel which enables a predetermined level of speech quality to be ensured among radio channels belonging to said another radiotelephone base station means when an operation of channel hand-off during communication is executed, while said mobile unit means is in communication with a plurality of radiotelephone base station means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

16. A mobile communication system comprising:

a plurality of radiotelephone base station means, each of which includes:

radio receiver means including a receiving mixer for receiving an allotted radio channel;

receiving synthesizer means for applying to said receiving mixer a frequency required to receive said allotted radio channel;

radio transmitter means including a transmitting mixer for transmitting an allotted radio channel;

transmitting synthesizer means for applying to said transmitting mixer a frequency required to transmit said allotted radio channel;

standard frequency oscillator means for supplying a standard frequency to both said receiving and transmitting synthesizer means;

quality supervisory means for supervising the communication quality of a signal which is being received by said receiver means and outputting communication quality information;

ID recognition memory means for storing said identification information registered at said radiotelephone control means; and control means for allotting a radio channel to be received to said receiving synthesizer means and a radio channel to be transmitted to said transmitting synthesizer means on the basis of said identification information stored in said ID recognition memory means, and for detecting a direction and speed of movement of said mobile unit means as well as the position thpereof on the basis of changes in communication quality including electric field received by a plurality of radiotelephone base station means which are in communication with said mobile unit means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

17. A mobile communication system comprising:

a plurality of radiotelephone base station means, each of which includes:

receiving synthesizer means for generating frequencies required to receive i up radio channels among n up radio channels, i being equal to or greater than 2 and equal to or smaller than n, i.e., $2 \leq i \leq n$;

receiving channel switching means for successively switching the outputs of said receiving synthesizer means so that it is possible to receive said i up radio channels in parallel;

transmitting synthesizer means for generating frequencies required to transmit i down radio channels among n down radio channels, i being equal to or greater than 2 and equal to or smaller than n, i.e., $2 \leq i \leq n$;

transmitting channel switching means for successively switching the outputs of said transmitting synthesizer means so that it is possible to transmit said i down radio channels in parallel;

standard frequency oscillator means for supplying a standard frequency to both said receiving and transmitting synthesizer means; and control means for allotting frequencies to be generated to said receiving and transmitting synthesizer means and also giving switching instructions to said receiving and transmitting channel switching means, and for detecting a direction and speed of movement of said mobile unit means as well as the position thereof on the basis of changes in communication quality including electric field received by a plurality of radiotelephone base station means whcih are in communication with said mobile unit means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

18. A mobile communication system comprising:

a plurality of radiotelephone base station means, each of which includes:

common antenna means;

a plurality of transmitter-receiver means each including a pair of transmitter and receiver means connected to said common antenna means;

a plurality of quality supervisory means for supervising the communication quality at said transmitter-receiver means;

at least one control transmitter-receiver means for transmitting and receiving control signals; and control means for allotting radio channels to be transmitted and received to said plurality of transmitter-receiver means and to said at least one control transmitter-receiver means and also allotting radio channels to be supervised to said plurality of quality supervisory means, and for detecting a direction and speed of movement of said mobile unit means as well as the position thereof on the basis of changes in communication quality including electric field received by a plurality of radiotelephone base station means which are in communication with said mobile unit means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

19. A mobile communication system comprising:

a plurality of radiotelephone base station means, each of which includes:

common antenna means;

a plurality of transmitter-receiver means each including a pair of transmitter and receiver means connected to said common antenna means, receiving synthesizer means for generating frequencies required to receive i up radio channels among n up radio channels, i being equal to or greater than 2 and equal to or smaller than n, i.e., $2 \leq i \leq n$, receiving channel switching means for successively switching the outputs of said receiving synthesizer means so that it is possible to receive said i up radio channels in parallel, transmitting synthesizer means for generating frequencies required to transmit i up radio channels among n down radio channels, i being equal to or greater than 2 and equal to or smaller than n, i.e., $2 \leq i \leq n$, and transmitting channel switching means for successively switching the outputs of said transmitting synthesizer means so that it is possible to transmit said i down radio channels in parallel;

a plurality of quality supervisory means for supervising the communication quality at said transmitter-receiver means;

at least one control transmitter-receiver means for transmitting and receiving control signals; and control means for allotting radio channels to be transmitted and received to said plurality of transmitter-receiver means and to said at least one control transmitter-receiver means and also allotting radio channels to be supervised to said plurality of quality supervisory means, and for detecting a direction and speed of movement of said mobile unit means as well as the position thereof on the basis of changes in communication quality including electric field received by a plurality of radiotelephone base station means which are in communication with said mobile unit means, respectively covering a plurality of cells to define in combination a service area, communicating with each of mobile unit means which presents in said service area and registering information of the position of said mobile unit means; and radiotelephone control means for connecting together each of said base station means and an ordinary telephone network, setting up and releasing speech paths between at least two of said radiotelephone base station means and said mobile unit means, and adding a speech path for communication with another radiotelephone base station means which is able to communicate with said mobile unit means as it moves, in accordance with said information registered in said mobile unit means.

* * * * *